United States Patent
Uyehara et al.

(10) Patent No.: US 9,923,609 B2
(45) Date of Patent: *Mar. 20, 2018

(54) BITRATE EFFICIENT TRANSPORT THROUGH DISTRIBUTED ANTENNA SYSTEMS

(71) Applicant: CommScope Technologies LLC, Hickory, NC (US)

(72) Inventors: Lance K. Uyehara, San Jose, CA (US); Dean Zavadsky, Shakopee, MN (US); Boris Golubovic, San Francisco, CA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/457,577

(22) Filed: Mar. 13, 2017

(65) Prior Publication Data

US 2017/0187429 A1   Jun. 29, 2017

Related U.S. Application Data

(63) Continuation of application No. 14/737,179, filed on Jun. 11, 2015, now Pat. No. 9,596,322.

(Continued)

(51) Int. Cl.
- *H04M 1/00* (2006.01)
- *H04B 7/024* (2017.01)
- *H04L 29/06* (2006.01)

(52) U.S. Cl.
CPC ............. *H04B 7/024* (2013.01); *H04L 69/08* (2013.01)

(58) Field of Classification Search
CPC ................................ H04L 69/08; H04B 7/024

(Continued)

(56) References Cited

U.S. PATENT DOCUMENTS

| | | |
|---|---|---|
| 4,183,054 A | 1/1980 | Patisaul et al. |
| 4,451,916 A | 5/1984 | Casper et al. |

(Continued)

FOREIGN PATENT DOCUMENTS

| | | |
|---|---|---|
| CA | 2058736 | 7/1993 |
| CA | 2058737 | 7/1993 |

(Continued)

OTHER PUBLICATIONS

US Patent Office, "Notice of Allowance", "from U.S. Appl. No. 14/737,179", dated Oct. 28, 2016, pp. 1-9, Published in: US.

(Continued)

*Primary Examiner* — Joel Ajayi
(74) *Attorney, Agent, or Firm* — Fogg & Powers LLC

(57) ABSTRACT

A distributed antenna system includes a host unit configured to receive downlink wireless network information from a radio access network interface and at least one antenna unit communicatively coupled to the host unit by at least one digital communication link. Host unit is configured to convert downlink wireless network information received from radio access network interface from first protocol layer to second protocol layer. Second protocol layer uses relevant bits more efficiently than first protocol layer. Host unit is configured to communicate downlink wireless network information to at least one antenna unit across at least one digital communication link. At least one antenna unit is configured to convert downlink wireless network information communicated from host unit from second protocol layer to downlink radio frequency signals. At least one antenna unit is configured to communicate downlink radio frequency signals wirelessly using at least one antenna.

20 Claims, 28 Drawing Sheets

Related U.S. Application Data

(60) Provisional application No. 62/010,938, filed on Jun. 11, 2014.

(58) Field of Classification Search
USPC .................................................. 455/562.1
See application file for complete search history.

(56) References Cited

U.S. PATENT DOCUMENTS

| | | |
|---|---|---|
| 4,611,323 A | 9/1986 | Hessenmuller |
| 4,628,501 A | 12/1986 | Loscoe |
| 4,654,843 A | 3/1987 | Roza et al. |
| 4,691,292 A | 9/1987 | Rothweiler |
| 4,999,831 A | 3/1991 | Grace |
| 5,193,109 A | 3/1993 | Lee |
| 5,243,598 A | 9/1993 | Lee |
| 5,303,287 A | 4/1994 | Laborde |
| 5,321,736 A | 6/1994 | Beasley |
| 5,321,849 A | 6/1994 | Lemson |
| 5,339,184 A | 8/1994 | Tang |
| 5,377,255 A | 12/1994 | Beasley |
| 5,381,459 A | 1/1995 | Lappington |
| 5,400,391 A | 3/1995 | Emura et al. |
| 5,461,627 A | 10/1995 | Rypinski |
| 5,519,691 A | 5/1996 | Darcie et al. |
| 5,545,397 A | 8/1996 | Spielvogel et al. |
| 5,566,168 A | 10/1996 | Dent |
| 5,621,786 A | 4/1997 | Fischer et al. |
| 5,627,879 A | 5/1997 | Russell et al. |
| 5,634,191 A | 5/1997 | Beasley |
| 5,642,405 A | 6/1997 | Fischer et al. |
| 5,644,622 A | 7/1997 | Russell et al. |
| 5,657,374 A | 8/1997 | Russell et al. |
| 5,678,177 A | 10/1997 | Beasley |
| 5,682,256 A | 10/1997 | Motley et al. |
| 5,687,195 A | 11/1997 | Hwang et al. |
| 5,732,076 A | 3/1998 | Ketseoglou et al. |
| 5,761,619 A | 6/1998 | Danne et al. |
| 5,765,099 A | 6/1998 | Georges et al. |
| 5,781,541 A | 7/1998 | Schneider |
| 5,781,859 A | 7/1998 | Beasley |
| 5,802,173 A | 9/1998 | Hamilton-Piercy et al. |
| 5,805,983 A | 9/1998 | Naidu et al. |
| 5,809,395 A | 9/1998 | Hamilton-Piercy et al. |
| 5,822,324 A | 10/1998 | Kostresti et al. |
| 5,845,199 A | 12/1998 | Longshore |
| 5,852,651 A | 12/1998 | Fischer et al. |
| 5,867,485 A | 2/1999 | Chambers et al. |
| 5,870,392 A | 2/1999 | Ann |
| 5,890,055 A | 3/1999 | Chu et al. |
| 5,907,544 A | 5/1999 | Rypinski |
| 5,924,022 A | 7/1999 | Beasley et al. |
| 5,987,014 A | 11/1999 | Magill et al. |
| 6,023,628 A | 2/2000 | Beasley |
| 6,034,950 A | 3/2000 | Sauer et al. |
| 6,108,113 A | 8/2000 | Fee |
| 6,108,550 A | 8/2000 | Wiorek et al. |
| 6,108,626 A | 8/2000 | Cellario et al. |
| 6,112,086 A | 8/2000 | Wala |
| 6,157,659 A | 12/2000 | Bird |
| 6,157,810 A | 12/2000 | Georges et al. |
| 6,188,693 B1 | 2/2001 | Murakami |
| 6,222,660 B1 | 4/2001 | Traa |
| 6,226,274 B1 | 5/2001 | Reese et al. |
| 6,246,675 B1 | 6/2001 | Beasley et al. |
| 6,373,887 B1 | 4/2002 | Aiyagari et al. |
| 6,377,640 B2 | 4/2002 | Trans |
| 6,424,313 B1 | 7/2002 | Navarro et al. |
| 6,498,936 B1 | 12/2002 | Raith |
| 6,567,473 B1 | 5/2003 | Tzannes |
| 6,667,973 B1 | 12/2003 | Gorshe et al. |
| 6,674,966 B1 | 1/2004 | Koonen |
| 6,704,545 B1 | 3/2004 | Wala |
| 6,711,144 B1 | 3/2004 | Kim et al. |
| 6,729,929 B1 | 5/2004 | Sayers et al. |
| 6,731,618 B1 | 5/2004 | Chung et al. |
| 6,741,862 B2 | 5/2004 | Chung et al. |
| 6,768,745 B1 | 7/2004 | Gorshe et al. |
| 6,781,999 B2 | 8/2004 | Eyuboglu et al. |
| 6,785,558 B1 | 8/2004 | Stratford et al. |
| 6,826,163 B2 | 11/2004 | Mani et al. |
| 6,826,164 B2 | 11/2004 | Mani et al. |
| 6,831,901 B2 | 12/2004 | Millar |
| 6,836,660 B1 | 12/2004 | Wala |
| 6,865,390 B2 | 3/2005 | Goss et al. |
| 6,917,614 B1 | 7/2005 | Laubach et al. |
| 6,963,552 B2 | 11/2005 | Sabat, Jr. et al. |
| 7,127,175 B2 | 10/2006 | Mani et al. |
| 7,149,483 B1 | 12/2006 | Reinisch et al. |
| 7,170,871 B2 | 1/2007 | Eyuboglu et al. |
| 7,200,391 B2 | 4/2007 | Chung et al. |
| 7,205,864 B2 | 4/2007 | Schultz, Jr. et al. |
| 7,215,651 B2 | 5/2007 | Millar |
| 7,242,958 B2 | 7/2007 | Chung et al. |
| 7,277,446 B1 | 10/2007 | Abi-Nassif et al. |
| 7,289,972 B2 | 10/2007 | Rieser et al. |
| 7,299,278 B2 | 11/2007 | Ch'ng |
| 7,313,415 B2 | 12/2007 | Wake et al. |
| 7,515,643 B2 | 4/2009 | Chung |
| 7,558,356 B2 | 7/2009 | Pollman et al. |
| 7,558,588 B2 | 7/2009 | To et al. |
| 7,603,127 B2 | 10/2009 | Chung et al. |
| 7,626,926 B2 | 12/2009 | Abi-Nassif et al. |
| 7,672,682 B2 | 3/2010 | Sharma et al. |
| 7,729,243 B2 | 6/2010 | Ananthaiyer et al. |
| 7,730,189 B2 | 6/2010 | Harikumar et al. |
| 7,733,901 B2 | 6/2010 | Salkini et al. |
| 7,751,835 B2 | 7/2010 | Sharma et al. |
| 7,761,093 B2 | 7/2010 | Sabat, Jr. et al. |
| 7,801,487 B2 | 9/2010 | Mehrabanzad et al. |
| 7,831,257 B2 | 11/2010 | Pollman et al. |
| 7,835,698 B2 | 11/2010 | Eyuboglu et al. |
| 7,843,892 B2 | 11/2010 | Mehrabanzad et al. |
| 7,860,513 B2 | 12/2010 | Chung et al. |
| 7,907,571 B2 | 3/2011 | Raghothaman et al. |
| 7,920,541 B2 | 4/2011 | To et al. |
| 7,920,858 B2 | 4/2011 | Sabat, Jr. et al. |
| 7,926,098 B2 | 4/2011 | Chinitz et al. |
| 7,933,619 B2 | 4/2011 | Kim |
| 7,934,001 B2 | 4/2011 | Harikumar et al. |
| 7,953,040 B2 | 5/2011 | Harikumar et al. |
| 7,983,672 B2 | 7/2011 | Humblet et al. |
| 7,983,708 B2 | 7/2011 | Mehrabanzad et al. |
| 7,995,493 B2 | 8/2011 | Anderlind et al. |
| 8,023,439 B2 | 9/2011 | Rao |
| 8,060,058 B2 | 11/2011 | Ch'ng et al. |
| 8,078,165 B2 | 12/2011 | Mate et al. |
| 8,085,696 B2 | 12/2011 | Garg et al. |
| 8,094,630 B2 | 1/2012 | Garg et al. |
| 8,099,504 B2 | 1/2012 | Cherian et al. |
| 8,111,253 B2 | 2/2012 | Rao |
| 8,130,686 B2 | 3/2012 | Rao et al. |
| 8,140,091 B2 | 3/2012 | Chung et al. |
| 8,145,221 B2 | 3/2012 | Garg et al. |
| 8,160,020 B2 | 4/2012 | Eyuboglu et al. |
| 8,160,629 B2 | 4/2012 | Mate et al. |
| 8,160,631 B2 | 4/2012 | Raghothaman et al. |
| 8,165,528 B2 | 4/2012 | Raghothaman et al. |
| 8,170,598 B2 | 5/2012 | Raghothaman et al. |
| 8,176,327 B2 | 5/2012 | Xiong et al. |
| 8,195,187 B2 | 6/2012 | Eyuboglu et al. |
| 8,229,397 B2 | 7/2012 | Hou et al. |
| 8,229,498 B2 | 7/2012 | Ch'ng et al. |
| 8,259,671 B2 | 9/2012 | Raghothaman et al. |
| 8,280,376 B2 | 10/2012 | Rajagopalan et al. |
| 8,290,527 B2 | 10/2012 | Richardson |
| 8,295,256 B2 | 10/2012 | Humblet et al. |
| 8,295,818 B2 | 10/2012 | Palnati et al. |
| 8,311,570 B2 | 11/2012 | Richardson |
| 8,326,342 B2 | 12/2012 | Raghothaman et al. |
| 8,340,636 B2 | 12/2012 | Yin et al. |
| 8,345,694 B2 | 1/2013 | Den et al. |
| 8,346,220 B2 | 1/2013 | Mate et al. |
| 8,355,727 B2 | 1/2013 | Hoang et al. |

(56) References Cited

U.S. PATENT DOCUMENTS

| | | |
|---|---|---|
| 8,358,623 B2 | 1/2013 | Samar et al. |
| 8,379,625 B2 | 2/2013 | Humblet |
| 8,385,291 B2 | 2/2013 | Richardson et al. |
| 8,400,989 B2 | 3/2013 | Ch'ng et al. |
| 8,402,143 B2 | 3/2013 | Ramaswamy et al. |
| 8,428,601 B2 | 4/2013 | Samar et al. |
| 8,452,299 B2 | 5/2013 | Raghothaman |
| 8,457,084 B2 | 6/2013 | Valmikam et al. |
| 8,503,342 B2 | 8/2013 | Richardson |
| 8,520,659 B2 | 8/2013 | Humblet |
| 8,532,658 B2 | 9/2013 | Knisely |
| 8,542,707 B2 | 9/2013 | Hou et al. |
| 8,543,139 B2 | 9/2013 | Samar et al. |
| 8,554,231 B2 | 10/2013 | Jones |
| 8,594,663 B2 | 11/2013 | Ch'ng et al. |
| 8,615,593 B2 | 12/2013 | Ch'ng et al. |
| 8,688,809 B2 | 4/2014 | Ch'ng et al. |
| 8,693,987 B2 | 4/2014 | Chiussi et al. |
| 8,718,697 B2 | 5/2014 | Srinivas et al. |
| 8,731,574 B2 | 5/2014 | Ch'ng et al. |
| 8,750,271 B2 | 6/2014 | Jones |
| 8,774,134 B2 | 7/2014 | Raghothaman et al. |
| 8,781,483 B2 | 7/2014 | Ch'ng |
| 8,805,371 B2 | 8/2014 | Richardson et al. |
| 8,873,512 B2 | 10/2014 | Richardson et al. |
| 8,886,249 B2 | 11/2014 | Richardson |
| 8,909,278 B2 | 12/2014 | Rao et al. |
| 8,942,136 B2 | 1/2015 | Humblet |
| 8,953,566 B2 | 2/2015 | Hegde et al. |
| 9,078,284 B2 | 7/2015 | Richardson |
| 9,166,799 B2 | 10/2015 | Kim |
| 2001/0036163 A1 | 11/2001 | Sabat, Jr. et al. |
| 2001/0044292 A1 | 11/2001 | Jeon et al. |
| 2002/0142739 A1 | 10/2002 | Smith |
| 2002/0167954 A1 | 11/2002 | Highsmith et al. |
| 2002/0191565 A1 | 12/2002 | Mani et al. |
| 2003/0015943 A1 | 1/2003 | Kim et al. |
| 2003/0043928 A1 | 3/2003 | Ling et al. |
| 2003/0203717 A1 | 10/2003 | Chuprun et al. |
| 2004/0010609 A1 | 1/2004 | Vilander et al. |
| 2004/0032354 A1 | 2/2004 | Knobel et al. |
| 2004/0037565 A1 | 2/2004 | Young et al. |
| 2004/0053602 A1 | 3/2004 | Wurzburg |
| 2004/0106387 A1 | 6/2004 | Bauman et al. |
| 2004/0106435 A1 | 6/2004 | Bauman et al. |
| 2004/0132474 A1 | 7/2004 | Wala |
| 2004/0198453 A1 | 10/2004 | Cutrer et al. |
| 2004/0203339 A1 | 10/2004 | Bauman |
| 2004/0203703 A1 | 10/2004 | Fischer |
| 2004/0219950 A1 | 11/2004 | Pallonen et al. |
| 2005/0147067 A1 | 7/2005 | Mani et al. |
| 2005/0201323 A1 | 9/2005 | Mani et al. |
| 2005/0250503 A1 | 11/2005 | Cutrer |
| 2006/0003794 A1 | 1/2006 | Chung et al. |
| 2006/0066484 A1 | 3/2006 | Sayers |
| 2006/0094470 A1 | 5/2006 | Wake et al. |
| 2006/0121944 A1 | 6/2006 | Buscaglia et al. |
| 2006/0153070 A1 | 7/2006 | DelRegno et al. |
| 2006/0172775 A1 | 8/2006 | Conyers et al. |
| 2006/0193295 A1 | 8/2006 | White et al. |
| 2007/0008939 A1 | 1/2007 | Fischer |
| 2007/0097916 A1 | 5/2007 | Eyuboglu et al. |
| 2007/0230408 A1 | 10/2007 | Trainin et al. |
| 2008/0159236 A1 | 7/2008 | Ch'ng et al. |
| 2008/0162924 A1 | 7/2008 | Chinitz et al. |
| 2009/0034440 A1 | 2/2009 | Samar et al. |
| 2009/0116445 A1 | 5/2009 | Samar et al. |
| 2009/0156218 A1 | 6/2009 | Garg et al. |
| 2009/0170440 A1 | 7/2009 | Eyuboglu et al. |
| 2009/0170475 A1 | 7/2009 | Ch'ng et al. |
| 2009/0186626 A1 | 7/2009 | Raghothaman |
| 2010/0075658 A1 | 3/2010 | Hou et al. |
| 2010/0124825 A1 | 5/2010 | Sakamoto et al. |
| 2010/0157825 A1 | 6/2010 | Anderlind et al. |
| 2010/0157941 A1 | 6/2010 | Raghothaman et al. |
| 2010/0165957 A1 | 7/2010 | Hedge et al. |
| 2010/0167771 A1 | 7/2010 | Raghothaman et al. |
| 2010/0167777 A1 | 7/2010 | Raghothaman et al. |
| 2010/0177731 A1 | 7/2010 | Ananthaiyer et al. |
| 2010/0208777 A1 | 8/2010 | Ogaz |
| 2010/0215028 A1 | 8/2010 | Fischer |
| 2010/0232356 A1 | 9/2010 | Maheshwari et al. |
| 2010/0242103 A1 | 9/2010 | Richardson et al. |
| 2010/0278105 A1 | 11/2010 | Diachina et al. |
| 2010/0290389 A1 | 11/2010 | Hou et al. |
| 2010/0329132 A1 | 12/2010 | Raghothaman et al. |
| 2011/0143649 A1 | 6/2011 | Sabat, Jr. et al. |
| 2011/0223958 A1 | 9/2011 | Chen et al. |
| 2011/0237178 A1 | 9/2011 | Seki et al. |
| 2011/0317679 A1 | 12/2011 | Jain |
| 2012/0004014 A1 | 1/2012 | Ding et al. |
| 2012/0027145 A1 | 2/2012 | Uyehara et al. |
| 2012/0300710 A1 | 11/2012 | Li et al. |
| 2013/0079035 A1 | 3/2013 | Wala et al. |
| 2013/0136104 A1 | 5/2013 | Samar et al. |
| 2013/0171996 A1 | 7/2013 | Richardson et al. |
| 2013/0308537 A1 | 11/2013 | Kummetz et al. |
| 2014/0004793 A1 | 1/2014 | Bandyopadhyay et al. |
| 2014/0079037 A1 | 3/2014 | Evans et al. |
| 2014/0146797 A1 | 5/2014 | Zavadsky et al. |
| 2014/0146905 A1 | 5/2014 | Zavadksy et al. |
| 2014/0146906 A1 | 5/2014 | Zavadsky et al. |
| 2014/0219162 A1 | 8/2014 | Eyuboglu et al. |
| 2014/0219255 A1 | 8/2014 | Eyuboglu et al. |
| 2014/0219267 A1 | 8/2014 | Eyuboglu et al. |
| 2014/0241224 A1 | 8/2014 | Fischer et al. |
| 2014/0243033 A1 | 8/2014 | Wala et al. |
| 2015/0163044 A1 | 6/2015 | Analui et al. |
| 2015/0365502 A1 | 12/2015 | Uyehara et al. |

FOREIGN PATENT DOCUMENTS

| | | |
|---|---|---|
| CA | 2069462 | 7/1993 |
| CA | 2087285 | 1/1994 |
| CA | 2138763 | 1/1994 |
| CA | 2156046 | 1/1995 |
| CA | 2125411 | 5/1995 |
| CA | 2128842 | 1/1996 |
| CA | 2134365 | 4/1996 |
| CA | 2158386 | 3/1997 |
| CA | 2168681 | 8/1997 |
| CA | 2215079 | 3/1999 |
| EP | 0391597 | 10/1990 |
| EP | 0876073 | 11/1998 |
| EP | 1214809 | 3/2006 |
| EP | 1956743 | 8/2008 |
| GB | 2253770 | 9/1992 |
| GB | 2289198 | 11/1995 |
| GB | 2315959 | 2/1998 |
| GB | 2320653 | 6/1998 |
| JP | 2000333240 | 11/2000 |
| JP | 2001197012 | 7/2001 |
| JP | 2003023396 | 1/2003 |
| JP | 2004180220 | 6/2004 |
| JP | 2004194351 | 7/2004 |
| WO | 9115927 | 10/1991 |
| WO | 9413067 | 6/1994 |
| WO | 9533350 | 12/1995 |
| WO | 9628946 | 9/1996 |
| WO | 9716000 | 5/1997 |
| WO | 9732442 | 9/1997 |
| WO | 9824256 | 6/1998 |
| WO | 9937035 | 7/1999 |
| WO | 0117156 | 3/2001 |
| WO | 0174013 | 10/2001 |
| WO | 0174100 | 10/2001 |
| WO | 0182642 | 11/2001 |
| WO | 03079645 | 9/2003 |

OTHER PUBLICATIONS

International Search Authority, "International Search Report and Written Opinion for PCT Application No. PCT/US2015/035364",

(56) References Cited

OTHER PUBLICATIONS

"from Foreign Counterpart to U.S. Appl. No. 14/737,179", dated Sep. 9, 2015, pp. 1-18, Published in: WO.

International Search Authority, "International Preliminary Report on Patentability for PCT/US2015/035364", "from Foreign Counterpart of U.S. Appl. No. 14/737,179", dated Dec. 22, 2016, pp. 1-15, Published in: WO.

United States Patent and Trademark Office, "Notice of Allowance", "from U.S. Appl. No. 14/737,230", dated Feb. 3, 2017, pp. 1-66, Published in: US.

U.S. Patent Office, "Office Action", "from U.S. Appl. No. 14/737,230", dated Jul. 8, 2016, pp. 1-81, Published in: US.

International Search Authority, "International Search Authority and Written Opinion for PCT Application No. PCT/US2015/035380", "from Foreign Counterpart to U.S. Appl. No. 14/737,230", dated Sep. 23, 2015, pp. 1-16, Published in: WO.

International Search Authority, "International Search Report from PCT/US2015/035380", "from Foreign Counterpart of U.S. Appl. No. 14/737,230", dated Dec. 22, 2016, pp. 1-13, Published in: WO.

Digivance, "Indoor Coverage Solution", "www.adc.com", 2001, pp. 1-8, No. 1646 3/04, Publisher: ADC.

Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.

Harvey et al., "Cordless Communications Utilising Radio Over Fibre Techniques for the Local Loop", "IEEE International Conference on Communications", Jun. 1991, pp. 1171-1175, Publisher: IEEE.

Tektronix, "Synchronous Optical Network (SONET)", "http://www.iec.org/online/tutorials/sonet/topic03.html", Aug. 28, 2002, pp. 1-5, Publisher: International Engineering Consortium.

U.S. Patent Office, "Notice of Allowance", "from U.S. Appl. No. 14/737,179", dated Jul. 5, 2016, pp. 1-75, Published in: US.

BITRATE EFFICIENT TRANSPORT THROUGH DISTRIBUTED ANTENNA SYSTEMS

CROSS-REFERENCE TO RELATED APPLICATIONS

This application is a continuation application of U.S. patent application Ser. No. 14/737,179 (hereafter the '179 Application) entitled "BITRATE EFFICIENT TRANSPORT THROUGH DISTRIBUTED ANTENNA SYSTEMS", filed on Jun. 11, 2015 which claims the benefit of U.S. Provisional Patent Application Ser. No. 62/010,938 filed on Jun. 11, 2014, both of which are hereby incorporated herein by reference.

This application is related to the following co-pending United States patent applications, which are hereby incorporated herein by reference:

U.S. patent application Ser. No. 14/737,230 (hereafter the '230 Application) entitled "BIT EFFICIENT TRANSPORT THROUGH DISTRIBUTED ANTENNA SYSTEMS", filed on Jun. 11, 2015 (currently pending);

U.S. patent application Ser. No. 09/649,159 (hereafter the '159 Application) entitled "METHODS AND SYSTEMS FOR COMMUNICATING IN A CELLULAR NETWORK" filed on Aug. 28, 2000 (issued in U.S. Pat. No. 6,836,660); and U.S. patent application Ser. No. 12/372,319 (hereafter the '319 Application) entitled "DISTRIBUTED ANTENNA SYSTEM USING GIGABIT ETHERNET PHYSICAL LAYER DEVICE" filed on Feb. 17, 2009 (published as U.S. 2010/0208777).

BACKGROUND

Distributed Antenna Systems (DAS) are used to distribute wireless signal coverage into buildings or other substantially closed environments. For example, a DAS may distribute antennas within a building. The antennas are typically connected to a radio frequency (RF) signal source, such as a service provider. Various methods of transporting the RF signal from the RF signal source to the antenna have been implemented in the art.

SUMMARY

A distributed antenna system includes a host unit configured to receive downlink wireless network information from a radio access network interface and at least one antenna unit communicatively coupled to the host unit by at least one digital communication link. The host unit is configured to convert the downlink wireless network information received from the radio access network interface from a first protocol layer to a second protocol layer. The second protocol layer uses relevant bits more efficiently than the first protocol layer. The host unit is configured to communicate the downlink wireless network information to the at least one antenna unit across the at least one digital communication link. The at least one antenna unit is configured to convert the downlink wireless network information communicated from the host unit from the second protocol layer to downlink radio frequency signals. The at least one antenna unit is configured to communicate the downlink radio frequency signals wirelessly using at least one antenna.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Like reference numbers and designations in the various drawings indicate like elements.

DETAILED DESCRIPTION

Figure 1A:
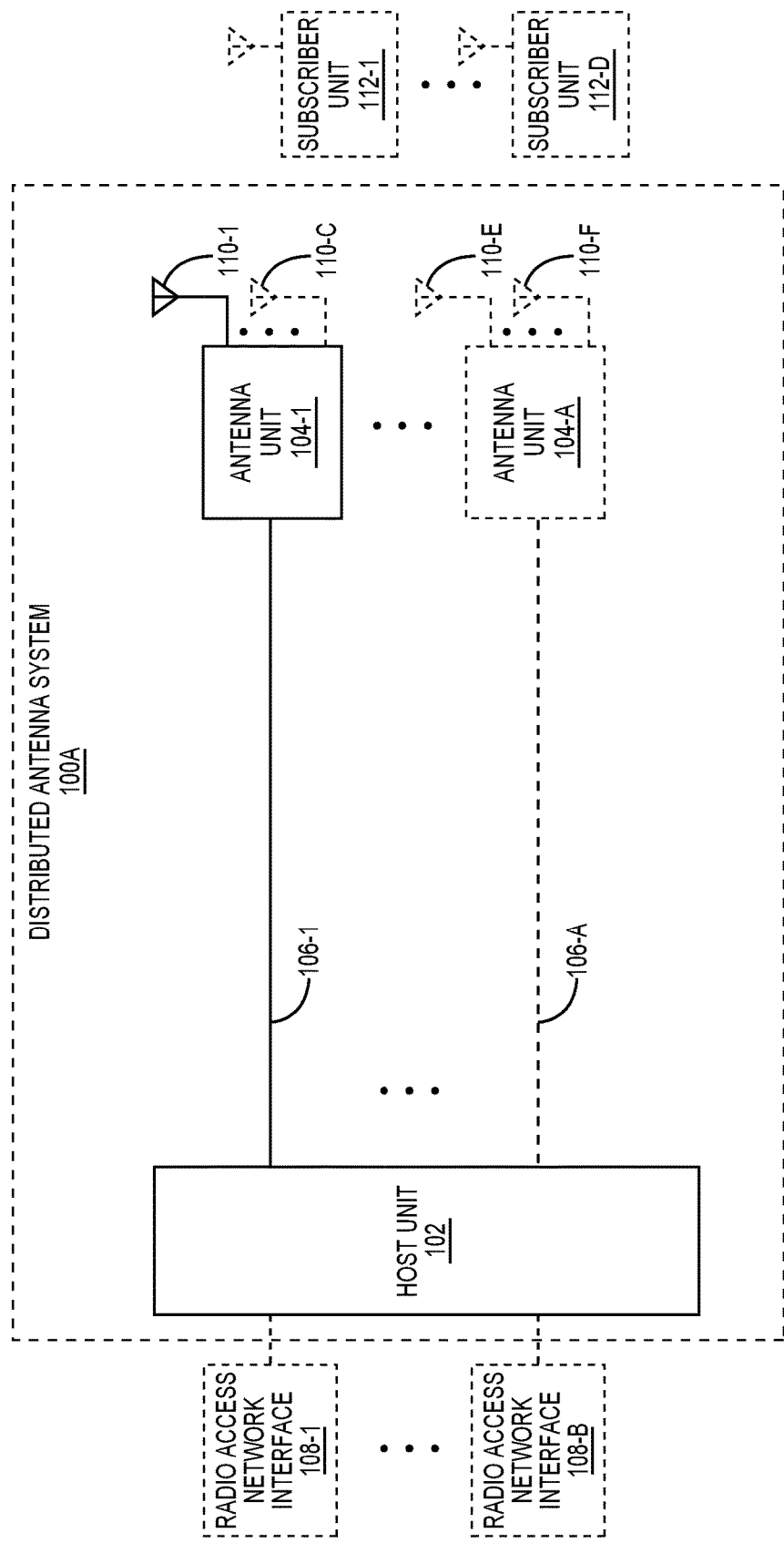
FIGS. 1A-1D are block diagrams of exemplary embodiments of distributed antenna systems.

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The embodiments described below describe a distributed antenna system (DAS) and components within the distributed antenna system (DAS). The distributed antenna system is connected to at least one radio access network (RAN) through at least one radio access network (RAN) interface. In exemplary embodiments, the distributed antenna system includes a distributed antenna system host that interfaces with the at least one radio access network (RAN) interface and converts wireless network information to a more efficient format for transport across at least one medium to at least one antenna unit that converts the wireless network information to a radio frequency signal and communicates it wirelessly using at least one antenna. More specifically, in some embodiments medium access control (MAC) protocol data units (PDUs) are transported instead of baseband IQ samples because the wireless network information is more efficiently transported in MAC PDUs than baseband IQ samples. The ability to transmit the wireless network information in MAC PDUs more efficiently than the baseband IQ samples enables lower bandwidth media to be used, such as Category building cabling such as Category 5, Category 5e, Category 6, Category 6A and Category 7. The ability to transmit the MAC PDUs more efficiently than the baseband IQ samples is essentially a compression technique that enables more data to transmitted over the media. In exemplary embodiments, synchronization information, timing information, power level, signal gain and/or other additional overhead is transmitted in addition to the wireless network information. In exemplary embodiments, wireless network information (or cellular network information) is represented in different ways by the different protocol layers. The wireless network information is the same, but it is formatted differently using different headers, control words, error control bits, etc. that are added/removed by the different protocol layers throughout the entire system. While described using the term distributed antenna system (DAS) herein, it is understood that this description also applies to other wireless distribution technologies and networks, such as distributed base stations, remote radio heads, and/or a centralized radio access network (CRAN, also known as Cloud-RAN and coordinated RAN). In exemplary embodiments, the antenna unit is embodied as a remote radio head. In exemplary embodiments, the radio access network interface is embodied as a baseband unit in a distributed base station and/or a centralized radio access network (CRAN).

In exemplary embodiments, radio access technologies may operate using various wireless protocols and in various bands of frequency spectrum. The systems and methodologies described herein apply equally to a number of radio access technologies (RAT), though it is more beneficial for radio access technologies (RAT) that are substantially less efficient with bandwidth at one layer than another. For example, the radio access technologies (RAT) may include, but are not limited to, 800 MHz cellular service, 1.9 GHz Personal Communication Services (PCS), Specialized Mobile Radio (SMR) services, Enhanced Special Mobile Radio (ESMR) services at both 800 MHz and 900 MHz, 1800 MHz and 2100 MHz Advanced Wireless Services (AWS), 700 MHz uC/ABC services, two way paging services, video services, Public Safety (PS) services at 450 MHz, 900 MHz and 1800 MHz Global System for Mobile Communications (GSM), 2100 MHz Universal Mobile Telecommunications System (UMTS), Worldwide Interoperability for Microwave Access (WiMAX), 3rd Generation Partnership Projects (3GPP) Long Term Evolution (LTE), High Speed Packet Access (HSPA), or other appropriate communication services. The system described herein are capable of transporting both Single Input Single Output (SISO) and Multiple Input Multiple Output (MIMO) services at any of the frequencies described above. The systems described herein can support any combination of SISO and MIMO signals across various bands of frequency spectrum. In some example embodiments, the systems described herein may provide MIMO streams for WiMAX, LTE, and HSPA services while only providing SISO streams for other services. Other combinations of MIMO and SISO services are used in other embodiments.

Generally, the ability to switch from one layer to another within a particular protocol may afford more efficient use of bandwidth and can be applied to various radio access technologies having various layers, including radio link control (RLC) layers, medium access control (MAC) layers, and physical layers. LTE benefits substantially from a conversion from the physical layer to the MAC layer for transport through a DAS because the physical layer is much less efficient with bits than the MAC layer.

In exemplary embodiments, the medium access control (MAC) protocol data units (PDUs) are recovered by undoing the LTE physical layer processing (or other physical layer processing, such as another radio access technology's physical layer processing) done by the radio access network (RAN) interface (such as an eNodeB) and extracting just the LTE media access protocol (MAC) protocol data units (PDUs). In exemplary embodiments, this conversion to MAC PDUs and back essentially acts as a transport compression and transport decompression system.

Figure 1B:
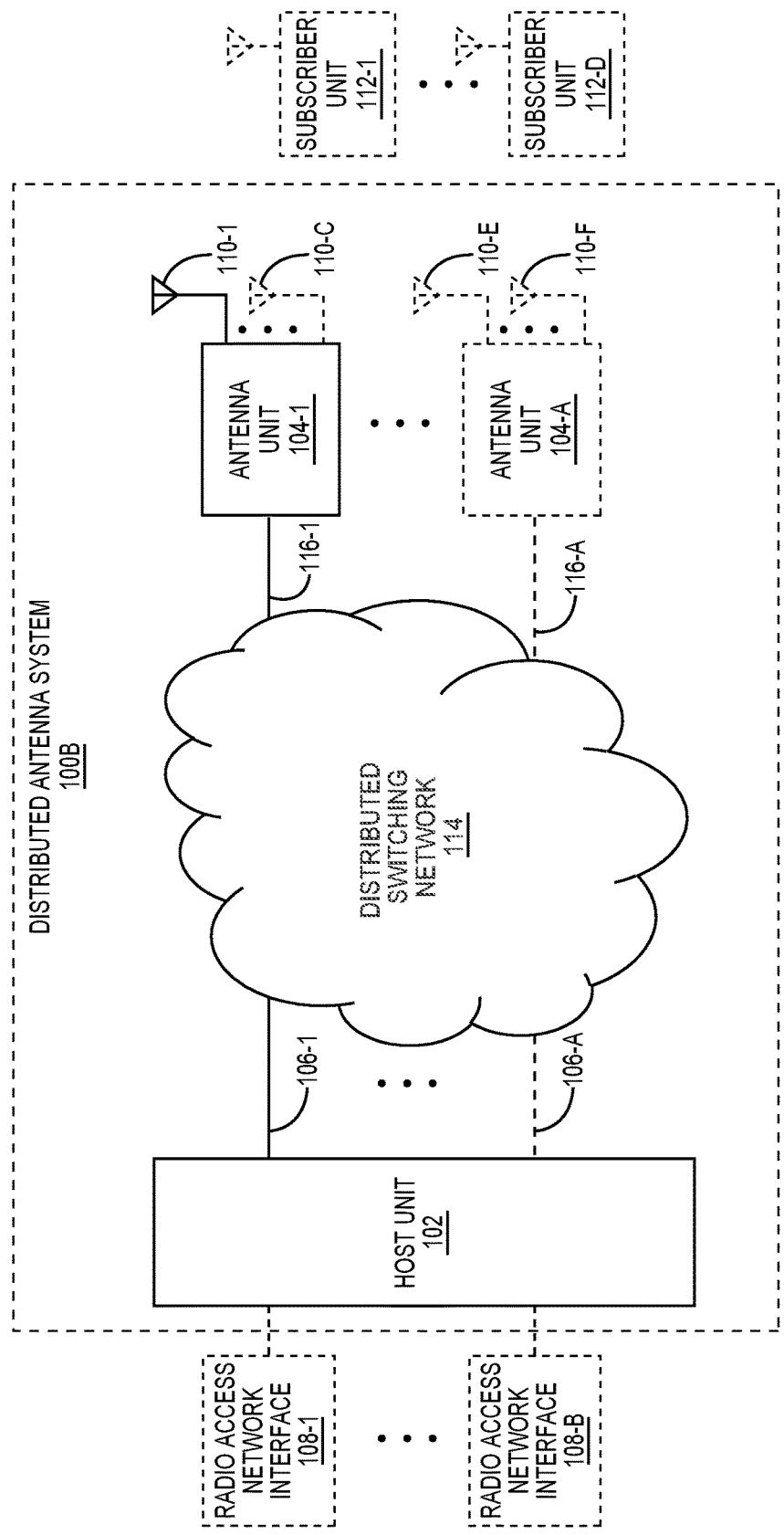

FIGS. 1A-1D are block diagrams of exemplary embodiments of distributed antenna systems 100. Each of FIGS. 1A-1B illustrates a different embodiment of a distributed antenna system 100, labeled 100A-100B respectively.

FIG. 1A is a block diagram of an exemplary embodiment of a distributed antenna system 100, distributed antenna system 100A. Distributed antenna system 100A includes a host unit 102 and at least one antenna unit 104 (including antenna unit 104-1 and any quantity of optional antenna units 104 through optional antenna unit 104-A) communicatively coupled to the host unit 102 through at least one digital communication link 106 (including digital communication link 106-1 and any quantity of optional digital communication links 106 through optional digital communication link 106-A). In exemplary embodiments, the at least one antenna unit 104 is remotely located from the host unit 102.

The host unit 102 is communicatively coupled to at least one radio access network (RAN) interface 108 (including radio access network (RAN) interface 108-1 and any quantity of optional radio access network (RAN) interfaces 108 through optional radio access network (RAN) interface 108-B). In the forward path, the host unit 102 is configured to receive wireless network information from each of the at least one radio access network (RAN) interface 108. As described in more detail below, the host unit 102 is configured to convert wireless network information from each of the at least one radio access network (RAN) interface 108 into a more efficient format (such as to DAS MAC PDUs from baseband IQ pairs) for transport (either directly or through other components of the distributed antenna system 100A) to the at least one antenna unit 104 across the at least one digital communication link 106.

Similarly in the reverse path, in exemplary embodiments the host unit 102 is configured to receive uplink data streams formatted in a more efficient format (such as DAS MAC PDUs) across a respective digital communication link 106 from at least one antenna unit 104. In exemplary embodiments, the host unit 102 is further configured to combine multiple received uplink data streams formatted in the more efficient format (such as DAS MAC PDUs) into a single aggregate uplink data stream formatted in the more efficient format (such as DAS MAC PDUs). In exemplary embodiments, the multiple received uplink data streams are combined using summation (either digital or analog), weighted summation, averaging, multiplexing, etc. The host unit 102 is further configured to convert the received uplink data stream (or the aggregate uplink data stream) formatted in the more efficient format (such as DAS MAC PDUs) to signals formatted for the associated radio access network (RAN)

interface 108 (such as baseband IQ samples) and further configured to communicate the signals formatted for the associated radio access network (RAN) interface 108 to the associated radio access network (RAN) interface 108.

Each antenna unit 104 is communicatively coupled to the host unit 102 across a digital communication link 106. Specifically, antenna unit 104-1 is communicatively coupled to the host unit 102 across digital communication link 106-1 and optional antenna unit 104-A is communicatively coupled to the host unit 102 across digital communication link 106-A. In exemplary embodiments, some or all of the digital communication links 106 are wired digital communication links, such as fiber optic cabling, coaxial cabling, twisted pair cabling, etc. In exemplary embodiments, some or all of the digital communication links 106 are wireless digital communication links. In exemplary embodiments, a synchronous data stream using Ethernet PHY components is communicated across the digital communication links 106, rather than packetized data, such as traditional Internet Protocol (IP) packets. In exemplary embodiments, the same hardware found in normal packetized Internet Protocol (IP) transport is used, it is just not wrapped into Internet Protocol (IP) packets. Each antenna unit 104 includes components for converting the wireless network information from the more efficient format (such as DAS MAC PDUs) for transport across the at least one digital communication link 106 to radio frequency, for transmission wirelessly using the at least one antenna 110.

In the forward/downstream path, each antenna unit 104 is configured to convert at least one wireless network information from the more efficient format (such as DAS MAC PDUs) to a downlink radio frequency (RF) signal in a radio frequency band for transmission wirelessly using the at least one antenna 110. In exemplary embodiments, this may include protocol layer processors, converters, and/or translators, digital to analog converters, and oscillators described in more detail below. Each antenna unit 104 is further configured to transmit the downlink radio frequency signal in the radio frequency band to at least one subscriber unit 112 (including subscriber unit 112-1 and any quantity of optional subscriber units 112 through optional subscriber unit 112-D) using at least one antenna 110. In exemplary embodiments, at least one antenna unit 104-1 is configured to transmit one downlink radio frequency signal to one subscriber unit 112-1 using an antenna 110-1 and another radio frequency signal to another subscriber unit 112-D using another antenna 110-C. In exemplary embodiments, other combinations of radio frequency antennas 110 and other components are used to communicate other combinations of radio frequency signals in other various radio frequency bands to various subscriber units 112.

Similarly in the reverse/upstream path, in exemplary embodiments each antenna unit 104 is configured to receive an uplink radio frequency (RF) signal from at least one subscriber unit 112 using at least one antenna 110. Each antenna unit 104 is further configured to convert the radio frequency signals to at least one uplink data stream. Each antenna unit 104 is further configured to convert wireless network information from the uplink radio frequency signals to a more efficient format (such as DAS MAC PDUs) for transmission across the at least one digital communication link 106 to the host unit 102. In exemplary embodiments, this may include oscillators, digital to analog converters, and protocol layer converters and/or translators described in more detail below.

In exemplary embodiments, a master reference clock is distributed between the various components of the distributed antenna system 100A to keep the various components locked to the same clock. In exemplary embodiments, the master reference clock is generated based on a signal received from the at least one radio access network interface 108-1. In exemplary embodiments, the master reference clock is generated within another component of the distributed antenna system, such as an antenna unit 104.

FIG. 1B is a block diagram of an exemplary embodiment of a distributed antenna system 100, distributed antenna system 100B. Distributed antenna system 100B includes a host unit 102 and at least one antenna unit 104 (including antenna unit 104-1 and any quantity of optional antenna units 104 through optional antenna unit 104-A). Distributed antenna system 100B includes similar components to distributed antenna system 100A and operates according to similar principles and methods as distributed antenna system 100A described above. The difference between distributed antenna system 100B and distributed antenna system 100A is that distributed antenna system 100B includes a distributed switching network 114. Distributed switching network 114 couples the host unit 102 with the at least one antenna unit 104. Distributed switching network 114 may include one or more distributed antenna switches (such as a DAS expansion host and/or an Ethernet switch) or other intermediary components/nodes that functionally distribute downlink signals from the host unit 102 to the at least one antenna unit 104. Distributed switching network 114 also functionally distributes uplink signals from the at least one antenna unit 104 to the host unit 102. In exemplary embodiments, the distributed switching network 114 can be controlled by a separate controller or another component of the system. In exemplary embodiments the switching elements of the distributed switching network 114 are controlled either manually or automatically. In exemplary embodiments, the routes can be pre-determined and static. In other exemplary embodiments, the routes can dynamically change based on time of day, load, or other factors.

Each antenna unit 104 is communicatively coupled to the distributed switching network 114 across a digital communication link 116. Specifically, antenna unit 104-1 is communicatively coupled to the distributed switching network 114 across digital communication link 116-1 and optional antenna unit 104-A is communicatively coupled to the distributed switching network 114 across digital communication link 116-A. In exemplary embodiments, some or all of the digital communication links 116 are wired digital communication links, such as fiber optic cabling, coaxial cabling, twisted pair cabling, etc. In exemplary embodiments, some or all of the digital communication links 116 are wireless digital communication links. In exemplary embodiments, each antenna unit 104 includes components configured for extracting at least one downlink data stream from an aggregate downlink data stream and components configured for aggregating at least one uplink data stream into an aggregate uplink data stream as well as at least one radio frequency converter configured to convert between at least one data stream and at least one radio frequency band and at least one antenna 110 configured to transmit and receive signals in the at least one radio frequency band to at least one subscriber unit 112.

Figure 1C:
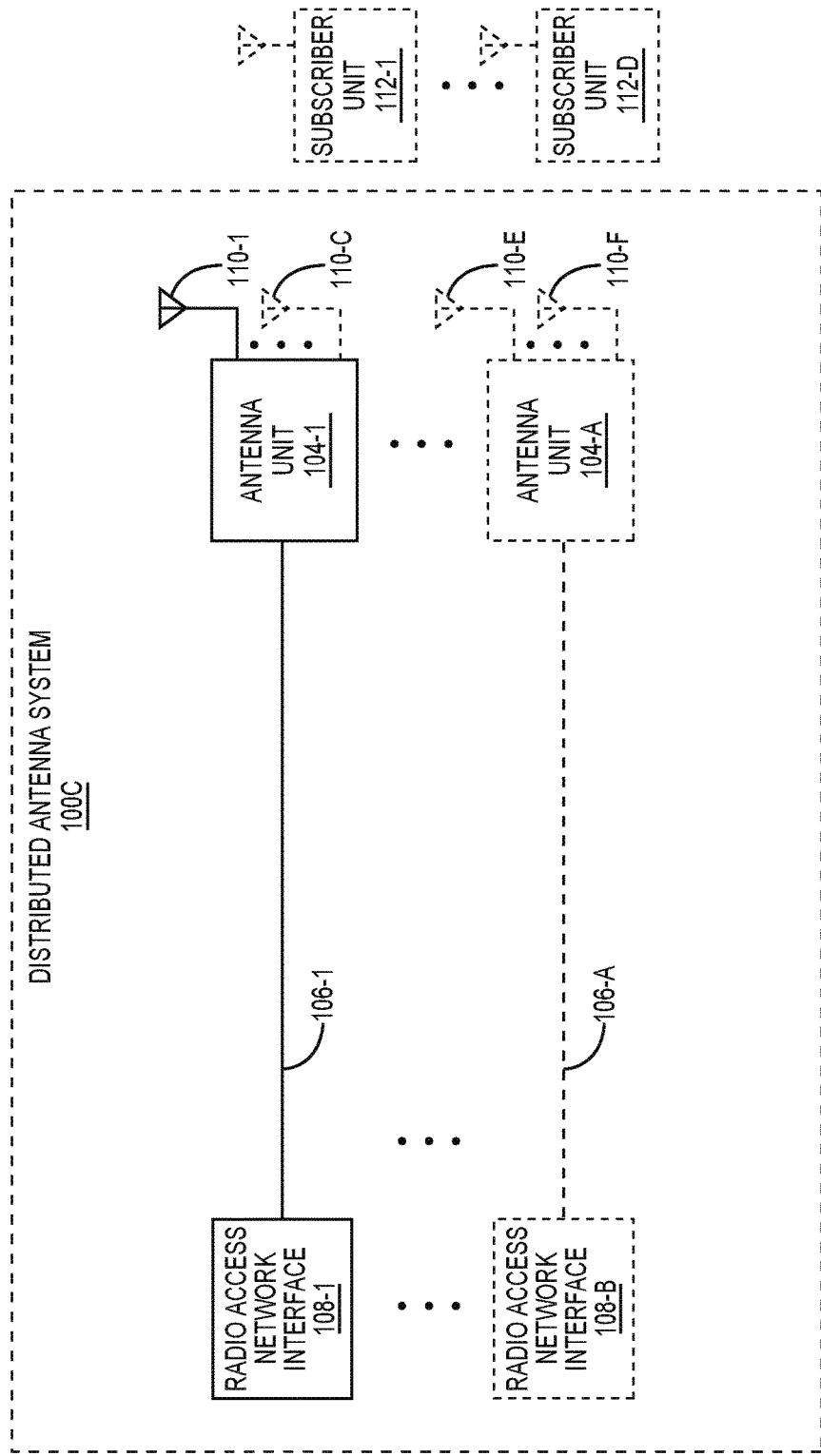

FIG. 1C is a block diagram of an exemplary embodiment of a distributed antenna system 100, distributed antenna system 100C. Distributed antenna system 100C includes at least one radio access network interface 108 (such as radio access network interface 108-1 and any quantity of optional radio access network interfaces 108 through optional radio access network interface 108-B) and at least one antenna unit 104 (including antenna unit 104-1 and any quantity of optional antenna units 104 through optional antenna unit 104-A). Distributed antenna system 100C includes some components similar to components of distributed antenna system 100A and operates according to similar principles and methods as distributed antenna system 100A described above. The difference between distributed antenna system 100C and distributed antenna system 100A is that distributed antenna system 100C does not include a host unit 102 and the at least one radio access network interface 108 transports using the more efficient format directly to the at least one antenna units 104. The at least one radio access network interface 108 is communicatively coupled to the at least one antenna unit 104. In exemplary embodiments, a single radio access network interface 108 is communicatively coupled to a plurality of antenna units 104. In other exemplary embodiments, a plurality of radio access network interfaces 108 are communicatively coupled to a single antenna unit 104.

In exemplary embodiments of the forward path, the at least one radio access network (RAN) interface 108 is configured to transport (either directly or through other components of the distributed antenna system 100C) the more efficient format (such as DAS MAC PDUs) to the at least one antenna unit 104 across the at least one digital communication link 106, rather than having a host unit 102 convert to the more efficient format (such as DAS MAC PDUs) from a less efficient format (such as baseband IQ pairs). Similarly in exemplary embodiments of the reverse path, the at least one radio access network (RAN) interface 108 is configured to receive (either directly or through other components of the distributed antenna system 100C) the more efficient format (such as DAS MAC PDUs) from the at least one antenna unit 104 across the at least one digital communication link 106, rather than having a host unit convert from the more efficient format (such as DAC MAC PDUs) to the less efficient format (such as baseband IQ pairs) in-between the radio access network interface 108 and the antenna unit 104.

Each antenna unit 104 is communicatively coupled to the at least one radio access network interface 108 across a digital communication link 106. Specifically, antenna unit 104-1 is communicatively coupled to the radio access network interface 108-1 across digital communication link 106-1 and optional antenna unit 104-A is communicatively coupled to the radio access network interface 108-B across digital communication link 106-A. In exemplary embodiments, some or all of the digital communication links 106 are wired digital communication links, such as fiber optic cabling, coaxial cabling, twisted pair cabling, etc. In exemplary embodiments, some or all of the digital communication links 106 are wireless digital communication links. Each antenna unit 104 includes components for converting, in the forward path, the wireless network information from the more efficient format (such as DAS MAC PDUs) for transport across the at least one digital communication link 106 to radio frequency, for transmission wirelessly using the at least one antenna 110. Each antenna unit 104 also includes components for converting, in the reverse path, the wireless network information from radio frequency received wirelessly using the at least one antenna 110 to the more efficient format (such as DAS MAC PDUs) for transport across the at least one digital communication link 106 to the at least one radio access network interface 108.

Figure 1D:
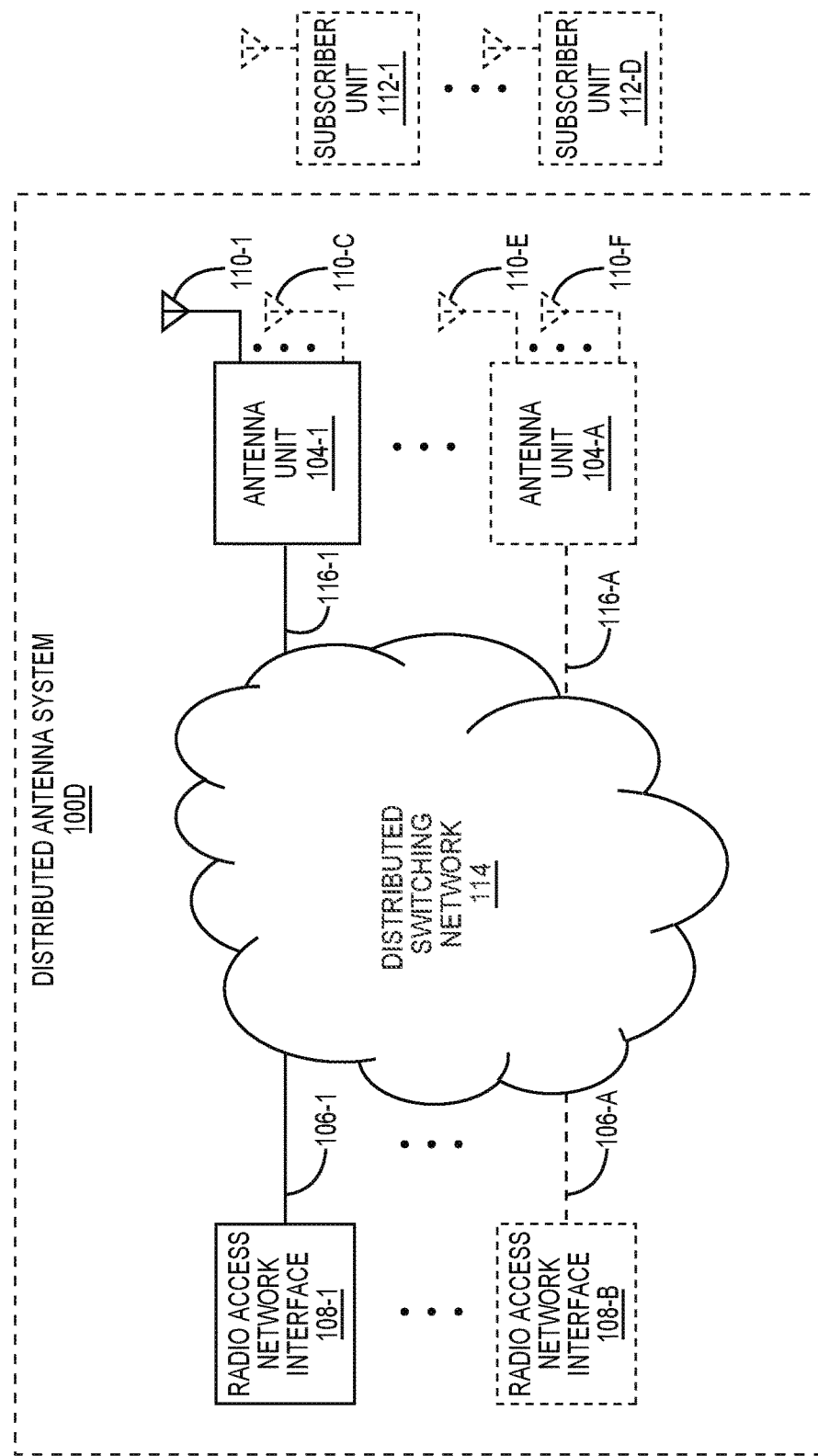

FIG. 1D is a block diagram of an exemplary embodiment of a distributed antenna system 100, distributed antenna system 100D. Distributed antenna system 100D includes at least one radio access network interface 108 (including radio access network interface 108-1 and any quantity of optional radio access network interfaces 108 through optional radio access network interfaces 108-B) and at least one antenna unit 104 (including antenna unit 104-1 and any quantity of optional antenna units 104 through optional antenna unit 104-A). Distributed antenna system 100D includes similar components to distributed antenna system 100C and operates according to similar principles and methods as distributed antenna system 100C described above. The difference between distributed antenna system 100D and distributed antenna system 100C is that distributed antenna system 100D includes a distributed switching network 114. Distributed switching network 114 couples the at least one radio access network interface 108 with the at least one antenna unit 104. Distributed switching network 114 may include one or more distributed antenna switches (such as a DAS expansion unit and/or an Ethernet switch) or other intermediary components/nodes that functionally distribute downlink signals from the at least one radio access network interface 108 to the at least one antenna unit 104. Distributed switching network 114 also functionally distributes uplink signals from the at least one antenna unit 104 to the at least one radio access network interface 108. In exemplary embodiments, the distributed switching network 114 can be controlled by a separate controller or another component of the system. In exemplary embodiments the switching elements of the distributed switching network 114 are controlled either manually or automatically. In exemplary embodiments, the routes can be pre-determined and static. In other exemplary embodiments, the routes can dynamically change based on time of day, load, or other factors.

Each antenna unit 104 is communicatively coupled to the distributed switching network 114 across a digital communication link 116. Specifically, antenna unit 104-1 is communicatively coupled to the distributed switching network 114 across digital communication link 116-1 and optional antenna unit 104-A is communicatively coupled to the distributed switching network 114 across optional digital communication link 116-A. In exemplary embodiments, some or all of the digital communication links 116 are wired digital communication links, such as fiber optic cabling, coaxial cabling, twisted pair cabling, etc. In exemplary embodiments, some or all of the digital communication links 116 are wireless digital communication links. In exemplary embodiments, each antenna unit 104 includes components configured for extracting at least one downlink data stream from an aggregate downlink data stream and components configured for aggregating at least one uplink data stream into an aggregate uplink data stream as well as at least one radio frequency converter configured to convert between at least one data stream and at least one radio frequency band and at least one antenna 110 configured to transmit and receive signals in the at least one radio frequency band to at least one subscriber unit 112.

Figure 2A:
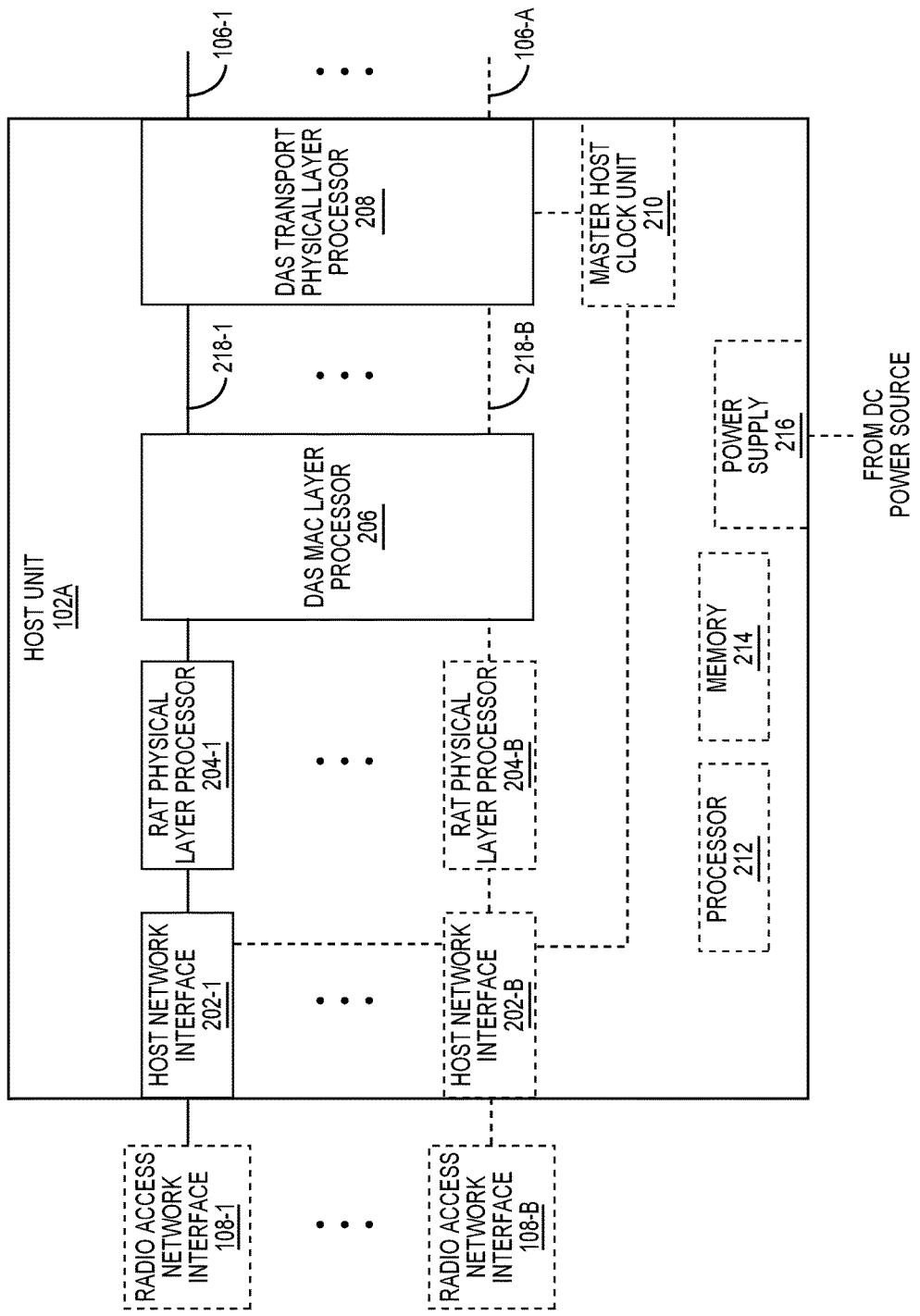
FIGS. 2A-2B are block diagrams of exemplary embodiments of host units used in distributed antenna systems, such as the exemplary distributed antenna systems in FIGS. 1A-1B.
Figure 2B:
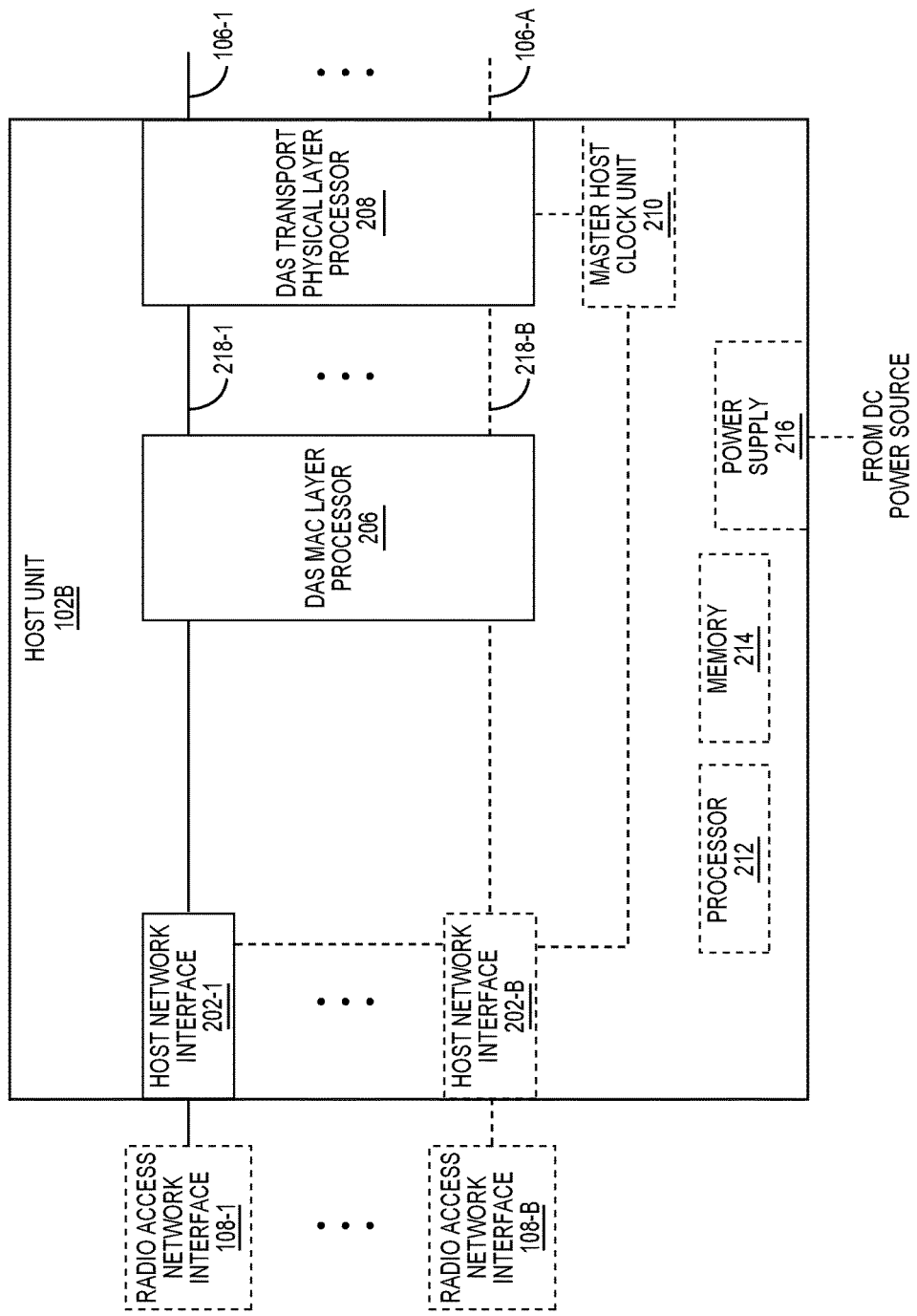

FIGS. 2A-2B are block diagrams of exemplary embodiments of host unit 102. Each of FIGS. 2A-2B illustrates a different embodiment of a host unit 102, labeled 102A-102B respectively.

FIG. 2A is a block diagram of an exemplary embodiment of a host unit 102, host unit 102A, used in distributed antenna systems, such as the exemplary distributed antenna systems 100 described above. Exemplary host unit 102A includes at least one host network interface 202 (including host network interface 202-1 and any quantity of optional host network interfaces 202 through optional host network interface 202-B), at least one physical layer processor 204 (including physical layer processor 204-1 and any quantity of optional physical layer processors 204 through optional physical layer processor 204-B), a distributed antenna system (DAS) medium access control (MAC) layer processor 206, a distributed antenna system (DAS) transport physical layer processor 208, an optional master host clock unit 210, an optional processor 212, optional memory 214, and an optional power supply 216. In exemplary embodiments, the at least one physical layer processor 204 is a radio access technology (RAT) physical layer processor, such as an LTE physical layer processor or another type of RAT physical layer processor. In exemplary embodiments, the DAS transport physical layer processor 208 is an Ethernet physical layer processor. In other embodiments, the DAS transport physical layer processor 208 is another type. In exemplary embodiments, the host network interfaces 202, the physical layer processors 204, the distributed antenna system medium access control layer processor 206, the DAS transport physical layer processor 208 and/or master host clock unit 210 are implemented in whole or in part by optional processor 212 and memory 214. In exemplary embodiments, power supply 216 provides power for the various components of the host unit 102A. In exemplary embodiments, the physical layer processors 204 are LTE physical layer processors because the signals received from the corresponding host network interfaces 202 are LTE physical layer signals. In exemplary embodiments, some of the physical layer processors 204 are physical layer processors for radio access technologies other than LTE and the physical layer signals received from the corresponding host network interfaces 202 are for these other radio access technologies. In exemplary embodiments, no physical layer processors 204 are included with some corresponding host network interfaces 202 that receive signals that are not physical layer signals. In exemplary embodiments, combinations of LTE physical layer processors 204, other radio access technology physical layer processors 204, and no physical layer processors 204 are included in host unit 102A. In exemplary embodiments, the host unit 102 provides/distributes power to at least a first of the at least one antenna unit 104.

In the forward path, each host network interface 202 receives downlink wireless network information transported in another format from a respective radio access network interface 108 and converts the downlink wireless network information from the another format to the baseband downlink wireless network information type. In exemplary embodiments, the purpose of the host network interface 202 is to convert the data form the format used by the base station into a format acceptable to the RAT physical layer processor 204. In exemplary embodiments, at least some of the host network interfaces 202 communicate using digital signals with the radio access network interfaces 108. In exemplary embodiments, at least some of the host network interfaces 202 communicate using analog signals (such as radio frequency (RF) and/or intermediate frequency (IF) analog signals) with the radio access network interfaces 108. In exemplary embodiments, a host network interface 202 is connected to an analog radio access network interface 108, such as a small cell, and the host exchanges analog RF with the analog radio access network interface 108 and the host 102A includes a digital front end (such as within the host network interface 202 or between the host network interface 202 and the RAT physical layer processor 204) to convert between the RF and the stream of bits exchanged with the RAT physical layer processor 204.

In specific implementations, at least one host network interface 108 receives Common Public Radio Interface (CPRI) signals from a CPRI interface of a base band unit acting as the radio access network interface 108, converts the CPRI signals into a format compatible with the RAT physical layer processor. In one embodiment of a CPRI interface, the data is in an LTE PHY format and has already been coded, modulated, and fully processed according to the LTE PHY specifications. It is an I/Q stream coming from the radio access network interface 108. The LTE PHY processor (RAT physical layer processor 204-1) in the host unit 102A would basically undo the LTE PHY processing that was done by the BBU (radio access network interface 108). The LTE physical layer data (RAT physical layer data) is translated into the LTE MAC PDUs (RAT MAC PDUs) by the LTE PHY processor (RAT physical layer processor 204). The DAS MAC (transport medium access control (MAC) processor 206), which may be implemented as an FPGA, determines what to do with these LTE MAC PDUs (RAT MAC PDUs) including how to frame them, format them, and put them into their own structure that is required for transport over the digital communication medium 106 (such as Category building cable or other lower bandwidth cable).

In the reverse path, each host network interface 202 receives uplink wireless network information in the RAT physical format and converts them into a format for communication with the respective radio access network interface 108. In specific implementations, at least one host network interface 108 receives uplink physical layer data signals and converts the uplink physical layer data signals into uplink CPRI signals and communicates the CPRI signals to the at least one radio access network interface 108.

In the forward path, each physical layer processor 204 receives downlink physical layer data signals and converts the downlink physical layer data signals in the physical layer to downlink medium access control (MAC) layer protocol data units (PDUs) in the medium access control (MAC) layer, wherein the medium access control layer uses relevant bits more efficiently than the physical layer. In the reverse path, each physical layer processor 204 receives uplink RAT MAC layer protocol data units in the RAT MAC layer and converts the uplink RAT MAC layer PDUs to uplink physical layer data signals.

In exemplary embodiments, the physical layer processor 204 in the host unit 102 performs functions similar to a user equipment (UE) device in that it receives the RAT physical signals and reverses the physical processor performed by the radio access network. In the uplink the physical layer processor 204 in the host unit 102 creates an uplink physical signal representation of the wireless network information such that the radio access network to which the host unit 102 is connected through the radio access network interface 108 can perform its normal uplink processing. In exemplary embodiments, the DAS processing is transparent to the radio access network interface 108 and the radio access network generally as well as the user equipment (UE).

In the forward path, the DAS MAC layer processor 206 converts the downlink RAT MAC PDUs in the RAT MAC into downlink distributed antenna system (DAS) transport medium access control (MAC) layer protocol data units (PDUs) in a downlink distributed antenna system (DAS) transport medium access control (MAC) layer for transport through the distributed antenna system (DAS). In the reverse path, the DAS MAC layer processor 206 converts the uplink distributed antenna system (DAS) transport medium access control (MAC) layer protocol data units (PDUs) in an uplink distributed antenna system (DAS) transport medium access control (MAC) layer into uplink medium access control (MAC) layer protocol data units (PDUs) in the medium access control (MAC) layer. In exemplary embodiments, the DAS MAC layer processor 206 also broadcasts signals to a plurality of different remote antenna units 104. In exemplary embodiments, the DAS MAC layer processor 206 also combines uplink DAS transport MAC layer PDUs from different antenna units 104 in an intelligent way. In exemplary embodiments, multiple received uplink data streams are combined using summation (either digital or analog), weighted summation, averaging, multiplexing, etc. In exemplary embodiments, combining in the upstream occurs by recovering the RAT MAC PDUs (such as LTE MAC PDUs) for all the signals to be combined and then having a plurality of RAT physical layer processors 204 (such as LTE PHY processors) individually process the signals from RAT MAC PDUs (such as LTE MAC PDUs) into I/Q samples, which are then digitally combined in a combiner that may be within a host network interface 202 or in between the RAT physical layer processors 204 and a host network interface 202. In other embodiments, the DAS MAC PDUs from the multiple remote units 104 are combined bitwise by the DAS MAC processor 206. In exemplary embodiments, the combining is done through majority logic and/or weighted combining. In exemplary embodiments, all the signals need to be synchronized so the host unit 102A knows which bit goes with which bit and so the combining results in accurate data. In exemplary embodiments, the antenna units 104 are synchronized with the host unit 102. In exemplary embodiments, the DAS MAC layer processor 206 determines whether multiple antenna units 104 received signals from a particular remote/subscriber unit 112 and whether there is valid data coming from multiple antenna units 104. If there is valid data coming from multiple antenna units 104, the DAS MAC layer processor 206 will combine the bits. Because there are RAT physical layer processors 406 (such as LTE PHY processors) at the antenna units 104 (described below), the RAT physical layer processors 406 at the antenna units 104 could generate quality measurements, such as a signal to noise ratio (SNR), modulation quality, etc. and then feedback the quality metrics to the host unit 102A to use in weighing and combining of the signals.

In the forward path, the DAS transport physical layer processor 208 converts the downlink DAS transport MAC layer PDUs in the downlink DAS transport MAC layer into downlink DAS physical layer data streams in the DAS physical layer and communicates the downlink DAS physical layer data streams across the at least one digital communication medium 106 to the at least one antenna unit 104. In the reverse path, the DAS transport physical layer processor 208 receives uplink DAS physical layer data streams in the DAS physical layer from the at least one digital communication medium 106 and converts the uplink DAS physical layer data streams into uplink DAS transport MAC layer PDUs in the uplink DAS transport MAC layer.

In exemplary embodiments, the antenna units 104 are synchronized with each other and/or the host unit 102. In exemplary embodiments, the antenna units 104 and/or the host unit 102 are synchronized based on a clock signal propagated from the host unit 102 that is generated from a signal received by the host unit 102 from the radio access network interface 108 (such as a baseband unit BBU and/or small cell) so the network synchronization of the radio access network interface 108 (such as a baseband unit BBU and/or small cell) is propagated through to the various components of the distributed antenna system 100. In exemplary embodiments, the master host clock unit 210 extracts the master reference clock from a signal supplied by at least one radio access network interface 108. In exemplary embodiments, the master clock unit 210 distributes the master reference clock to other components of the distributed antenna system 100 in the downlink. In exemplary embodiments, the master host clock unit 210 distributes this master clock with other radio access network interfaces 108 through the corresponding host network interfaces 202. In exemplary embodiments (such as those where the radio access network interface is an analog radio frequency interface), the master host clock unit 210 generates a master reference clock and distributes the generated master reference clock with radio access network interfaces 108 through the corresponding host network interfaces 202.

FIG. 2B is a block diagram of an exemplary embodiment of a host unit 102, host unit 102B, used in distributed antenna systems, such as the exemplary distributed antenna systems 100 described above. Exemplary host unit 102B includes at least one host network interface 202 (including host network interface 202-1 and any quantity of optional host network interfaces 202 through optional host network interface 202-B), a distributed antenna system (DAS) medium access control (MAC) layer processor 206, an DAS transport physical layer processor 208, an optional master host clock unit 210, an optional processor 212, optional memory 214, and an optional power supply 216. In exemplary embodiments, the host network interfaces 202, the DAS MAC layer processor 206, the DAS transport physical layer processor 208 and/or master host clock unit 210 are implemented in whole or in part by optional processor 212 and memory 214. In exemplary embodiments, power supply 216 provides power for the various components of the host unit 102B. Host unit 102B includes similar components to host unit 102A and operates according to similar principles and methods as host unit 102A described above.

The difference between host unit 102B and host unit 102A is that host unit 102B does not include any RAT physical layer processors 204. In exemplary embodiments, the LTE PHY processor (RAT physical layer processor 204) is not necessary in the host unit 102A because the host unit 102A receives the LTE MAC PDUs (RAT MAC PDUs) directly from the baseband unit (BBU, such as radio access network interface 108). In exemplary embodiments, this may require changes to the baseband unit (BBU, such as radio access network interface 108) to allow output of the LTE MAC PDUs (RAT MAC PDUs) instead of the I/Q stream. In exemplary embodiments, the RAT physical layer processor 204 is not included and/or bypassed with some signals so that I/Q samples are transmitted through the distributed antenna system 100 instead of the MAC PDUs. In exemplary embodiments, this is useful with other radio access technologies (RAT) that do not require as much bandwidth for transport using I/Q baseband samples as LTE. Accordingly, I/Q samples could be packed into a DAS physical layer compatible frame. In exemplary embodiments, this enables data represented in IQ space to be transported directly instead of translating it into the MAC PDUs for transport. The benefit of this approach is that the distributed antenna system 100 can be radio access technology (RAT) agnostic. This could be more useful with less bandwidth hungry wireless access technology protocols, such as 2G and/or 3G radio access technologies (RAT). In exemplary embodiments, this approach is less complicated because it does not require the additional LTE PHY processors in both the host unit 102 and antenna units 104. In exemplary embodiments, some signals go through a RAT physical layer processor 204 and are converted into MAC PDUs, while others remain as I/Q samples, but all the signals can be multiplexed together and transported through the distributed antenna system 100. This enables inputs from different sources to be used while sharing a single cable. In exemplary embodiments, there is some framing within the payload with both MAC PDUs and synchronous I/Q samples.

Accordingly and in the forward path, the DAS MAC layer processor 206 converts the downlink RAT MAC data signals in the MAC layer into downlink distributed antenna system (DAS) transport medium access control (MAC) layer protocol data units (PDUs) in a downlink distributed antenna system (DAS) transport medium access control (MAC) layer for transport through the distributed antenna system (DAS). In the reverse path, the DAS MAC layer processor 206 converts the uplink distributed antenna system (DAS) transport medium access control (MAC) layer protocol data units (PDUs) in an uplink distributed antenna system (DAS) transport medium access control (MAC) layer into RAT MAC layer data signals in the MAC layer. This host unit 102B could be used in exemplary embodiments where the radio access network interface 108 communicates RAT MAC PDUs directly with the host network interface 202, so it is not necessary to perform any physical RAT layer processing to get the wireless network information into the more efficient format. This host unit 102B could also be used in exemplary embodiments where it is not necessary to undo any physical RAT layer processing even though the signals received from the radio access network interface 108 have had physical RAT layer processing, because the physical RAT layer processing is efficient enough. In exemplary embodiments, combinations of host unit 102A and host unit 102B allow for some wireless network information to have the physical RAT layer processing undone using a physical layer processor and others to not have it undone, so a physical layer processor 204 is not necessary.

FIGS. 3A-3J are block diagrams of exemplary embodiments of base station host network interfaces 302 used in distributed antenna systems, such as the exemplary distributed antenna systems 100 described above. Each of FIGS. 3A-3J illustrates a different embodiment of a type of host network interface 202, labeled 104A-104D respectively.

Figure 3A:
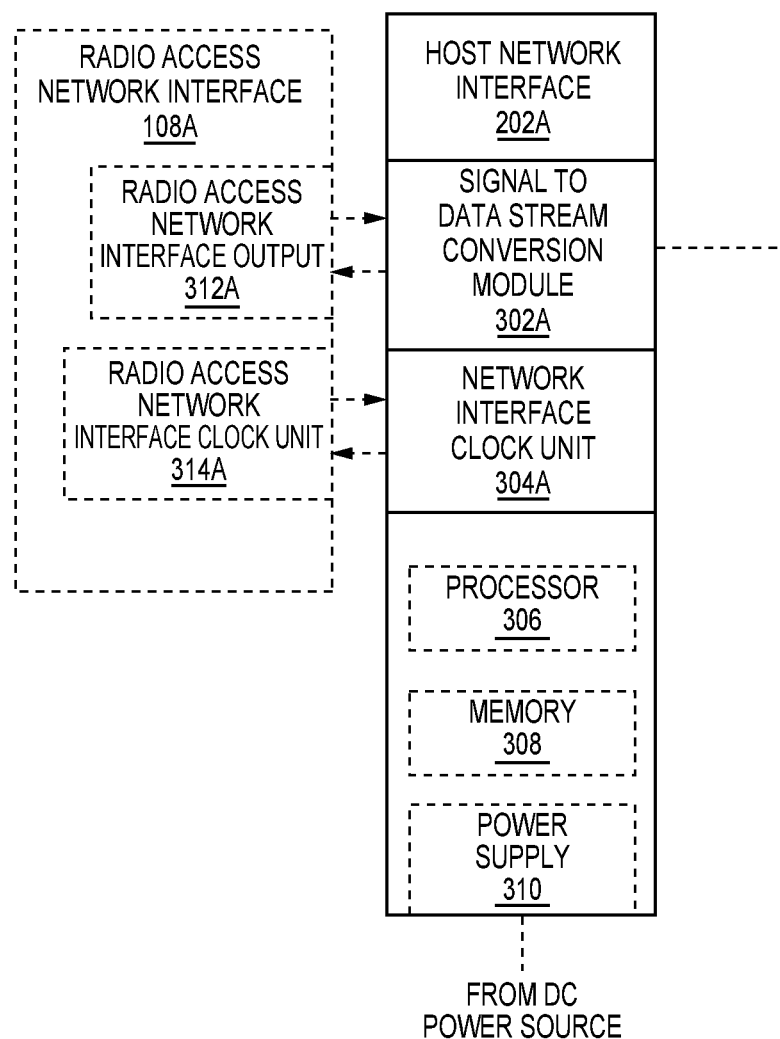
FIGS. 3A-3J are block diagrams of exemplary embodiments of host network interfaces used in host units of distributed antenna systems, such as the exemplary distributed antenna hosts in FIGS. 2A-2B.

FIG. 3A is a block diagram of an exemplary embodiment of a host network interface 202, general host network interface 202A. General host network interface 202A includes signal to data stream conversion module 302A, network interface clock unit 304A, optional processor 306, optional memory 308, and optional power supply 310. In exemplary embodiments, signal to data stream conversion module 302A is communicatively coupled to a radio access network interface output 312A of a radio access network interface 108A. Signal to data stream conversion module 302A is also communicatively coupled to at least physical layer processor 204. In exemplary embodiments, the signal to data stream conversion module 302A and/or the network interface clock unit 304A are implemented using optional processor 306 and optional memory 308. In exemplary embodiments, the optional power supply 310 provides power to the various elements of the host network interface 202A.

In the downlink, signal to data stream conversion module 302A is configured to receive downlink signals from the radio access network interface output 312A of the radio access network interface 108A. The signal to data stream conversion module 302A is further configured to convert the received downlink signals to a downlink data stream. In the uplink, signal to data stream conversion module 302A is configured to receive an uplink data stream from an physical layer processor 204. The signal to data stream conversion module 302A is further configured to convert the uplink data stream to uplink signals. Signal to data stream conversion module 302A is further configured to communicate the uplink signals to the radio access network interface output 312A of the radio access network interface 108A.

In exemplary embodiments, the network interface clock unit 304A is communicatively coupled to a radio access network interface clock unit 314A of the radio access network interface 108A. In exemplary embodiments, a master reference clock is provided from the radio access network interface clock unit 314A of the radio access network interface 108A to the network interface clock unit 304A of the host network interface 202A. In other exemplary embodiments, a master reference clock is provided to the radio access network interface clock unit 314A of the radio access network interface 108A from the network interface clock unit 304A of the host network interface 202A.

Figure 3B:
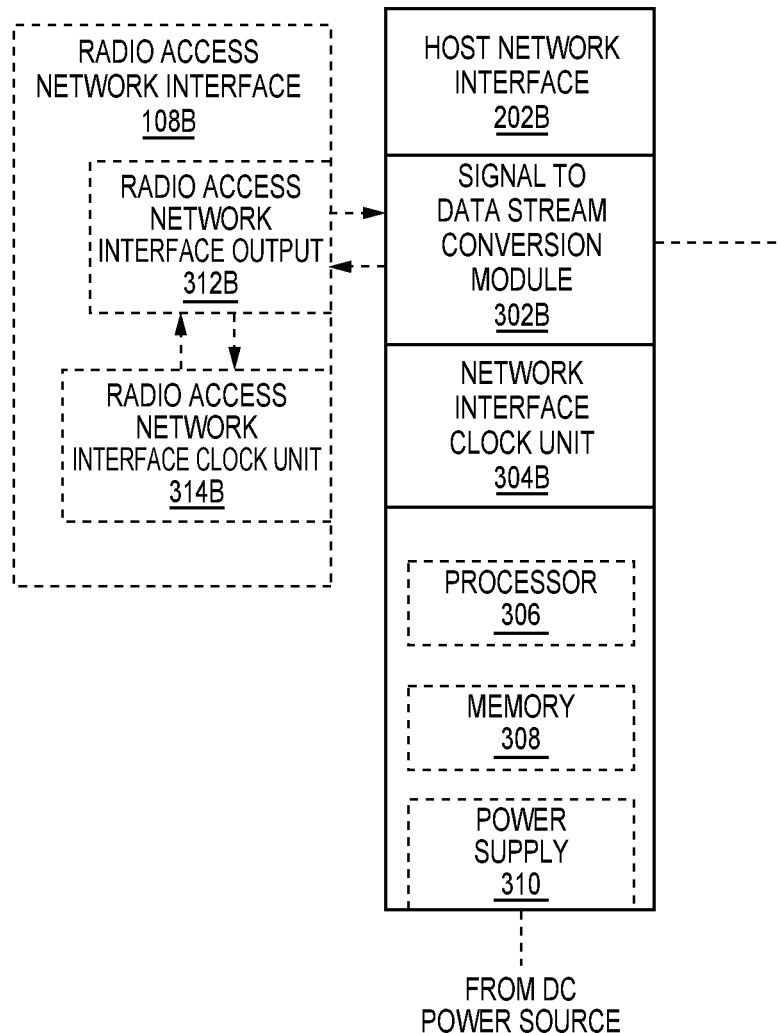

FIG. 3B is a block diagram of an exemplary embodiment of a type of base station interface 102, general host network interface 202B. General host network interface 202B includes signal to data stream conversion module 302B, network interface clock unit 304B, optional processor 306, optional memory 308, and optional power supply 310. Similarly to general host network interface 202A, signal to data stream conversion module 302B is communicatively coupled to a radio access network interface output 312B of a radio access network interface 108B. In contrast to general host network interface 202A, base station network interface clock unit 304B is not coupled directly to radio access network interface clock unit 314B of radio access network interface 108B to provide the master reference clock to the network interface clock unit 304B. Instead, radio access network interface clock unit 314B provides the master reference clock to the radio access network interface output 312B and the master reference clock is embedded in the downstream signal from the radio access network interface output 312B to the signal to data stream conversion module 302B of the host network interface 202B, which then provides it to the network interface clock unit 304B.

In exemplary embodiments where the master reference clock is provided from an radio access network interface 108B to the distributed antenna system 100, the master reference clock can be embedded in the downlink signals by the radio access network interface clock unit 314B so that the downlink signals communicated from the radio access network interface output 312B of the radio access network interface 108B to the signal to data stream conversion module 302B can be extracted by the network interface clock unit 304B and distributed as appropriate within the host network interface 202B and the distributed antenna system 100 generally. In exemplary embodiments, the signal to data stream conversion module 302B and/or the network interface clock unit 304B are implemented using optional processor 306 and optional memory 308. In exemplary embodiments, the optional power supply 310 provides power to the various elements of the host network interface 202B.

Figure 3C:
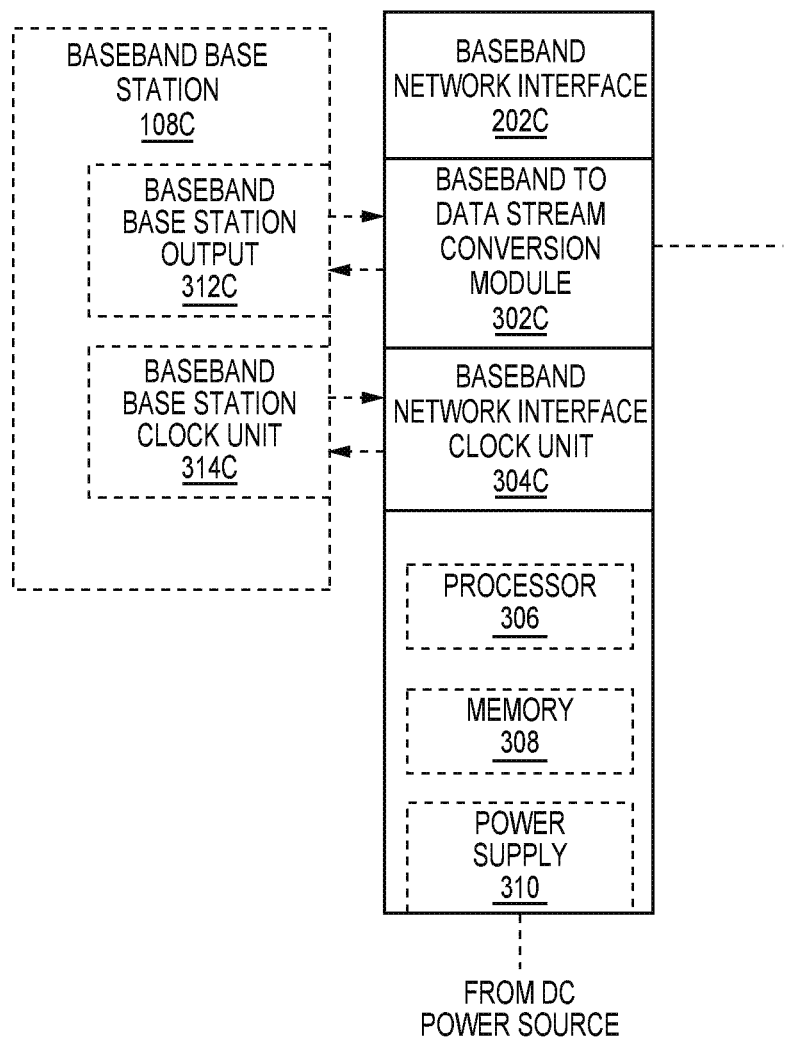

FIG. 3C is a block diagram of an exemplary embodiment of a type of host network interface 202, baseband host network interface 202C. Baseband host network interface 202C includes a baseband to data stream conversion module 302C, a baseband network interface clock unit 304C, an optional processor 306, optional memory 308, and an optional power supply 310. In exemplary embodiments, baseband to data stream conversion module 302C is communicatively coupled to a baseband base station output 312C of a radio access network interface that is a baseband base station 108C. Baseband to data stream conversion module 302C is also communicatively coupled to at least one physical layer processor 204. In exemplary embodiments, the baseband to data stream conversion module 302C and/or the baseband network interface clock unit 304C are implemented using optional processor 306 and optional memory 308. In exemplary embodiments, the optional power supply 310 provides power to the various elements of the baseband host network interface 202C.

In the downlink, baseband to data stream conversion module 302C is configured to receive baseband mobile wireless access signals (such as I/Q data) from a baseband base station output 312C of a baseband base station 108C. The baseband to data stream conversion module 302C is further configured to convert the received baseband mobile wireless access signals to a downlink data stream. In the uplink, baseband to data stream conversion module 302C is configured to receive a data stream from physical layer processor 204. The baseband to data stream conversion module 302C is further configured to convert the uplink data stream to uplink baseband wireless access signals. Baseband to data stream conversion module 302C is further configured to communicate the uplink baseband wireless access signals to the baseband base station output 312C.

In exemplary embodiments, the baseband network interface clock unit 304C is communicatively coupled to a baseband base station clock unit 314C of the baseband base station 108C. In exemplary embodiments, a master reference clock is provided from the baseband base station clock unit 314C of the baseband base station 108C to the baseband network interface clock unit 304C of the baseband host network interface 202C. In exemplary embodiments, a master reference clock is provided to the baseband base station clock unit 314C of the baseband base station 108C from the baseband network interface clock unit 304C of the baseband host network interface 202C.

Figure 3D:
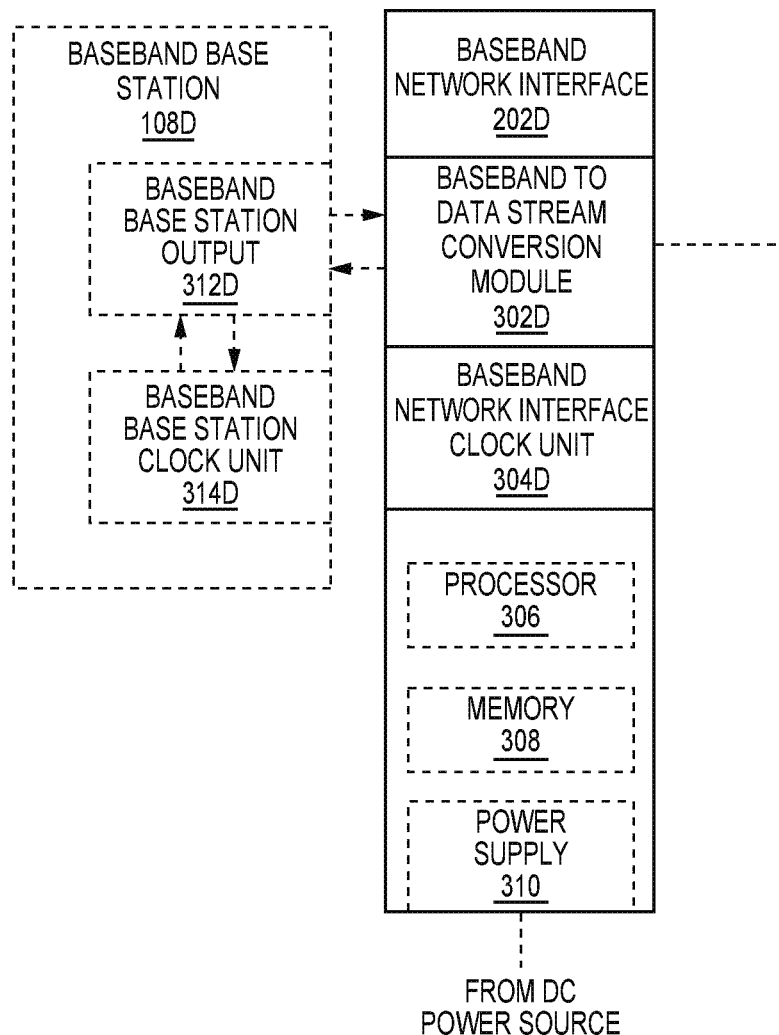

FIG. 3D is a block diagram of an exemplary embodiment of a type of base station interface 102, baseband network interface 202D. Baseband network interface 202D includes a baseband to data stream conversion module 302D, a baseband network interface clock unit 304D, an optional processor 306, optional memory 308, and an optional power supply 310. Similarly to baseband host network interface 202C, baseband to data stream conversion module 302D is communicatively coupled to a baseband base station output 312D of a radio access network interface that is a baseband base station 108D and to at least one physical layer processor 204. In contrast to baseband host network interface 202C, baseband network interface clock unit 304D is not coupled directly to baseband base station clock unit 314D of baseband base station 108D to provide and/or receive the master reference clock to/from the baseband base station 108D. Instead, baseband base station output 312D provides the master reference clock to the baseband to data stream conversion module 302D and the master reference clock is embedded in downstream signals from the baseband base station output 312D of baseband base station 108D to the baseband to data stream conversion module 302D of the baseband network interface 202D.

In exemplary embodiments where the master reference clock is provided from the baseband base station 108D to the distributed antenna system, the master reference clock can be embedded in the downlink signals by the baseband base station clock unit 314D so that the downlink signals communicated from the baseband base station output 312D of the baseband base station 108D to the baseband to data stream conversion module 302D can be extracted by the baseband network interface clock unit 304D and distributed as appropriate within the baseband network interface 202D and the distributed antenna system generally. In exemplary embodiments, the baseband to data stream conversion module 302D and/or the baseband network interface clock unit 304D are implemented using optional processor 306 and optional memory 308. In exemplary embodiments, the optional power supply 310 provides power to the various elements of the baseband network interface 202D.

Figure 3E:
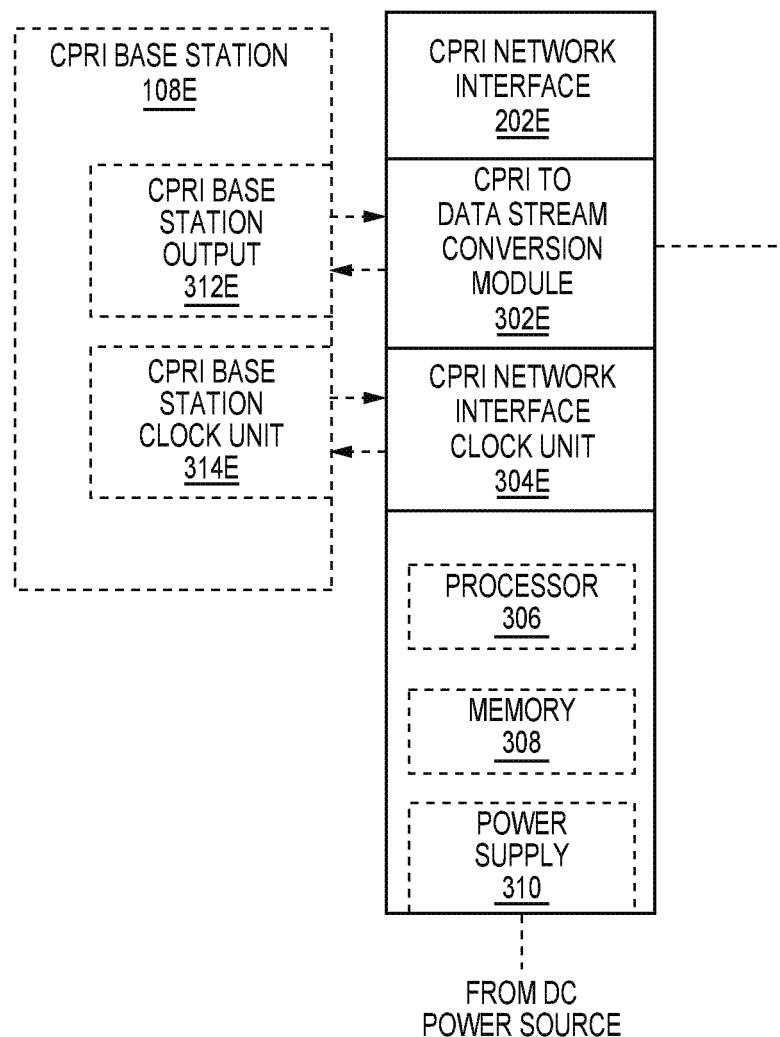

FIG. 3E is a block diagram of an exemplary embodiment of a type of host network interface 202, Common Public Radio Interface (CPRI) host network interface 202E. CPRI host network interface 202E includes a CPRI to data stream conversion module 302E, a CPRI network interface clock unit 304E, an optional processor 306, optional memory 308, and an optional power supply 310. In exemplary embodiments, CPRI to data stream conversion module 302E is communicatively coupled to a CPRI base station output 312E of a host network interface 202 that is a CPRI base station 108E. CPRI to data stream conversion module 302E is also communicatively coupled to at least one physical layer processor 204. In exemplary embodiments, the CPRI to data stream conversion module 302E and/or the CPRI network interface clock unit 304E are implemented using optional processor 306 and optional memory 308. In exemplary embodiments, the optional power supply 310 provides power to the various elements of the CPRI host network interface 202E.

In the downlink, CPRI to data stream conversion module 302E is configured to receive CPRI signals from the CPRI base station output 312E. The CPRI to data stream conversion module 302E is further configured to convert the received CPRI signals to a downlink data stream. In the uplink, CPRI to data stream conversion module 302G is configured to receive a data stream from physical layer processor 204. The CPRI to data stream conversion module 302E is further configured to convert the uplink data stream to uplink CPRI signals. CPRI to data stream conversion module 302E is further configured to communicate the uplink CPRI signal to the CPRI base station output 312E.

In exemplary embodiments, the CPRI network interface clock unit 304E is communicatively coupled to a CPRI base station clock unit 314E of the CPRI base station 108E. In exemplary embodiments, a master reference clock is provided from the CPRI base station clock unit 314E of the CPRI base station 108E to the CPRI network interface clock unit 304C of the CPRI host network interface 202E. In other exemplary embodiments, a master reference clock is provided to the CPRI base station clock unit 314E of the CPRI base station 108E from the CPRI network interface clock unit 304E of the CPRI host network interface 202E.

Figure 3F:
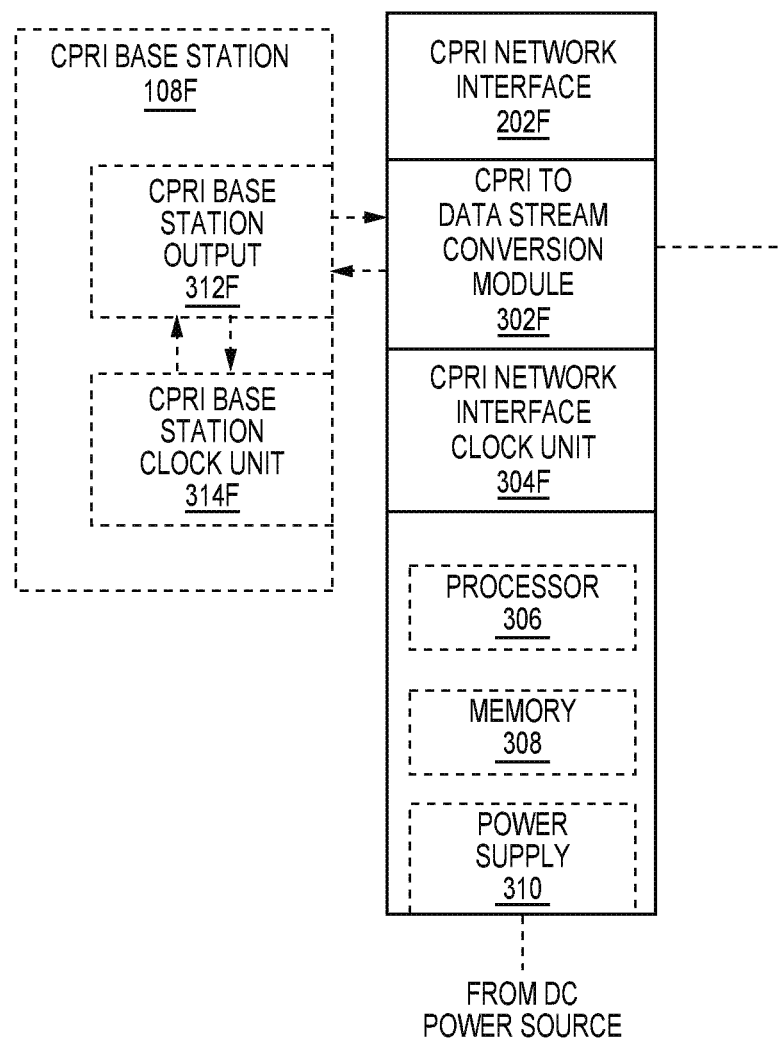

FIG. 3F is a block diagram of an exemplary embodiment of a type of base station interface 102, CPRI host network interface 202F. CPRI host network interface 202F includes a CPRI to data stream conversion module 302F, a CPRI network interface clock unit 304F, an optional processor 306, optional memory 308, and an optional power supply 310. Similarly to CPRI host network interface 202E, CPRI to data stream conversion module 302F is communicatively coupled to a CPRI base station output 312F of a radio access network interface 108 that is a CPRI base station 108F and to at least one physical layer processor 204. In contrast to CPRI host network interface 202E, CPRI network interface clock unit 304F is not coupled directly to CPRI base station clock unit 314E of CPRI base station 108F to provide and/or receive the master reference clock to/from the CPRI base station 108F. Instead, CPRI to data stream conversion module 302F provides the master reference clock to the CPRI host network interface 202F and the master reference clock is embedded in downstream signals from the CPRI base station output 312F of the CPRI base station 108F to the CPRI to data stream conversion module 302F of CPRI network interface 202F.

In exemplary embodiments where the master reference clock is provided from the CPRI base station 108F to the distributed antenna system 100, the master reference clock can be embedded in the downlink signals by the CPRI base station clock unit 314F so that the downlink signals communicated from the CPRI base station output 312F of the CPRI base station 108F to the CPRI to data stream conversion module 302F can be extracted by the CPRI network interface clock unit 304F and distributed as appropriate within the CPRI host network interface 202F and the distributed antenna system 100 generally. In exemplary embodiments, the CPRI to data stream conversion module 302F and/or the CPRI network interface clock unit 304F are implemented using optional processor 306 and optional memory 308. In exemplary embodiments, the optional power supply 310 provides power to the various elements of the CPRI host network interface 202F.

Figure 3G:
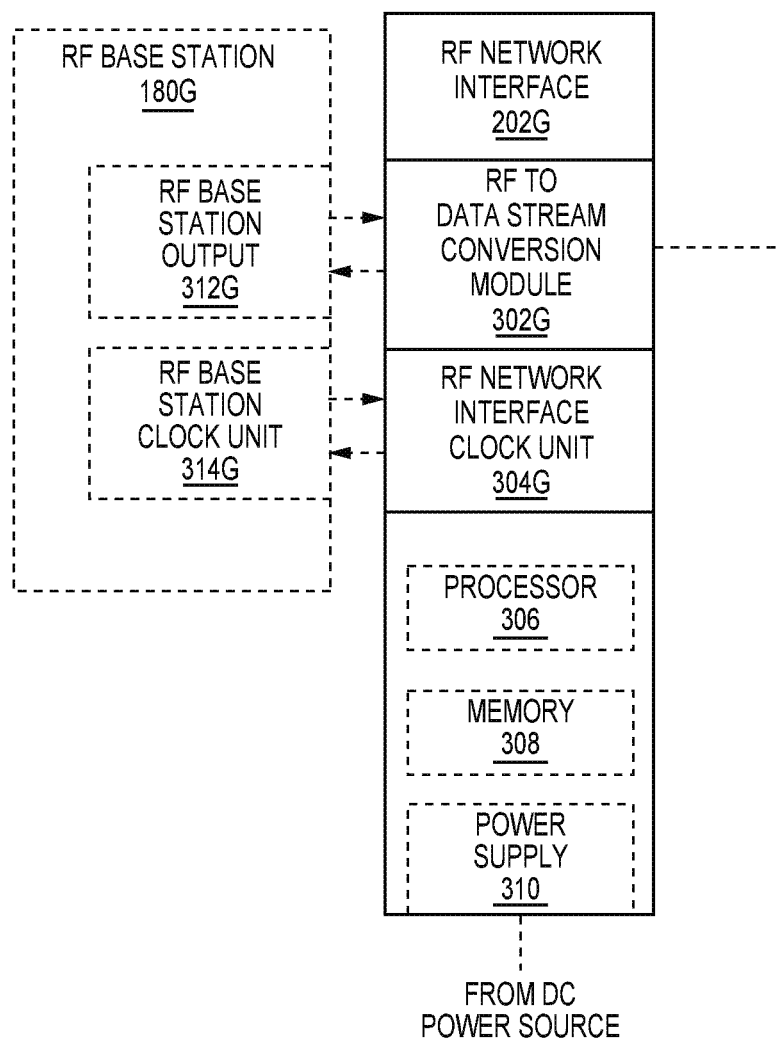

FIG. 3G is a block diagram of an exemplary embodiment of a type of host network interface 202, radio frequency (RF) host network interface 202G. Radio frequency host network interface 202G includes a radio frequency (RF) to data stream conversion module 302G, a radio frequency (RF) network interface clock unit 304G, an optional processor 306, optional memory 308, and an optional power supply 310. In exemplary embodiments, radio frequency (RF) to data stream conversion module 302G is communicatively coupled to a radio frequency (RF) base station output 312G of a radio access network interface that is a radio frequency base station 108G. Radio frequency to data stream conversion module 302G is also communicatively coupled to at least one physical layer processor 204. In exemplary embodiments, the radio frequency to data stream conversion module 302G and/or the radio frequency network interface clock unit 304G are implemented using optional processor 306 and optional memory 308. In exemplary embodiments, the optional power supply 310 provides power to the various elements of the radio frequency host network interface 202G.

In the downlink, radio frequency to data stream conversion module 302G is configured to receive radio frequency signals from the radio frequency base station output 312G of the radio frequency base station 108G. The radio frequency to data stream conversion module 302G is further configured to convert the received radio frequency signals to a downlink data stream. In exemplary embodiments, this is done using oscillators and mixers. In the uplink, radio frequency to data stream conversion module 302G is configured to receive a data stream from physical layer processor 204. The radio frequency to data stream conversion module is further configured to convert the uplink data stream to radio frequency signals. In exemplary embodiments, this is done using oscillators and mixers. Radio frequency to data stream conversion module 302G is further configured to communicate the uplink radio frequency signals to the radio frequency base station output 312G of the radio frequency base station 108G.

In exemplary embodiments, the radio frequency network interface clock unit 304G is communicatively coupled to a radio frequency base station clock unit 314G of the radio frequency base station 108G. In exemplary embodiments, a master reference clock is provided from the radio frequency base station clock unit 314G of the radio frequency base station 108G to the radio frequency network interface clock unit 304G of the radio frequency host network interface 202G. In other exemplary embodiments, a master reference clock is provided to the radio frequency base station clock unit 314G of the radio frequency base station 108G from the radio frequency network interface clock unit 304G of the host network interface 202G.

Figure 3H:
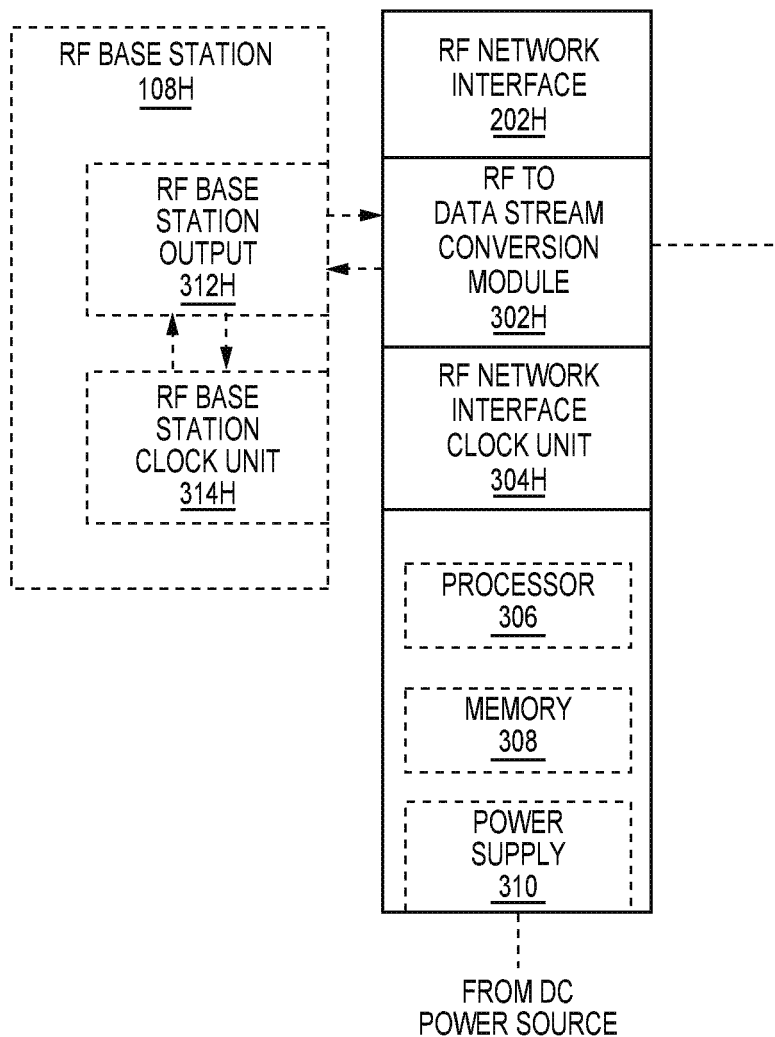

FIG. 3H is a block diagram of an exemplary embodiment of a type of base station interface 102, radio frequency (RF) host network interface 202H. Radio frequency host network interface 202H includes a radio frequency (RF) to data stream conversion module 202H, a radio frequency (RF) network interface clock unit 204H, an optional processor 306, optional memory 308, and an optional power supply 310. Similarly to radio frequency host network interface 202G, radio frequency (RF) to data stream conversion module 202H is communicatively coupled to a radio frequency (RF) base station output 212H of a radio access network interface 108 that is a radio frequency base station 108H and to at least one physical layer processor 204. In contrast to radio frequency host network interface 202G, radio frequency network interface clock unit 204H is not coupled directly to radio frequency base station clock unit 214H of radio frequency base station 108H to provide and/or receive the master reference clock to/from the radio frequency base station 108H. Instead, radio frequency to data stream conversion module 202H provides the master reference clock to the radio frequency network interface clock unit 304G and the master reference clock is embedded in downstream signals from the RF base station output 312H of the RF base station 108H to the RF to data stream conversion module 302H of the RF network interface 202H.

In exemplary embodiments where the master reference clock is provided from the radio frequency base station 108H to the distributed antenna system, the master reference clock can be embedded in the downlink signals by the radio frequency base station clock unit 214H so that the downlink signals communicated from the radio frequency base station output 212H of the radio frequency base station 108H to the radio frequency to data stream conversion module 202H can be extracted by the radio frequency network interface clock unit 204H and distributed as appropriate within the radio frequency host network interface 202H and the distributed antenna system 100 generally. In exemplary embodiments, the radio frequency to data stream conversion module 202H and/or the radio frequency network interface clock unit 204H are implemented using optional processor 306 and optional memory 308. In exemplary embodiments, the optional power supply 310 provides power to the various elements of the host network interface 202H.

Figure 3I:
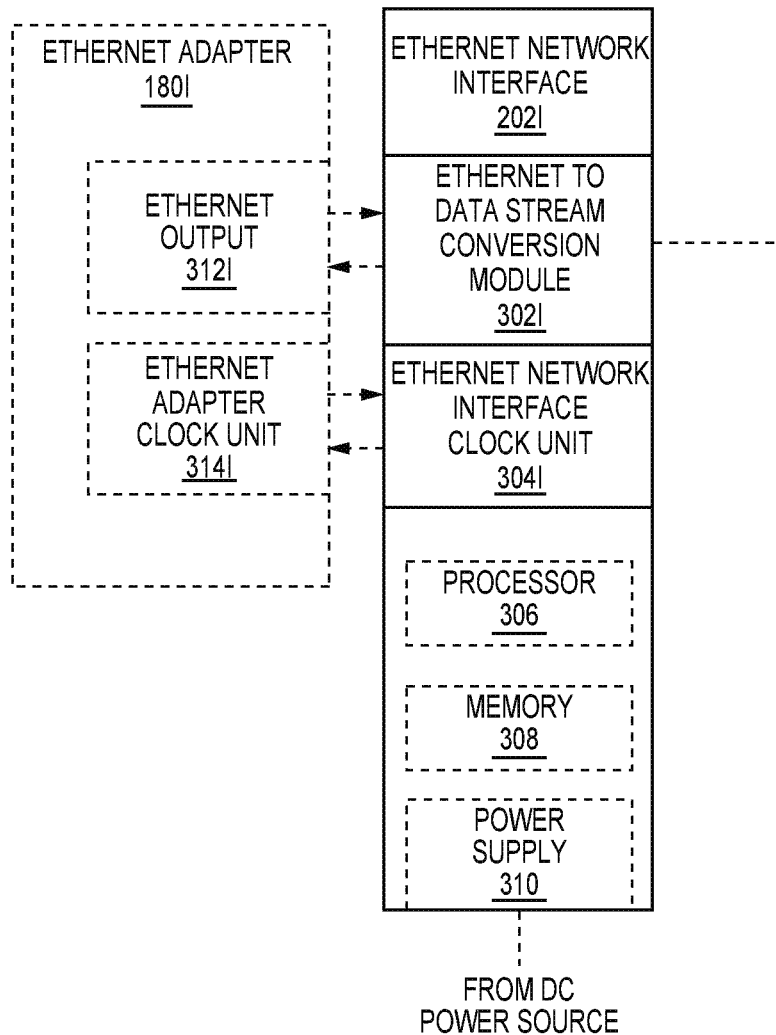

FIG. 3I is a block diagram of an exemplary embodiment of a type of host network interface 202, Ethernet network interface 202I. Ethernet network interface 202I includes an Ethernet to data stream conversion module 302I, an Ethernet network interface clock unit 304I, an optional processor 306, optional memory 308, and an optional power supply 310. In exemplary embodiments, Ethernet to data stream conversion module 302I is communicatively coupled to an Ethernet output 312I of an external device that is an Ethernet adapter 108I to an internet protocol (IP) based network. Ethernet to data stream conversion module 302I is also communicatively coupled to at least one physical layer processor 204. In exemplary embodiments, the Ethernet to data stream conversion module 302I and/or the Ethernet network interface clock unit 304I are implemented using optional processor 306 and optional memory 308. In exemplary embodiments, the optional power supply 310 provides power to the various elements of the Ethernet network interface 202I.

In the downlink Ethernet to data stream conversion module 302I is configured to receive internet protocol packets from the Ethernet output 312I. The Ethernet to data stream conversion module 302I is further configured to convert the internet protocol packets to a downlink data stream. In the uplink, Ethernet to data stream conversion module 302I is configured to receive a data stream from physical layer processor 204. The Ethernet to data stream conversion module 302I is further configured to convert the uplink data stream to uplink Ethernet frames. Ethernet to data stream conversion module 302I is further configured to communicate the uplink Ethernet frames to the Ethernet output 304I.

In exemplary embodiments, the Ethernet network interface clock unit 304I is communicatively coupled to an Ethernet adapter clock unit 314I of the Ethernet adapter 108I. In exemplary embodiments, a master reference clock is provided from the Ethernet adapter clock unit 314I of the Ethernet adapter 108I to the Ethernet network interface clock unit 304I of the Ethernet network interface 202I. In other exemplary embodiments, a master reference clock is provided to the Ethernet adapter clock unit 314I of the Ethernet adapter 108I from the Ethernet network interface clock unit 304I of the Ethernet network interface 202I.

Figure 3J:
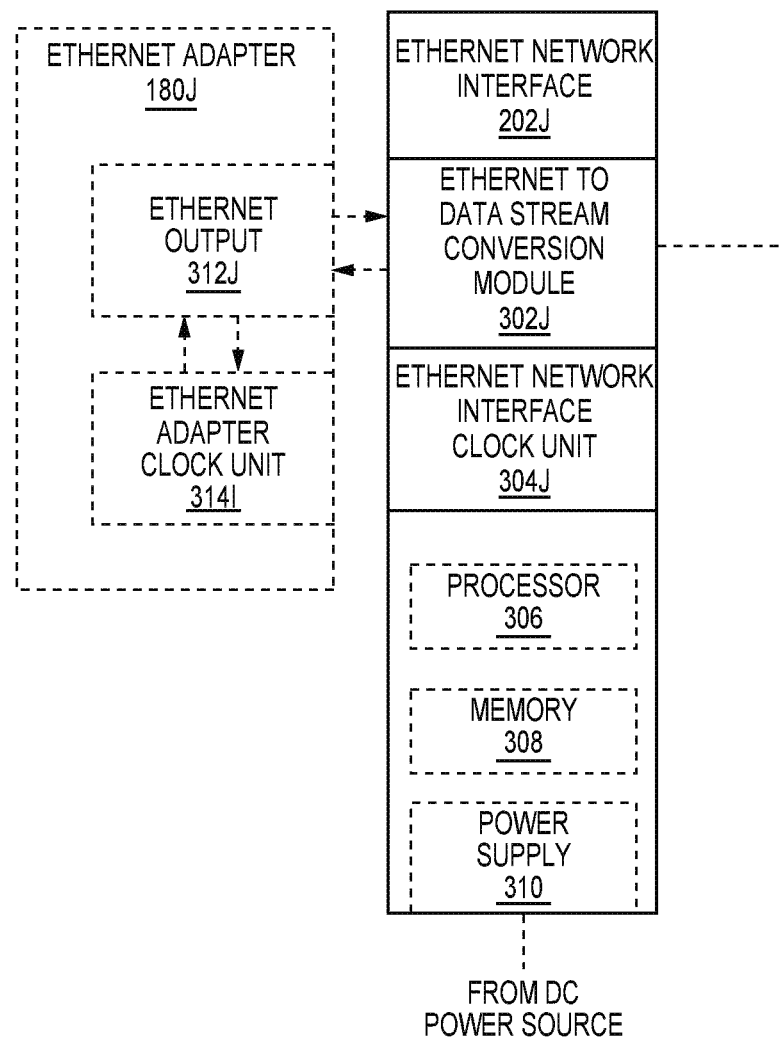

FIG. 3J is a block diagram of an exemplary embodiment of a type of base station interface 102, an Ethernet network interface 202J. Ethernet network interface 202J includes an Ethernet to data stream conversion module 302J, an Ethernet network interface clock unit 304J, an optional processor 306, optional memory 308, and an optional power supply 310. Similarly to Ethernet network interface 202I, Ethernet to data stream conversion module 302J is communicatively coupled to an Ethernet output 312J of an external device that is an Ethernet adapter 108J and to at least one physical layer processor 204. In contrast to Ethernet network interface 202I, Ethernet network interface clock unit 304J is not coupled directly to Ethernet adapter clock unit 314J of Ethernet adapter 108J to provide and/or receive the master reference clock to/from the Ethernet adapter 108J. Instead, Ethernet output 312J provides the master reference clock to the Ethernet to data stream conversion module 302J and the master reference clock is embedded in downstream signals from the Ethernet output 312J of the Ethernet adapter 108J to the Ethernet to data stream conversion module 302J of the Ethernet network interface 202J.

In exemplary embodiments where the master reference clock is provided from the Ethernet adapter 108J to the distributed antenna system 100, the master reference clock can be embedded in the downlink signals by the Ethernet adapter clock unit 314J so that the downlink signals communicated from the Ethernet output 312J of the Ethernet adapter 108J to the Ethernet to data stream conversion module 302J can be extracted by the Ethernet network interface clock unit 304J and distributed as appropriate within the Ethernet network interface 202J and the distributed antenna system 100 generally. In exemplary embodiments, the Ethernet to data stream conversion module 302J and/or the Ethernet network interface clock unit 304J are implemented using optional processor 306 and optional memory 308. In exemplary embodiments, the optional power supply 310 provides power to the various elements of the Ethernet network interface 202J.

Figure 4A:
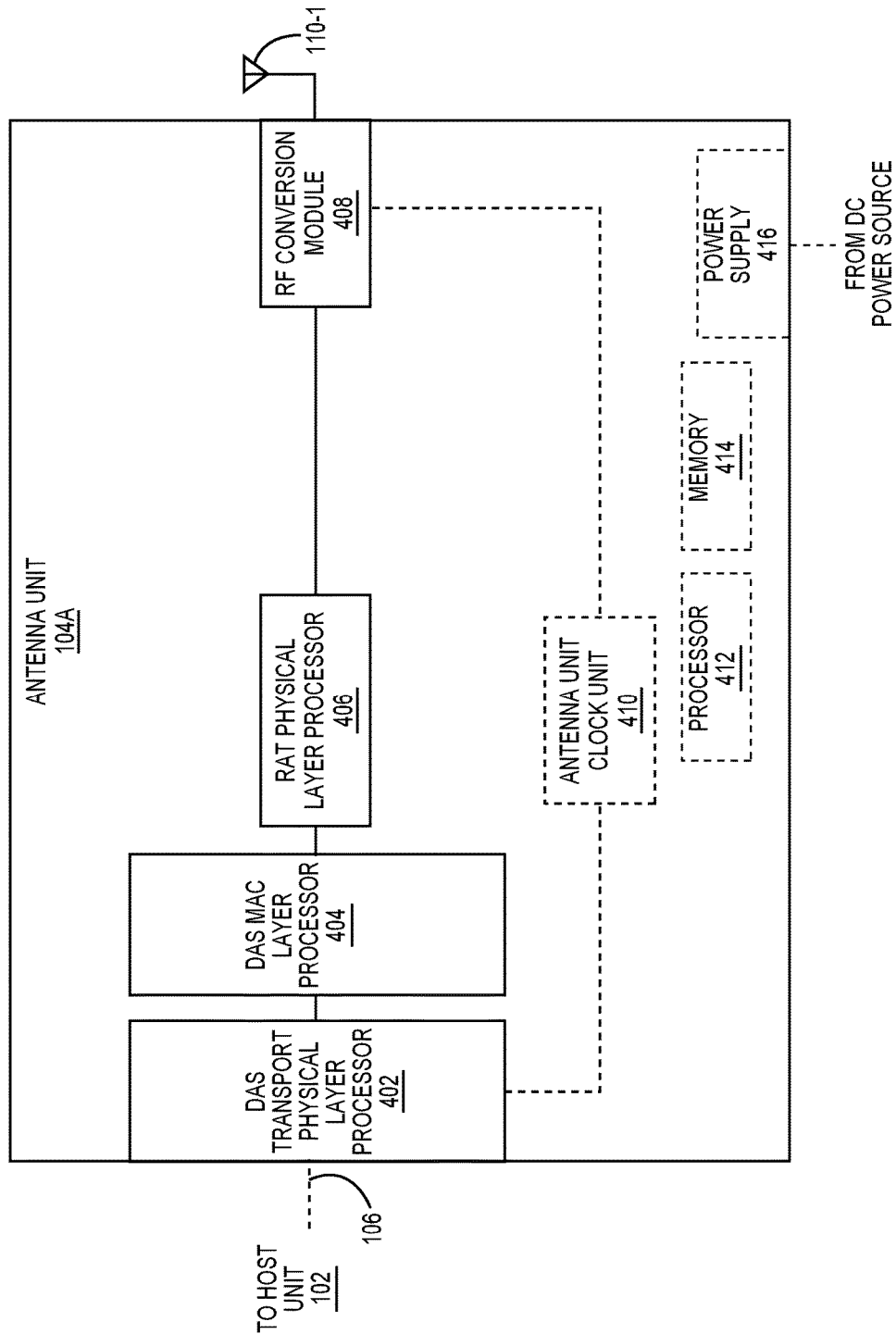
FIGS. 4A-4B are block diagrams of exemplary embodiments of antenna units used in distributed antenna systems, such as the exemplary distributed antenna systems in FIGS. 1A-1D.
Figure 4B:
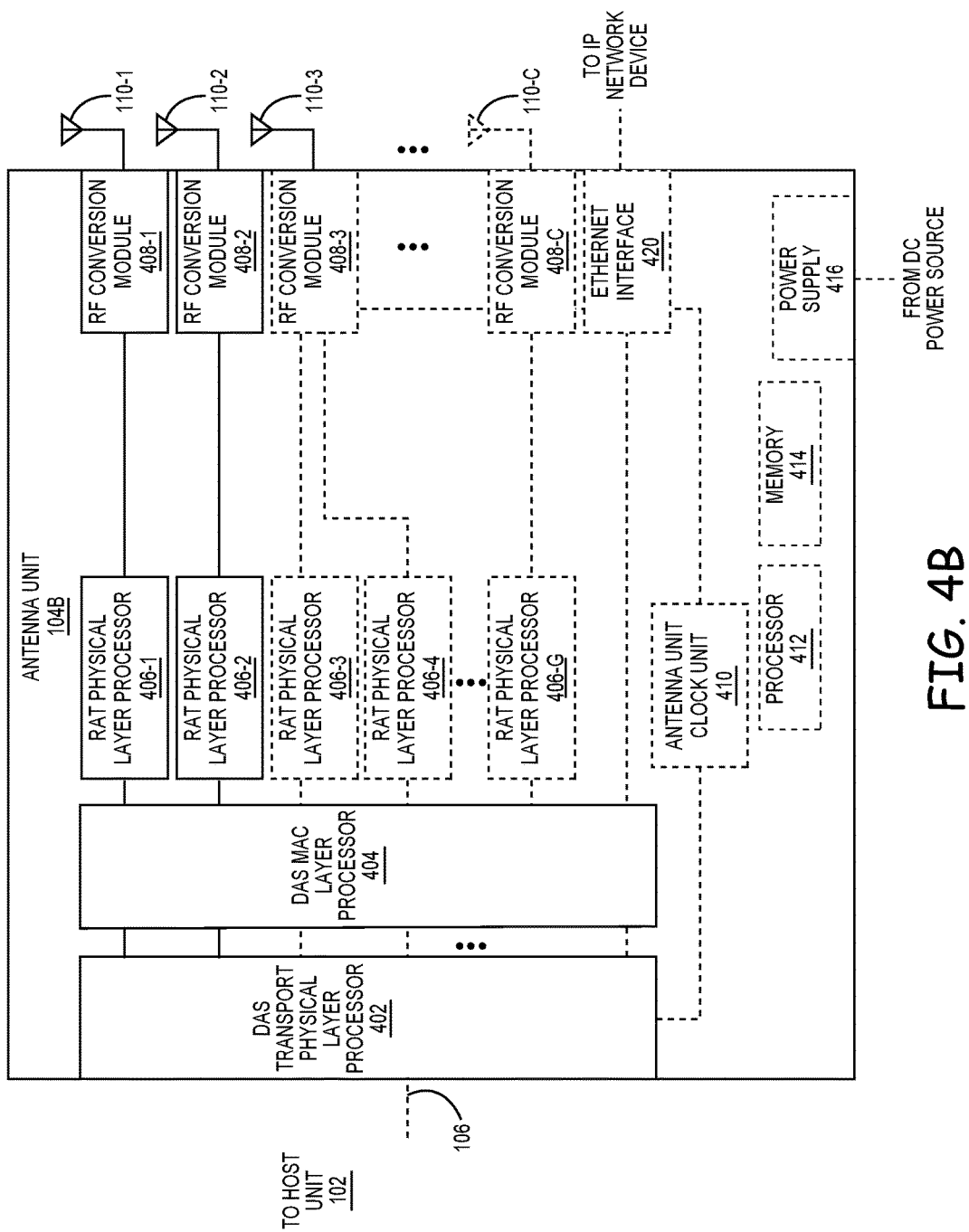

FIGS. 4A-4B are block diagrams of exemplary embodiments of antenna unit 104. Each of FIGS. 4A-4B illustrates a different embodiment of a remote unit 104, labeled 104A-104B respectively.

FIG. 4A is a block diagram of an exemplary embodiment of a remote unit 104, remote unit 104A, used in distributed antenna systems, such as the exemplary distributed antenna systems 100 described above. The antenna unit 104 includes a distributed antenna system (DAS) transport physical layer processor 402, a distributed antenna system (DAS) medium access control (MAC) layer processor 404, a radio access technology (RAT) physical layer processor 406, a radio frequency (RF) conversion module 408, optional antenna unit clock unit 410, optional processor 412, optional memory 414, and optional power supply 416. In exemplary embodiments, the distributed antenna system (DAS) transport physical layer processor 402 is replaced with another type of Layer 1 (L1) processor for a transport Layer 1. In exemplary embodiments, the DAS transport physical layer processor 402 is an Ethernet physical layer processor. In other embodiments, the DAS transport physical layer processor 402 is another type. In exemplary embodiments, the distributed antenna system (DAS) medium access control (MAC) layer processor 404 is replaced with another type of Layer 2 (L2) processor for a transport Layer 2. In exemplary embodiments, the radio access technology (RAT) physical layer processor 406 is replaced with another type of Layer 1 (L1) processor for a radio access technology (RAT) Layer 1. In exemplary embodiments, DAS transport physical layer processor 402, distributed antenna system medium access control layer processor 404, RAT physical layer processor 406, and/or radio frequency conversion module 408 are implemented at least in part by optional processor 412 and memory 414. In exemplary embodiments, power for the antenna unit is provided by the host unit 102 remotely across a medium and the optional power supply 416 derives and/or extracts power from the medium. In exemplary embodiments, optional power supply 416 is used to power the various components of the antenna unit 104.

In exemplary embodiments, the DAS transport physical layer processor 402 is configured to receive a downlink physical layer data stream from the host unit 102 across the digital communication link 106 and converts the downlink physical layer data stream in the physical layer to downlink distributed antenna system (DAS) transport medium access control (MAC) layer protocol data units (PDU). In exemplary embodiments, the DAS transport physical layer processor 402 is an Ethernet PHY that essentially undoes the processing of the corresponding DAS transport physical layer processor 208 in the host unit 102. In exemplary embodiments, more input lines are included in the antenna unit 104A. In exemplary embodiments, the distributed antenna system (DAS) medium access control (MAC) layer processor 404 is configured to convert the downlink distributed antenna system transport medium access control layer protocol data units in the downlink distributed antenna system transport medium access control layer into downlink medium access control layer protocol data units in the medium access control layer.

In exemplary embodiments, the RAT physical layer processor 406 is configured to generate a downlink RAT signal from the downlink medium access control layer protocol data units in the medium access control layer. In exemplary embodiments, the RF conversion module 404 converts the baseband downlink RAT signal to radio frequency signals for transmission at antenna 110. In exemplary embodiments, the RAT physical layer processors 406 are LTE physical layer processors because the signals communicated with the RF conversion module 404 need to be LTE physical layer signals. In these embodiments, the LTE physical layer processors process OFDM in the downlink and SC-FDMA in the uplink. In exemplary embodiments, the LTE physical layer processor (RAT physical layer processor 406) in the remote antenna unit 104A doesn't perform the upper layer processing (L2/L3) in the protocol stack, rather it only performs the Layer 1 processing up to the creation of the MAC layer data.

In exemplary embodiments, some of the RAT physical layer processors 406 are physical layer processors for radio access technologies other than LTE and the physical layer signals received from the corresponding host network interfaces 202 are for these other radio access technologies. In exemplary embodiments, no RAT physical layer processors 406 are included when the RAT physical layer data is transported in some format from the host 102 to the antenna unit 104A. In exemplary embodiments, combinations of LTE physical layer processors 406, other RAT physical layer processors 406, and no RAT physical layer processors 406 are included in antenna unit 104A.

In exemplary embodiments, the RF conversion module 408 receives signals from antenna 110 and converts radio frequency signals to a baseband uplink RAT signal. In exemplary embodiments, the RAT physical layer processor 406 is configured to receive the baseband uplink RAT signal from the RF conversion module 408 and to generate uplink medium access control layer protocol data units in the medium access control layer from the baseband uplink RAT signal. In exemplary embodiments, the distributed antenna system (DAS) medium access control (MAC) layer processor 404 is configured to convert the uplink medium access control layer protocol data units in the medium access control layer into uplink distributed antenna system transport medium access control layer protocol data units in the uplink distributed antenna system transport medium access control layer. In exemplary embodiments, the DAS transport physical layer processor 402 is configured to convert the uplink distributed antenna system transport medium access control layer protocol data units to an uplink physical layer DAS data stream and to communicate the uplink physical layer DAS data stream to the host unit 102 across the digital communication link 106.

FIG. 4B is a block diagram of an exemplary embodiment of a remote unit 104, remote unit 104B, used in distributed antenna systems, such as the exemplary distributed antenna systems 100 described above. The antenna unit 104B includes an DAS transport physical layer processor 402, a distributed antenna system (DAS) medium access control (MAC) layer processor 404, a plurality of radio access technology (RAT) physical layer processors 406 (including RAT physical layer processor 406-1, RAT physical layer processor 406-2, and any quantity of optional RAT physical layer processors 406 through optional RAT physical layer processor 406-G), a plurality of radio frequency (RF) conversion modules 408, optional antenna unit clock unit 410, optional processor 412, optional memory 414, and optional power supply 416. In exemplary embodiments, DAS transport physical layer processor 402, distributed antenna system medium access control layer processor 404, RAT physical layer processor 406, and/or radio frequency conversion module 408 are implemented at least in part by optional processor 412 and memory 414. In exemplary embodiments, optional power supply 416 is used to power the various components of the antenna unit 104. Antenna unit 104B includes similar components to antenna unit 104A and operates according to similar principles and methods as antenna unit 104A described above.

The differences between antenna unit 104A and antenna unit 104B is that antenna unit 104B includes a plurality of radio access technology (RAT) physical layer processors 406 (such as RAT physical layer processor 406-1 through optional RAT physical layer processor 406-G), a plurality of RF conversion modules 408 (such as RF conversion module 408-1 through RF conversion module 408-C), and optional Ethernet interface 420. In exemplary embodiments, each of the radio access technology (RAT) physical layer processors 406 is replaced with another type of Layer 1 (L1) processors for a radio access technology (RAT) Layer 1. In exemplary embodiments, the DAS MAC layer processor 404 includes multiplexing functionality enabling multiple different signals to be received and multiplexed in different ways. In exemplary embodiments, such as MIMO applications or multi-signal applications, the DAS MAC layer processor 404 multiplexes the data for the different signals onto the same DAS transport physical layer processor 402 for transport across the digital communication link 106 to the host unit 102. In exemplary embodiments, the DAS MAC layer processor 404 receives a plurality of uplink data streams from a plurality of RF conversion modules 408. In exemplary embodiments, the DAS MAC layer processor 404 aggregates at least one uplink data stream received from an RF conversion module 408-1 with another uplink data stream received from another RF conversion module 408-2. In exemplary embodiments, the DAS MAC layer processor 404 aggregates a plurality of uplink data streams into an aggregate uplink data stream that is transmitted through the DAS transport physical layer processor 402.

In exemplary embodiments, more than one RAT physical layer processor 406 is communicatively coupled to a single RF conversion module 408. For example, both optional RAT physical layer processor 406-3 and optional RAT physical layer processor 406-4 being communicatively coupled to single RF conversion module 408-3. In these embodiments, more than one RAT physical layer data steam is communicated to a single RF conversion module. In exemplary embodiments, the RAT physical layer data stream from a plurality of RAT physical layer processors 406 are in the same band of operation (such as two different two different LTE signals, an LTE signal and a UMTS signal, etc.), such that they can be converted simultaneously by a single RF conversion module 408. In exemplary embodiments, the two different signals from the two different RAT physical layer data streams are combined digitally at baseband and upconverted simultaneously using RF conversion module 408 using a single power amplifier.

In exemplary embodiments, the optional Ethernet interface 408 receives a downlink data stream from the DAS MAC layer processor 404 and converts it to Ethernet packets and communicates the Ethernet packets with an internet protocol network device. The optional Ethernet interface 408 also receives Ethernet packets from the internet protocol network device and converts them to an uplink data stream and communicates it to the DAS MAC layer processor 404. In exemplary embodiments, the DAS MAC layer processor 404 also multiplexes the uplink data stream from the Ethernet packets with the uplink data streams from the RF conversion modules 408. The optional Ethernet interface 408 is an example of how the additional bandwidth freed up through the methods described herein can be used to allow for additional services, such as an Ethernet pipe from the host unit 102 to at least one antenna unit 104.

In exemplary embodiments, the optional antenna unit clock unit 410 extracts the master reference clock from the downlink data stream and uses this master clock within the antenna unit 104 to establish a common time base in the antenna unit 104 with the rest of the distributed antenna system 100. In exemplary embodiments, the optional antenna unit clock unit 410 generates a master reference clock and distributes the generated master reference clock to other components of the distributed antenna system 100 (and even the radio access network interfaces 108) in the upstream using the uplink data stream.

Figure 5A:
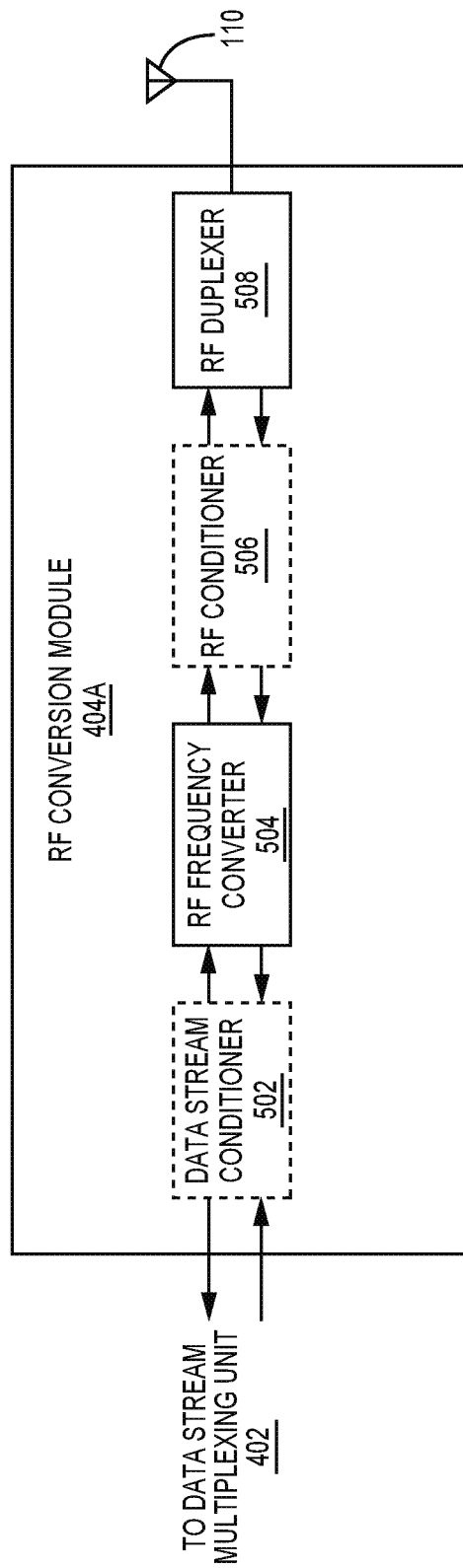
FIGS. 5A-5D are block diagrams of exemplary embodiments of RF conversion modules used in antenna units of distributed antenna systems, such as exemplary antenna units in FIGS. 4A-4B.
Figure 5B:
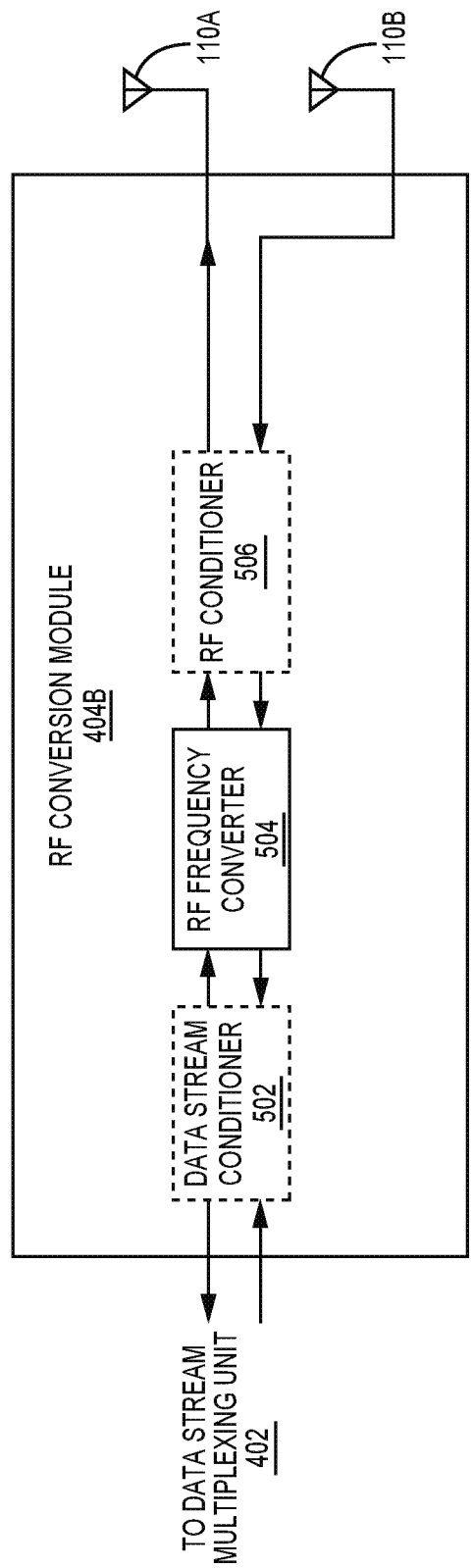
Figure 5C:
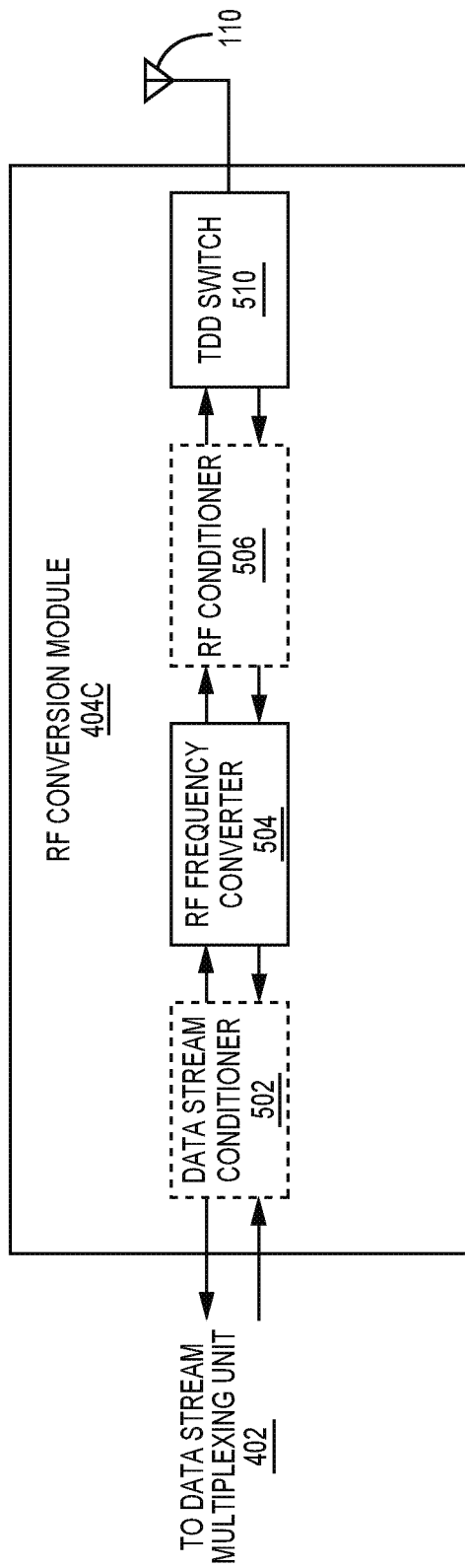

FIGS. 5A-5C are block diagrams of exemplary embodiments of RF conversion modules 404 used in antenna units of distributed antenna systems, such as the exemplary antenna unit 100 described above. Each of FIGS. 5A-5C are block diagrams of exemplary embodiments of RF conversion module 404, labeled RF conversion module 404A-404D respectively.

FIG. 5A is a block diagram of an exemplary RF conversion module 404A including an optional data stream conditioner 502, an RF frequency converter 504, an optional RF conditioner 506, and an RF duplexer 508 coupled to a single antenna 110.

The optional data stream conditioner 502 is communicatively coupled to a RAT physical layer processor 406 and the radio frequency (RF) converter 504. In the forward path, the optional data stream conditioner 502 conditions the downlink data stream (for example, through amplification, attenuation, and filtering) received from the RAT physical layer processor 406 and passes the downlink data stream to the RF converter 504. In the reverse path, the optional data stream conditioner 502 conditions the uplink data stream (for example, through amplification, attenuation, and filtering) received from the RF converter 504 and passes the uplink data stream to the RAT physical layer processor 406.

The RF converter 504 is communicatively coupled to the physical layer processor or the optional data stream conditioner 502 on one side and to either RF duplexer 508 or the optional RF conditioner 506 on the other side. In exemplary embodiments, the main function of the RF converter 504 is to convert between digital bits and radio frequency. In exemplary embodiments, the RF converter includes analog to digital converters, digital to analog converters, as well as mixers and local oscillators. In the downstream, the RF converter 504 converts a downlink data stream to downlink radio frequency (RF) signals and passes the downlink RF signals onto either the RF duplexer 508 or the optional RF conditioner 506. In the upstream, the RF converter 504 converts uplink radio frequency (RF) signals received from either the RF duplexer 508 or the optional RF conditioner 506 to an uplink data stream and passes the uplink data stream to the RAT physical layer processor 406 or the optional data stream conditioner 502.

The RF duplexer 508 is communicatively coupled to either the RF frequency converter 504 or the optional RF conditioner 506 on one side and the antenna 110 on the other side. The RF duplexer 508 duplexes the downlink RF signals with the uplink RF signals for transmission/reception using the antenna 110.

FIG. 5B is a block diagram of an exemplary RF conversion module 404B including an optional data stream conditioner 502, an RF frequency converter 504, and an optional RF conditioner 506 coupled to a downlink antenna 110A and an uplink antenna 110B. RF conversion module 404B includes similar components to RF conversion module 404A and operates according to similar principles and methods as RF conversion module 404A described above. The difference between RF conversion module 404B and RF conversion module 404A is that RF conversion module 404B does not include RF duplexer 508 and instead includes separate downlink antenna 110A used to transmit RF signals to at least one subscriber unit and uplink antenna 110B used to receive RF signals from at least one subscriber unit.

FIG. 5C is a block diagram of an exemplary RF conversion module 404C that communicates downstream and upstream signals using a single antenna 110 through a TDD switch 510 (or other circulator). The RF conversion module 404D includes an optional data stream conditioner 502, an RF frequency converter 504, an optional RF conditioner 506, and the TDD switch 510 that is communicatively coupled to antenna 110. RF conversion module 404C operates according to similar principles and methods as RF conversion module 404A described above. The difference between RF conversion module 404C and RF conversion module 404A is that RF conversion module 404C uses the TDD switch 510 to switch between a downstream and upstream signal path using a single antenna 110 through TDD switch 510. The TDD switch switches between the duplexed downlink and uplink signals for RF conversion module 404C for transmission/reception using the single antenna 110.

Figure 5D:
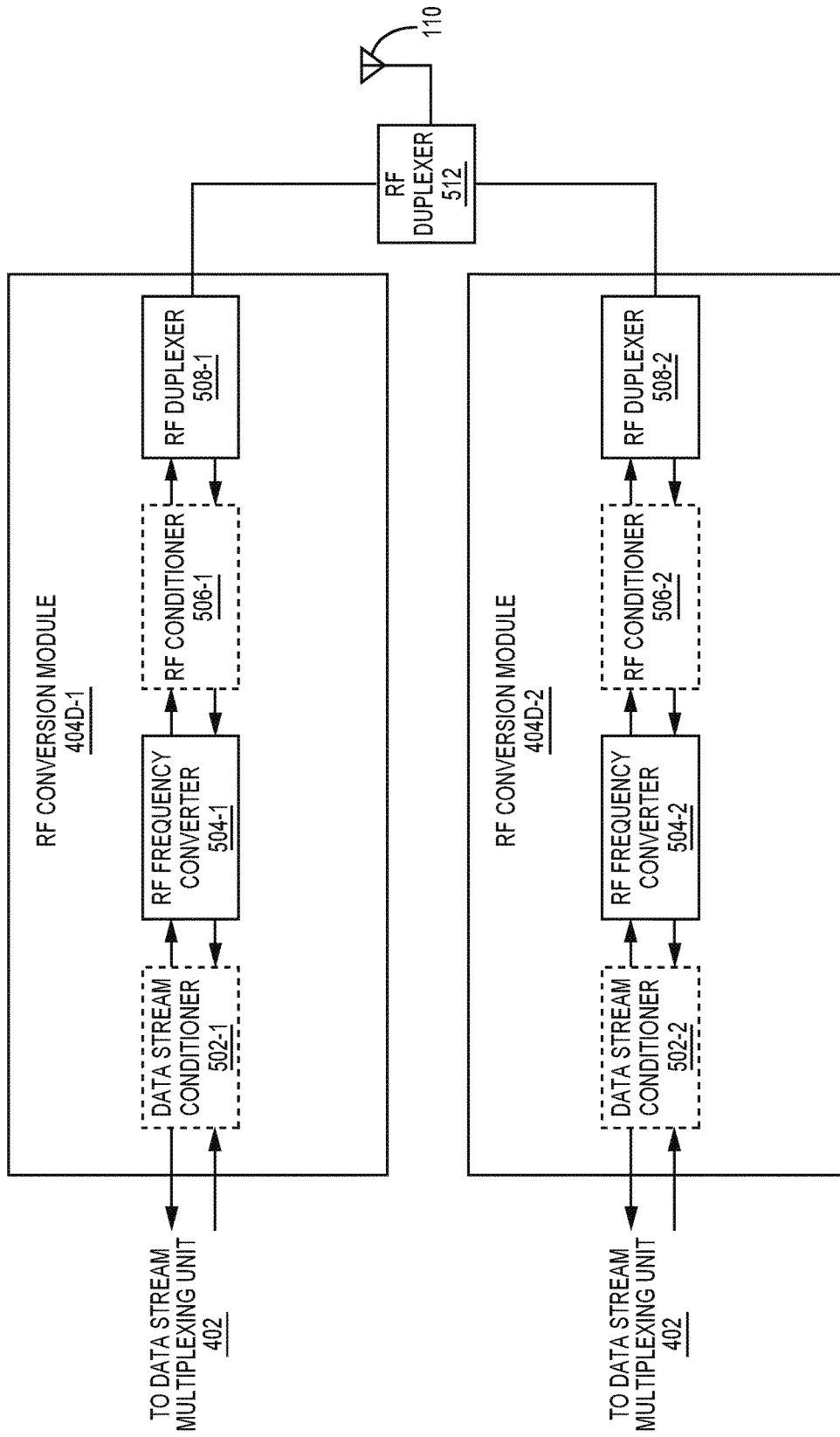

FIG. 5D is a block diagram of an exemplary RF conversion module 404D-1 and exemplary RF conversion module 404D-2 that share a single antenna 110 through an RF diplexer 512. The RF conversion module 404D-1 includes an optional data stream conditioner 502-1, an RF frequency converter 504-1, an optional RF conditioner 506-1, and an RF duplexer 508-1 communicatively coupled to RF diplexer 512 that is communicatively coupled to antenna 110. Similarly, the RF conversion module 404D-2 includes an optional data stream conditioner 502-2, an RF frequency converter 504-2, an optional RF conditioner 506-2, and an RF duplexer 508-2 communicatively coupled to RF diplexer 512 that is communicatively coupled to antenna 110. Each of RF conversion module 404D-1 and 404D-2 operate according to similar principles and methods as RF conversion module 404A described above. The difference between RF conversion modules 404D-1 and 404D-2 and RF conversion module 404A is that RF conversion modules 404D-1 and 404D-2 are both coupled to a single antenna 110 through RF diplexer 512. The RF diplexer 512 diplexes the duplexed downlink and uplink signals for both RF conversion module 404D-1 and 404D-2 for transmission/reception using the single antenna 110.

Figure 6:
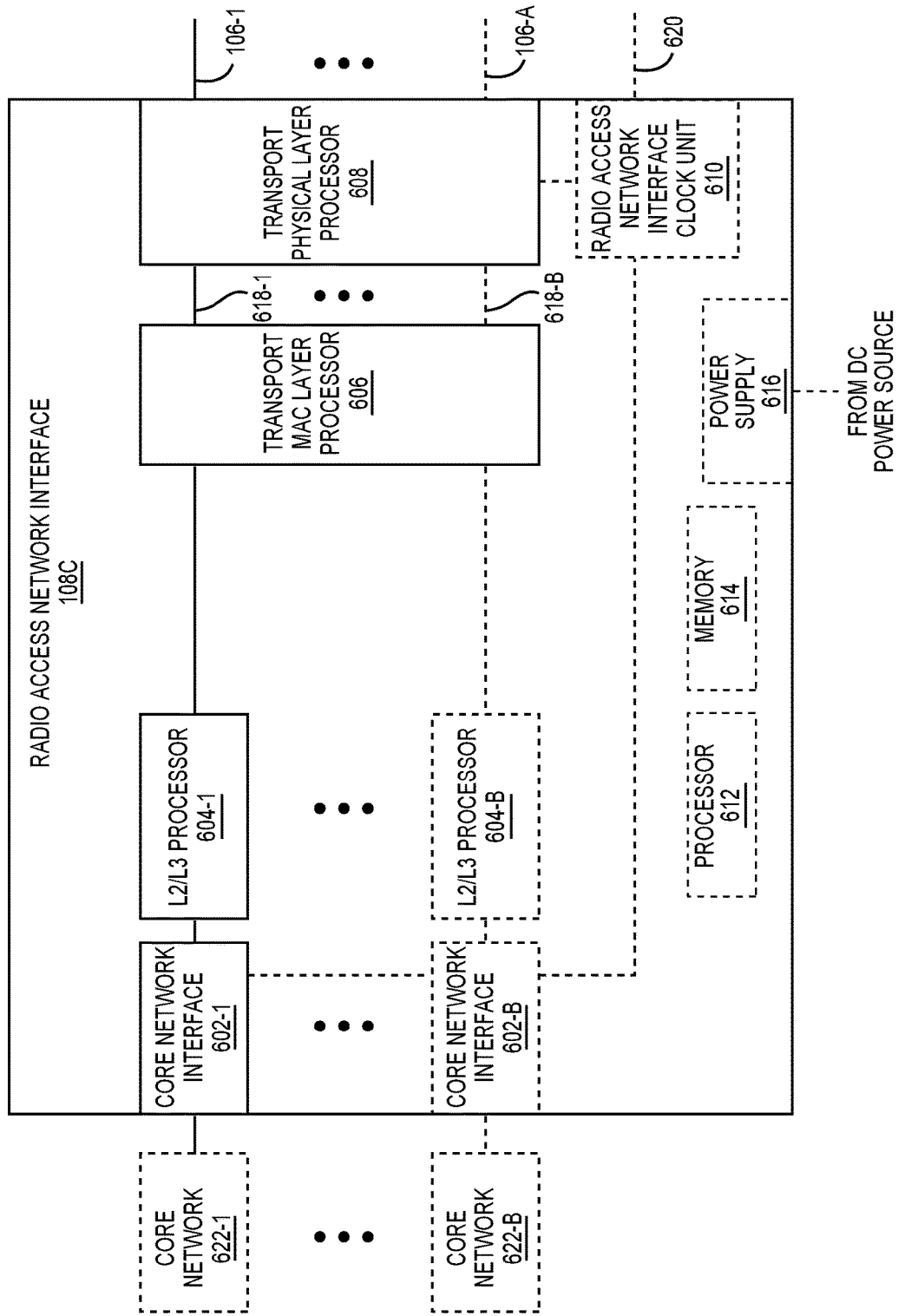
FIG. 6 is a block diagram of an exemplary embodiment of a radio access (RAN) network interface used in distributed antenna systems, such as the exemplary distributed antenna systems in FIGS. 1A-1D.

FIG. 6 is a block diagram of an exemplary embodiment of a radio access (RAN) network interface 108, radio access network interface 108C, used in distributed antenna systems, such as the exemplary distributed antenna systems 100 described above. In exemplary embodiments, exemplary radio access network interface 108C is a baseband unit (BBU) such as an LTE BBU that has been optimized to more efficiently communicate with remote units 104 in distributed antennas systems 100. Exemplary radio access network interface 108C includes at least one core network interface 602 (including core network interface 602-1 and any quantity of optional core network interfaces 202 through optional core network interface 602-B), at least one Layer 2 (L2)/Layer 3 (L3) processor 604 (including L2/L3 processor 604-1 and any quantity of optional L2/L3 processors 604 through optional L2/L3 processor 604-B), a transport medium access control (MAC) layer processor 606 (such as a distributed antenna system (DAS) MAC layer processor), a transport physical layer processor 608 (such as a distributed antenna system (DAS) physical layer processor), an optional radio access network interface clock unit 610, an optional processor 612, optional memory 614, and an optional power supply 616. In exemplary embodiments, the at least one core network interface 602 is replaced with another type of Layer 1 (L1) and Layer 2 (L2) processor for a core network Layer 1 (L1) and Layer 2 (L2). In exemplary embodiments, the at least one L2/L3 processor 604 is replaced with another type of Layer 2 (L2) and Layer 3 (L3) processor for a radio access technology (RAT) Layer 2 (L2) and Layer 3 (L3). In exemplary embodiments, the at least one L2/L3 processor 604 is an LTE L2/L3 processor. In exemplary embodiments, the transport MAC layer processor 606 is replaced with another type of Layer 2 processor for a transport Layer 2. In exemplary embodiments, the transport physical layer processor 608 is a transport Layer 1 processor for a transport Layer 1. In exemplary embodiments, the transport physical layer processor 608 is an Ethernet physical layer processor. In other embodiments, the transport physical layer processor 608 is another type of physical layer processor for transport through the distributed antenna system.

In exemplary embodiments, the core network interfaces 602, the L2/L3 processors 604, the transport MAC layer processor 606, the transport physical layer processor 608 and/or optional radio access network interface clock unit 610 are implemented in whole or in part by optional processor 612 and memory 614. In exemplary embodiments, power supply 616 provides power for the various components of the radio access network interface 108C. In exemplary embodiments, the L2/L3 processors 604 are LTE L2/L3 processors because the signals received from the corresponding core network interfaces 602 are LTE core network signals, communicated using Internet Protocol (IP) over Gigabit Ethernet. In exemplary embodiments, some of the L2/L3 processors 604 are L2/L3 processors for radio access technologies (RAT) other than LTE and the signals received from the corresponding core network interfaces 602 are for these other radio access technologies (RAT). In exemplary embodiments, combinations of LTE L2/L3 processors 604 and other radio access technology L2/L3 processors 604 are included in radio access network interface 108C. In exemplary embodiments, the radio access network interface 108C provides/distributes power to at least a first of the at least one antenna unit 104.

In the forward path, each core network interface 602 receives downlink physical layer core network signals and converts the downlink physical layer core network signals into downlink L2/L3 core network signals that are communicated to a respective L2/L3 processor 604. In exemplary embodiments, the purpose of the core network interface 602 is to convert the data from the physical layer format used by the core network 622 into a format acceptable to the RAT L2/L3 processor 604. In specific implementations, at least one core network interface 602 receives IP core network signals for LTE wireless signals from a core network 622, converts the IP core network signals into a format compatible with the LTE L2/L3 processor 604, such as packet data convergence protocol (PDCP) protocol data units (PDUs). In the reverse path, each core network interface 602 receives uplink wireless network information from the L2/L3 processor 604 and converts them into a format for communication with the respective core network 622. In specific implementations, at least one core network interface 602 receives uplink L2/L3 data signals, such as PDCP PDUs and converts them into uplink physical layer IP core network signals and communicates the core network signals to the at least one additional component in the core network 622.

In the forward path, each L2/L3 processor 604 receives the L2/L3 RAT signals and converts them into downlink radio access technology (RAT) medium access control (MAC) layer protocol data units (PDUs) in the radio access technology (RAT) medium access control (MAC) layer, wherein the radio access technology (RAT) medium access control layer uses relevant bits more efficiently than the radio access technology (RAT) physical layer (such as I/Q modulated LTE samples or other I/Q modulated samples). In the reverse path, each L2/L3 processor 604 receives uplink radio access technology (RAT) medium access control (MAC) layer protocol data units (PDUs) in the radio access technology (RAT) medium access control (MAC) layer and converts the uplink RAT MAC PDUs in the RAT MAC layer into L2/L3 core network signals.

In the forward path, the transport MAC layer processor 606 converts the downlink RAT MAC PDUs into downlink transport medium access control (MAC) layer protocol data units (PDUs) in a downlink transport medium access control (MAC) layer for transport to the at least one remote antenna unit 104 (such as through a distributed antenna system (DAS)). In the reverse path, the transport MAC layer processor 606 converts the uplink transport medium access control (MAC) layer protocol data units (PDUs) in an uplink transport medium access control (MAC) layer into the uplink radio access technology (RAT) medium access control (MAC) layer protocol data units (PDUs). In exemplary embodiments, the transport MAC layer processor 606 also broadcasts signals to a plurality of different remote antenna units 104. In exemplary embodiments, the transport MAC layer processor 606 also combines uplink DAS transport MAC layer PDUs from different antenna units 104 in an intelligent way.

In the forward path, the transport physical layer processor 608 converts the downlink transport MAC layer PDUs in the downlink transport MAC layer into downlink transport physical layer data streams in the transport physical layer (such as an Ethernet physical layer or another DAS transport physical layer) and communicates the downlink transport physical layer data streams across the at least one digital communication medium 106 to the at least one antenna unit 104. In the reverse path, the transport physical layer processor 608 receives uplink transport physical layer data streams in the transport physical layer (such as an Ethernet physical layer or another DAS transport physical layer) from the at least one digital communication medium 106 and converts the uplink transport physical layer data streams into uplink transport MAC layer PDUs in the uplink transport MAC layer. In exemplary embodiments, the transport physical layer processor 608 combines uplink transport physical layer data streams from different antenna units 104 in an intelligent way.

In exemplary embodiments, the radio access network interface clock unit 610 generates a master reference clock and distributes the generated master reference clock with the at least one remote antenna unit 104 and/or other components within the distributed antenna system 100. In exemplary embodiments, the radio access network interface clock unit 610 communicates the master reference clock across a separate clock signal link 620. In other exemplary embodiments, the radio access network interface clock unit 610 communicates the master reference clock through the transport physical layer processor 608. In exemplary embodiments, the radio access network interface 108C receives a master reference clock signal from at least one other component within the distributed antenna system 100, such as the at least one remote antenna unit 104 or from another external source, such as a source provided from the core network 620. In exemplary embodiments, the master reference clock is derived from a core network signal received by the at least one core network interface 602.

Figure 7:
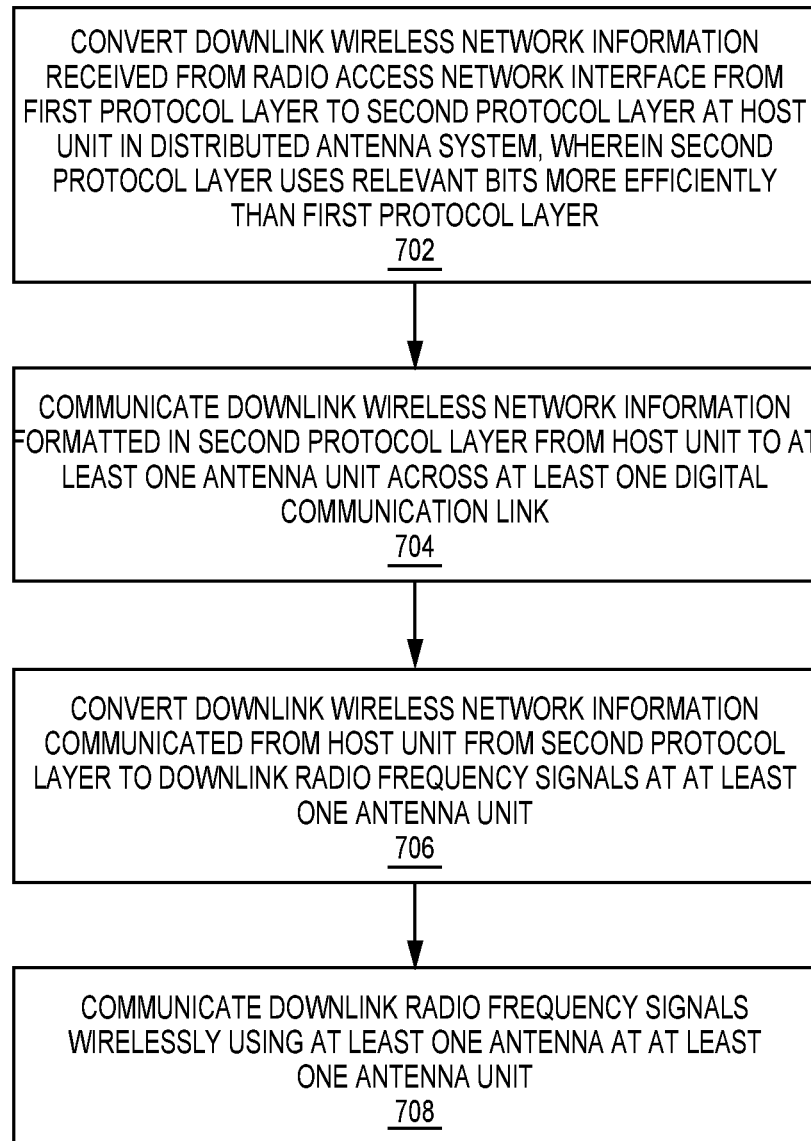
FIG. 7 is a flow diagram illustrating an exemplary embodiment of a method for efficiently transporting wireless network information through a distributed antenna system.

FIG. 7 is a flow diagram illustrating one exemplary embodiment of a method 700 for efficiently transporting wireless network information through a distributed antenna system. Exemplary method 700 begins at block 702 with converting downlink wireless network information received from a radio access network interface from a first protocol layer to a second protocol layer at a host unit in a distributed antenna system, wherein the second protocol layer uses relevant bits more efficiently than the first protocol layer. Exemplary method 700 proceeds to block 704 with communicating the downlink wireless network information formatted in the second protocol layer from the host unit to at least one antenna unit across at least one digital communication link. Exemplary method 700 proceeds to block 706 with converting the downlink wireless network information communication form the host unit from the second protocol layer to downlink radio frequency signals at the at least one antenna unit. Exemplary method 700 proceeds to block 708 with communicating the downlink radio frequency signals wirelessly using at least one antenna at the at least one antenna unit.

Figure 8:
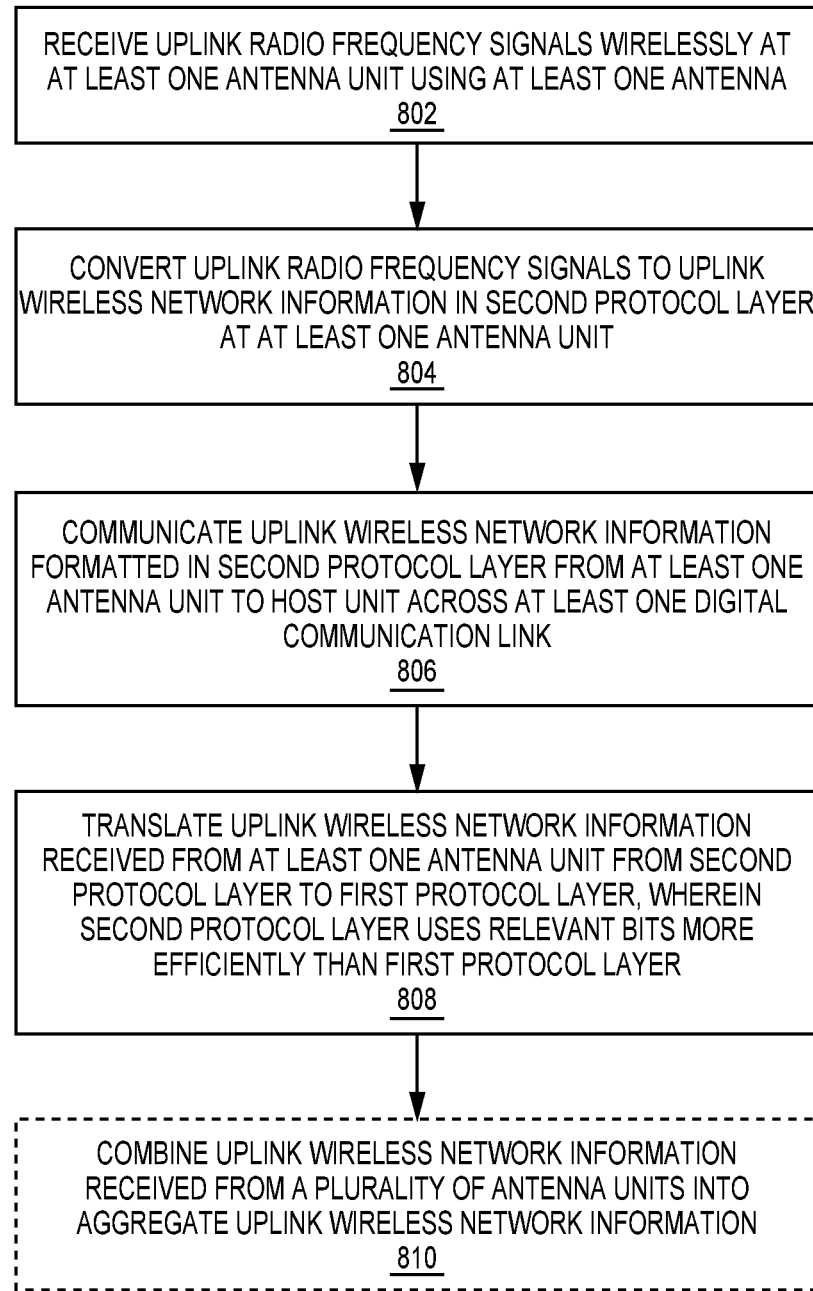
FIG. 8 is a flow diagram illustrating another exemplary embodiment of a method for efficiently transporting wireless network information through a distributed antenna system.

FIG. 8 is a flow diagram illustrating one exemplary embodiment of a method 800 for efficiently transporting wireless network information through a distributed antenna system. Exemplary method 800 begins at block 802 with receiving uplink radio frequency signals wirelessly at at least one antenna unit using at least one antenna. Exemplary method 800 proceeds to block 804 with converting uplink radio frequency signals to uplink wireless network information in a second protocol layer at the at least one antenna unit. Exemplary method 800 proceeds to block 806 with communicating the uplink wireless network information formatted in the second protocol layer from the at least one antenna unit to the host unit across at least one digital communication link. Exemplary method 800 proceeds to block 808 with converting the uplink wireless network information received from the at least one antenna unit from the second protocol layer to a first protocol layer, wherein the second protocol layer uses relevant bits more efficiently than the first protocol layer. Exemplary method 800 proceeds to optional block 810 with combining uplink wireless network information received from a plurality of antenna units into aggregate uplink wireless network information. In exemplary embodiments, the uplink wireless network information is combined through summation (either digital or analog), weighted summation, averaging, multiplexing, etc.

Figure 9:
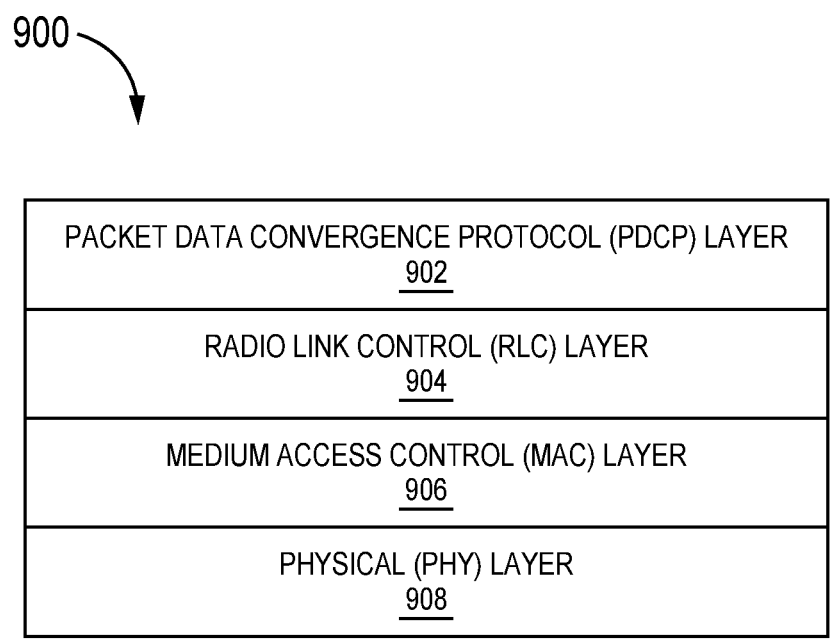
FIG. 9 is a representation of an exemplary Layer 1 (L1)/Layer 2 (L2) protocol stack for a radio access network (RAN).

FIG. 9 is a representation of an exemplary Layer 1 (L1)/Layer 2 (L2) protocol stack 900 for a radio access network (RAN) implementing LTE. The protocol stack 900 includes a packet data convergence protocol (PDCR) layer 902, a radio link control (RLC) layer 904, a medium access control (MAC) layer 906, and a physical (PHY) layer 908. In exemplary embodiments, each of the packet data convergence protocol (PDCP) layer 902, the radio link control (RLC) layer 904, and the medium access control (MAC) layer 906 are replaced with another type of Layer 2 (L2). In exemplary embodiments, the physical (PHY) layer 908 is replaced with another type of Layer 1 (L1). In exemplary embodiments, at the top of the protocol stack 900 into the packet data convergence protocol layer 902 comes IP packets from the radio access network (RAN) of the LTE system. In exemplary embodiments, the IP data then flows down through the radio link control layer 904 to the medium access control layer 906. In exemplary embodiments, going down through the various layers expands the data rate. In exemplary embodiments, there is only a slight expansion down until the medium access control layer 904. Once the IP data gets to the physical layer, a much larger expansion of the data rate occurs when going to the LTE physical layer 908.

In exemplary embodiments, the interface between the medium access control layer 904 and the LTE physical layer 908 is a clean interface where processing in layers above are performed by one processing device while processing lasers below are performed by another processing device. In exemplary embodiments, a processor (such as an ARM processor) performs the medium access control (MAC) layer 906 processing and the radio link control (RLC) layer 904 processing. In exemplary embodiments, a digital signal processor (DSP) performs the physical (PHY) layer 908 processing. In other embodiments, a System on a Chip (SoC) performs processing for the medium access control (MAC) layer 906, the radio link control (RLC) layer 904, and the physical (PHY) layer 908. In other exemplary embodiments, a field programmable gate array (FPGA) performs all or part of the processing for the medium access control (MAC) layer 906, radio link control (RLC) layer 904, and/or the physical (PHY) layer 908. In exemplary embodiments, the medium access control (MAC) protocol data units (PDUs) at the medium access control (MAC) layer 906 are transported through the distributed antenna system (such as a distributed antenna system 100) instead of I/Q baseband samples (at the LTE physical layer 908) because the medium access control (MAC) protocol data units (PDUs) can be more efficiently transported than the I/Q baseband samples.

Figure 10A:
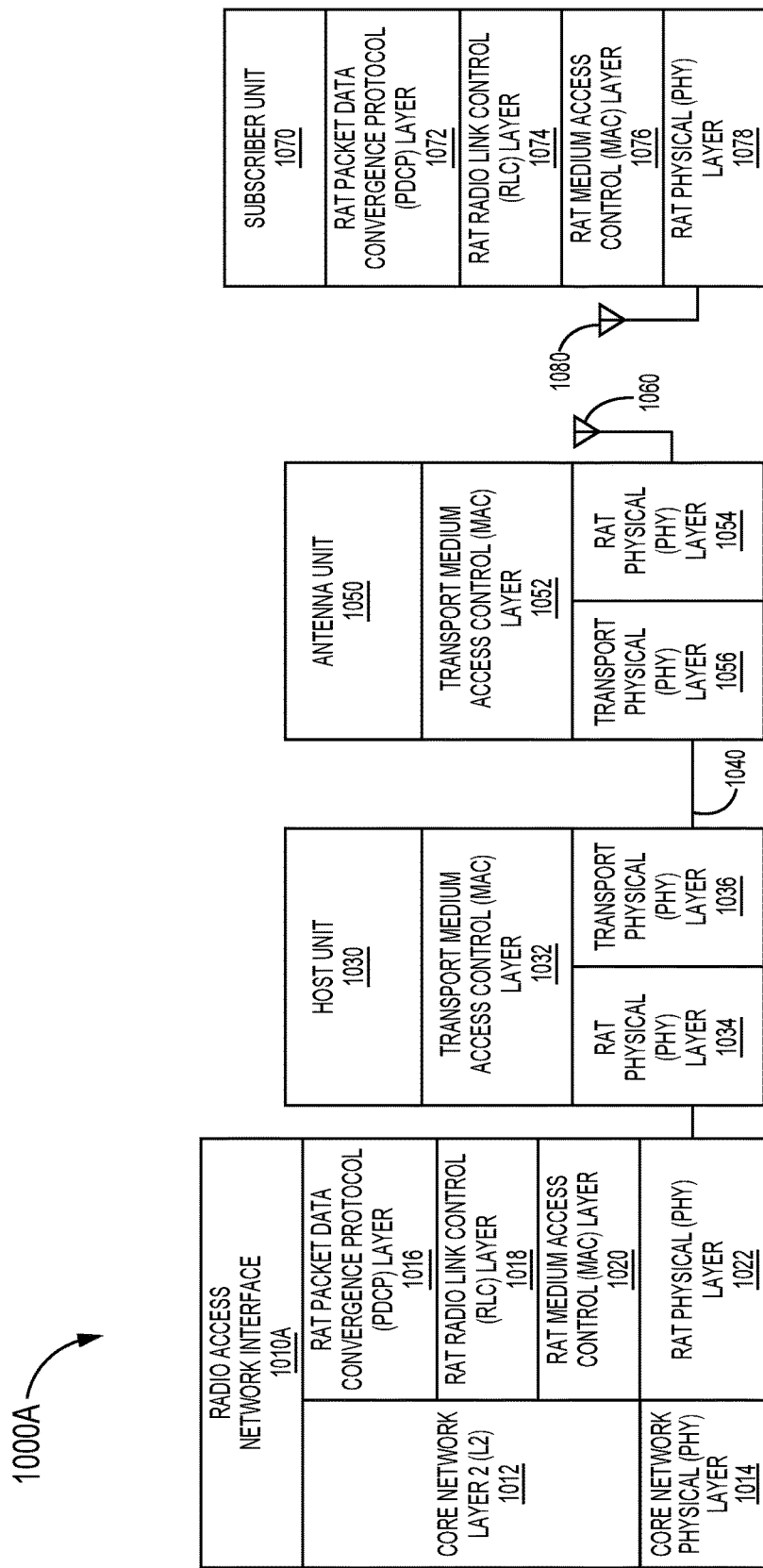
FIGS. 10A-10B are block diagrams showing interaction in an exemplary system of various levels of a protocol stack, such as the protocol stack shown in FIG. 9.
Figure 10B:
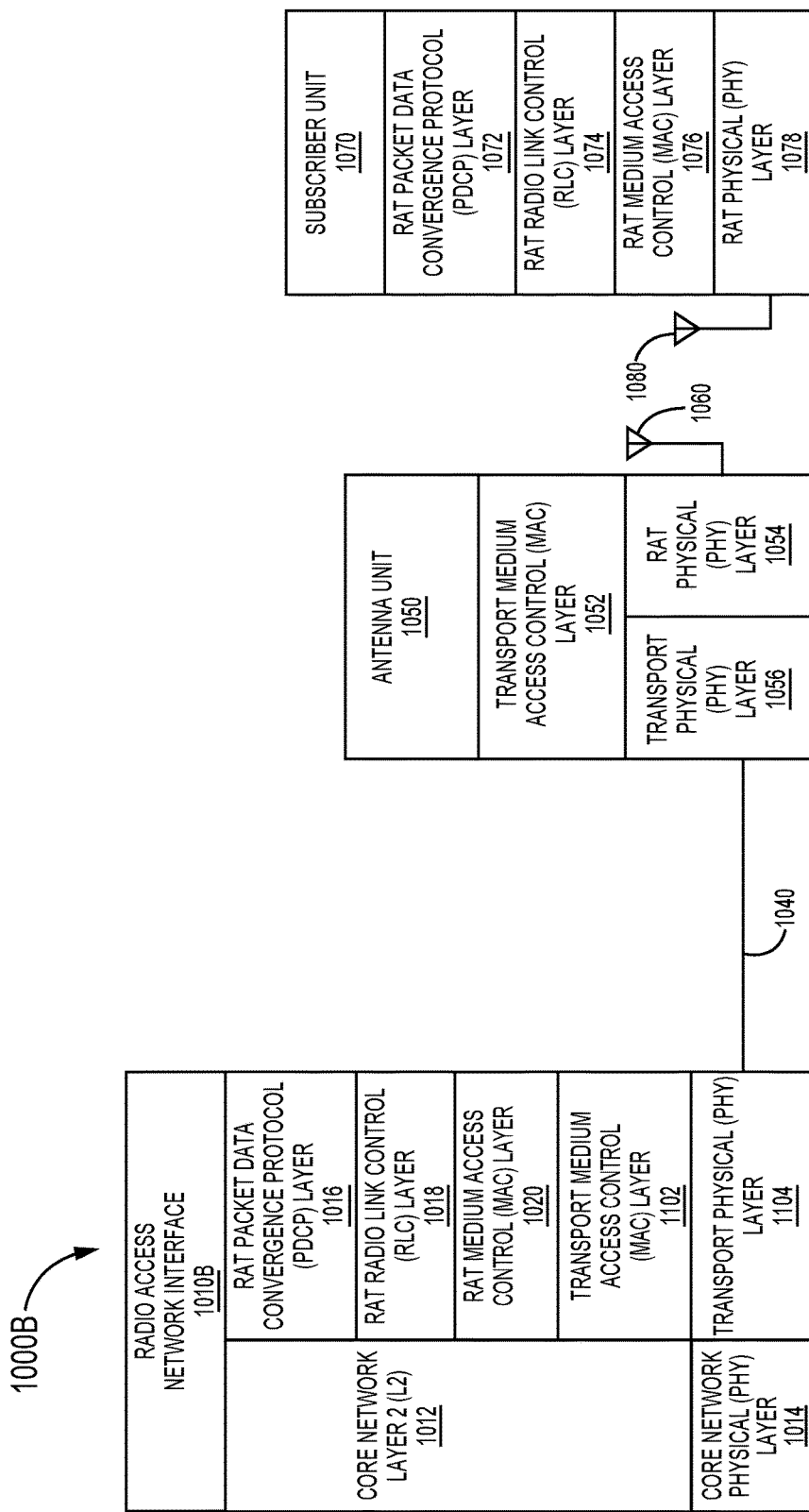

FIGS. 10A-10B are block diagrams showing interaction in an exemplary system 1000 of various levels of a protocol stack, such as protocol stack 900. Each of FIGS. 10A-10B illustrates a different embodiment of a system 1000, labeled 1000A-1000B respectively.

FIG. 10A is a block diagram of interaction in an exemplary system 1000A of various levels of a protocol stack, such as protocol stack 900. The exemplary system 1000A includes a radio access network interface 1010A (such as a baseband unit (BBU) implemented as an eNodeB with an IP Ethernet connection to a core network or other type of baseband unit (BBU)), a host unit 1030, an antenna unit 1050 connected to the host unit 1030 across a communication link 1040, and a subscriber unit 1070. In exemplary embodiments, the radio access network interface 1010A includes a core network Layer 2 (L2) 1012, a core network physical (PHY) layer 1014, a radio access technology (RAT) packet data convergence protocol (PDCP) layer 1016, a radio access technology (RAT) radio link control (RLC) layer 1018, a radio access technology (RAT) medium access control (MAC) layer 1020, and a radio access technology (RAT) physical (PHY) layer 1022. In exemplary embodiments, the core network Layer 2 (L2) 1012 is an LTE core network Layer 2. In exemplary embodiments, the core network physical (PHY) layer 1014 is replaced with another type of core network Layer 1 (L1). In exemplary embodiments, the core network physical (PHY) layer 1014 is an LTE core network physical layer. In exemplary embodiments, each of the radio access technology (RAT) packet data convergence protocol (PDCP) layer 1016, the radio access technology (RAT) radio link control (RLC) layer 1018, and the radio access technology (RAT) medium access control (MAC) layer 1020 are replaced with another type of radio access technology (RAT) Layer 2 (L2). In exemplary embodiments, the radio access technology (RAT) packet data convergence protocol (PDCP) layer 1016 is an LTE packet data convergence protocol (PDCP) layer. In exemplary embodiments, the radio access technology (RAT) radio link control (RLC) layer 1018 is an LTE RLC layer. In exemplary embodiments, the radio access technology (RAT) physical (PHY) layer 1022 is replaced with another type of radio access technology (RAT) Layer 1 (L1).

In exemplary embodiments, the host unit 1030 includes a transport medium access control (MAC) layer 1032, a radio access technology (RAT) physical (PHY) layer 1034, and a transport physical (PHY) layer 1036. In exemplary embodiments the transport medium access control (MAC) layer 1032 is replaced with another type of transport Layer 2 (L2). In exemplary embodiments, the radio access technology (RAT) physical (PHY) layer 1034 is replaced with another type of radio access technology (RAT) Layer 1 (L1). In exemplary embodiments, the radio access technology (RAT) physical (PHY) layer 1034 is an LTE physical (PHY) layer. In exemplary embodiments, the transport physical (PHY) layer 1036 is replaced with another type of transport Layer 1 (L1). In exemplary embodiments, the antenna unit 1050 includes a transport medium access control (MAC) layer 1052, a radio access technology (RAT) physical (PHY) layer 1054, and a transport physical (PHY) layer 1056. In exemplary embodiments, the transport medium access control (MAC) layer 1052 is a transport Layer 2 (L2). In exemplary embodiments, the radio access technology (RAT) physical (PHY) layer 1054 is a radio access technology (RAT) Layer 1 (L1). In exemplary embodiments, the radio access technology (RAT) physical (PHY) layer 1054 is an LTE physical (PHY) layer. In exemplary embodiments, the transport physical (PHY) layer 1056 is a transport Layer 1 (L1). In exemplary embodiments, the subscriber unit 1070 includes a radio access technology (RAT) packet data convergence protocol (PDCP) layer 1072, a radio access technology (RAT) radio link control (RLC) layer 1074, a radio access technology (RAT) medium access control (MAC) layer 1076, and a radio access technology (RAT) physical (PHY) layer 1078. In exemplary embodiments, each of the radio access technology (RAT) packet data convergence protocol (PDCP) layer 1072, the radio access technology (RAT) radio link control (RLC) layer 1074, and the radio access technology (RAT) medium access control (MAC) layer 1076 is replaced with another type of radio access technology (RAT) Layer 2. In exemplary embodiments, each of the radio access technology (RAT) packet data convergence protocol (PDCP) layer 1072, the radio access technology (RAT) radio link control (RLC) layer 1074, and the radio access technology (RAT) medium access control (MAC) layer 1076 are LTE Layer 2 protocol layers. In exemplary embodiments, the radio access technology (RAT) physical (PHY) layer 1078 is replaced with another type of radio access technology (RAT) Layer 1. In exemplary embodiments, the radio access technology (RAT) physical (PHY) layer 1078 is an LTE Layer 1 protocol layer.

In exemplary embodiments, the RAT physical (PHY) layer 1034 of the host unit 1030 is communicatively coupled to the RAT physical (PHY) layer 1022 of the radio access network interface 1010A. In exemplary embodiments, the transport physical (PHY) layer 1056 of the antenna unit 1050 is communicatively coupled to the transport physical (PHY) layer 1036 of the host unit 1030 by the communication link 1040. In exemplary embodiments, the radio access technology (RAT) physical (PHY) layer 1054 of the antenna unit 1050 is coupled to an antenna 1060. In exemplary embodiments, the radio access technology (RAT) physical (PHY) layer 1078 of the subscriber unit is communicatively coupled to an antenna 1080. In exemplary embodiments, the RAT physical (PHY) layer 1054 communicates with the RAT physical (PHY) layer 1078 across a wireless link between antenna 1060 and antenna 1080.

In exemplary embodiments, the core network physical (PHY) layer 1014 receives core network physical (PHY) layer protocol data units (PDUs) (such as a serial data stream) from a component in a core network (such as core network 622 described above with reference to FIG. 6) and converts the core network physical layer PDUs into core network Layer 2 (L2) protocol data units (PDUs). In exemplary embodiments, the core network Layer 2 (L2) 1012 converts the core network L2 PDUs into Layer 3 (L3) protocol data units (PDUs) that are passed to the radio access technology (RAT) packet data convergence protocol (PDCP) layer 1016. In exemplary embodiments, the L3 PDUs are Internet Protocol (IP) PDUs. In exemplary embodiments, the RAT PDCP layer 1016 converts the L3 PDUs to radio access technology (RAT) L2 PDUs that are further processed by the RAT radio link control (RLC) layer 1018 and the RAT medium access control (MAC) layer 1020. The RAT physical (PHY) layer 1022 converts the RAT L2 PDUs (such as RAT MAC PDUs) into radio access technology (RAT) physical layer data and communicates the RAT physical layer data (which is LTE physical layer data in some embodiments, such as I/Q data) to the RAT physical (PHY) layer 1034 of the host unit 1030.

In exemplary embodiments, the host unit 1030 receives radio access technology (RAT) physical layer data (such as LTE physical layer data) at the RAT physical (PHY) layer 1034 from the RAT physical (PHY) layer 1022 of the radio access network interface 1010A. In exemplary embodiments, the RAT physical layer data is analog RF or CPRI baseband data. In exemplary embodiments, this RAT physical layer data is the data that will be transmitted over the air interface between antennas 1060 and antennas 1080. In exemplary embodiments, the host unit 1030 receives the physical layer data from the RAT physical (PHY) layer 1034 through either a digital interface or an analog RF interface. In exemplary embodiments, the RAT physical (PHY) layer 1034 of the host unit 1030 undoes the RAT physical layer processing performed by the radio access network interface 1010A and extracts just the radio access technology (RAT) medium access control (MAC) protocol data units (PDUs) in the RAT MAC layer and passes the RAT MAC PDUs (such as LTE MAC PDUs) to the RAT medium access control (MAC) layer 1032. In exemplary embodiments, the RAT MAC PDUs are translated into transport medium access control (MAC) layer protocol data units (PDUs) by the transport medium access control (MAC) layer 1032, such as DAS MAC PDUs. These transport MAC PDUs are sent over the communication link 1040 by the transport physical (PHY) layer 1036 (such as an Ethernet PHY or other DAS physical (PHY) processor) as synchronous serial data streams. In exemplary embodiments, packet data may be used for transport across the communication link 1040. In exemplary embodiments, synchronization bits, timing bits, etc. are inserted by the transport physical (PHY) layer 1036 creating additional overhead. In exemplary embodiments, the communication link 1040 is a Category building cable (or some other lower bandwidth cable).

In exemplary embodiments, the serial stream of data is received at the transport physical (PHY) layer 1056 from the communication link 1040. In exemplary embodiments, the transport physical (PHY) layer 1056 is an Ethernet PHY or some other DAS physical (PHY) layer. In exemplary embodiments, the transport physical (PHY) layer of the antenna unit 1050 extracts the transport medium access control (MAC) PDUs in the transport medium access control (MAC) layer 1052, such as DAS transport MAC PDUs. The transport medium access control (MAC) layer 1052 synchronizes to the stream of received transport MAC PDUs and reframes the transport MAC PDUs into the radio access technology (RAT) medium access control (MAC) protocol data units (PDUs) in the radio access technology (RAT) medium access control (MAC) layer. These RAT MAC PDUs are run through the RAT physical (PHY) layer 1054 resulting in a signal that is formatted in the same way as the radio access technology (RAT) physical layer data (such as LTE physical layer data) output from the RAT physical (PHY) layer 1022 of the radio access network interface 1010A. In exemplary embodiments, the RAT physical layer data is output via the RAT physical (PHY) layer 1054 and the antenna 1060 across the wireless link to the antenna 1080 of the physical (PHY) layer 1078 of the subscriber unit 1070. By transporting across the communication link 1040 using the transport MAC PDUs through the transport physical (PHY), the data rate of the signals over the communication link 1040 is reduced.

In the uplink the antenna unit 1050 receives signals at the RAT physical (PHY) layer 1054 via the antenna 1060 from the subscriber unit 1070, just as the radio access network interface 1010A could. The RAT physical (PHY) layer 1054 of the antenna unit 1050 processes these uplink signals into uplink RAT MAC PDUs in the RAT MAC layer. The RAT MAC PDUs are translated into the transport MAC PDUs by the transport MAC layer 1052. The transport MAC PDUs are converted by the transport physical (PHY) layer 1056 and sent over the communication link 1040 to the transport physical (PHY) layer 1036 of the host unit 1030. In the host unit 1030, the detected transport data streams are gathered from the antenna units 104 by the transport physical (PHY) layer 1036 (instead of I/Q RAT samples) and are converted to uplink transport MAC PDUs by the transport physical (PHY) layer 1036. The uplink transport MAC PDUs are translated into uplink RAT MAC PDUs by the transport MAC layer 1032.

In exemplary embodiments, the uplink data from the antenna units 1050 is combined in the host unit 1030. In exemplary embodiments, the uplink transport MAC PDUs received from antenna units 1050 are intelligently combined using majority logic, soft weighted combining, averaging or other combining methods by the transport MAC layer 1032. The combined MAC PDU is then translated into uplink RAT MAC PDUs by the transport MAC layer 1032. In exemplary embodiments, the uplink combining is performed in the transport physical layer 1036. In exemplary embodiments, the uplink combining is performed on the RAT MAC PDUs in the transport MAC layer 1032. The uplink RAT MAC PDUs are communicated as RAT physical layer data by the RAT PHY layer 1034 to the RAT physical (PHY) layer 1022 of the radio access network interface 1010A by the RAT physical (PHY) layer 1034 of the antenna unit 1050. In exemplary embodiments, the RAT PHY layer 1022 of the radio access network interface 1010A converts the RAT physical layer data into uplink RAT MAC PDUs that are passed to the RAT MAC layer 1020 and up through RAT RLC layer 1018 and RAT PDCP layer 1016 and converted into L3 PDUs that are communicated to the core network Layer 2 (L2) 1012 down the core network stack and converted into core network physical data and communicated by the core network physical layer 1014 to the upstream core network component.

FIG. 10B is a block diagram of interaction in an exemplary system 1000B of various levels of a protocol stack, such as protocol stack 900. The exemplary system 1000B includes a radio access network interface 1010B (such as a baseband unit (BBU) implemented as an eNodeB with an IP Ethernet connection to a core network or other type of baseband unit (BBU)), an antenna unit 1050 connected to the radio access network interface 1010B across a communication link 1040, and a subscriber unit 1070. In exemplary embodiments, the radio access network interface 1010B includes a core network Layer 2 (L2) 1012, a core network physical (PHY) layer 1014, a radio access technology (RAT) packet data convergence protocol (PDCP) layer 1016, a radio access technology (RAT) radio link control (RLC) layer 1018, a radio access technology (RAT) medium access control (MAC) layer 1020, a transport medium access control (MAC) layer 1102, and a transport physical (PHY) layer 1104. In exemplary embodiments, the core network Layer 2 (L2) 1012 is an LTE core network Layer 2 (L2). In exemplary embodiments, the core network physical (PHY) layer 1014 is replaced with another type of core network Layer 1 (L1). In exemplary embodiments, the core network physical layer 1012 is an LTE core network physical layer. In exemplary embodiments, each of the radio access technology (RAT) packet data convergence protocol (PDCP) layer 1016, the radio access technology (RAT) radio link control (RLC) layer 1018, and the radio access technology (RAT) medium access control (MAC) layer 1020 is replaced with another type of radio access technology (RAT) Layer 2 (L2). In exemplary embodiments, the radio access technology (RAT) packet data convergence protocol (PDCP) layer 1016 is an LTE packet data convergence protocol (PDCP) layer. In exemplary embodiments, the radio access technology (RAT) radio link control (RLC) layer 1018 is an LTE radio link control (RLC) layer. In exemplary embodiments, the radio access technology (RAT) medium access control (MAC) layer 1020 is an LTE medium access control (MAC) layer. In exemplary embodiments, the transport medium access control (MAC) 1102 is replaced with another type of transport Layer 2 (L2). In exemplary embodiments, the transport physical (PHY) layer 1104 is replaced with another type of transport Layer 1 (L1).

In exemplary embodiments, the antenna unit 1050 includes a transport medium access control (MAC) layer 1052, a radio access technology (RAT) physical (PHY) layer 1054, and a transport physical (PHY) layer 1056. In exemplary embodiments, the transport medium access control (MAC) layer 1052 is replaced with another type of transport Layer 2 (L2). In exemplary embodiments, the radio access technology (RAT) physical (PHY) layer 1054 is replaced with another type of radio access technology (RAT) Layer 1 (L1). In exemplary embodiments, the radio access technology (RAT) physical (PHY) layer 1054 is an LTE physical (PHY) layer. In exemplary embodiments, the transport physical (PHY) layer 1056 is replaced with another type of transport Layer 1 (L1). In exemplary embodiments, the subscriber unit 1070 includes a radio access technology (RAT) packet data convergence protocol (PDCP) layer 1072, a radio access technology (RAT) radio link control (RLC) layer 1074, a radio access technology (RAT) medium access control (MAC) layer 1076, and a radio access technology (RAT) physical (PHY) layer 1078. In exemplary embodiments, each of the radio access technology (RAT) packet data convergence protocol (PDCP) layer 1072, the radio access technology (RAT) radio link control (RLC) layer 1074, and the radio access technology (RAT) medium access control (MAC) layer 1076 is replaced with another type of radio access technology (RAT) Layer 2. In exemplary embodiments, each of the radio access technology (RAT) packet data convergence protocol (PDCP) layer 1072, the radio access technology (RAT) radio link control (RLC) layer 1074, and the radio access technology (RAT) medium access control (MAC) layer 1076 are LTE Layer 2 protocol layers. In exemplary embodiments, the radio access technology (RAT) physical (PHY) layer 1078 is replaced with another type of radio access technology (RAT) Layer 1. In exemplary embodiments, the radio access technology (RAT) physical (PHY) layer 1078 is an LTE Layer 1 protocol layer.

Distributed antenna system 1000B includes similar components to distributed antenna system 1000A and operates according to similar principles and methods as distributed antenna system 1000A described above. The difference between distributed antenna system 1000B and distributed antenna system 1000A is that distributed antenna system 1000B does not include the host unit 1030 and the radio access network interface 1010B includes transport medium access control (MAC) layer 1102 in addition to RAT medium access control (MAC) layer 1020 and transport physical (PHY) layer 1104 instead of RAT physical (PHY) layer 1022. The transport medium access control (MAC) layer 1102 and transport physical (PHY) layer 1104 enables the radio access network interface 1010B to communicate directly with antenna unit 1050 using the transport MAC PDUs.

In exemplary embodiments in the downlink, the core network Layer (L2) 1012, the core network physical layer 1014, the RAT PDCP layer 1016, the RAT RLC layer 1018, and the RAT medium access control (MAC) layer 1020 function as described above with reference to the radio access network interface 1010A of FIG. 10A. The difference in the radio access network interface 1010B being that the transport medium access control (MAC) layer 1102 converts from radio access technology (RAT) medium access control (MAC) PDUs to transport medium access control (MAC) PDUs. In exemplary embodiments, the transport physical (PHY) layer 1104 is implemented using Ethernet PHY devices through which the transport medium access control (MAC) PDUs are communicated across the communication link 1040. These transport MAC PDUs are sent over the communication link 1040 by the transport physical (PHY) layer 1104 (such as an Ethernet PHY or other DAS physical (PHY) layer) as synchronous serial data streams. In exemplary embodiments, packet data may be used for transport across the communication link 1040. In exemplary embodiments, synchronization bits, timing bits, etc. are inserted by the transport physical (PHY) layer 1036 creating additional overhead. In exemplary embodiments, the communication link 1040 is a Category building cable (or some other lower bandwidth cable).

In exemplary embodiments, the serial stream of data is received at the transport physical (PHY) layer 1058 from the communication link 1040. In exemplary embodiments, the transport physical (PHY) layer 1058 is implemented using Ethernet PHY devices or some other DAS physical (PHY) layer. In exemplary embodiments, the transport physical (PHY) layer of the antenna unit 1050 extracts the transport medium access control (MAC) PDUs in the transport medium access control (MAC) layer 1054, such as DAS transport MAC PDUs. The transport medium access control (MAC) layer 1054 synchronizes to the stream of received transport MAC PDUs and reframes the transport MAC PDUs into the radio access technology (RAT) medium access control (MAC) protocol data units (PDUs) in the radio access technology (RAT) medium access control (MAC) layer. These RAT MAC PDUs are run through the RAT physical (PHY) layer 1056 resulting in a signal that is formatted in the same way as the radio access technology (RAT) physical layer data (such as LTE physical layer data) output from the RAT physical (PHY) layer 1022 of the radio access network interface 1010A. In exemplary embodiments, the RAT physical layer data is output via the RAT physical (PHY) layer 1056 and the antenna 1060 across the wireless link to the antenna 1080 of the physical (PHY) layer 1078 of the subscriber unit 1070. By transporting across the communication link 1040 using the transport MAC PDUs through the transport physical (PHY) layer, the data rate of the signals transported over the communication link 1040 is reduced.

In the uplink the antenna unit 1050 receives signals at the RAT physical (PHY) layer 1056 via the antenna 1060 from the subscriber unit 1070, just as the radio access network interface 1010A could. The RAT physical (PHY) layer 1056 of the antenna unit 1050 processes these uplink signals into uplink RAT MAC PDUs in the RAT MAC layer. The RAT MAC PDUs are translated into the transport MAC PDUs by the transport MAC layer 1054. The transport MAC PDUs are converted by the transport physical (PHY) layer 1058 and sent over the communication link 1040 to the transport physical (PHY) 1104 of the radio access network interface 1010B. In the radio access network interface 1010B, the detected transport data streams are gathered from the antenna units 1050 by the transport physical (PHY) 1104 (instead of I/Q RAT samples) and are converted to uplink transport MAC PDUs by the transport physical (PHY) layer 1104. The uplink transport MAC PDUs are translated into uplink RAT MAC PDUs by the transport MAC layer 1102 and communicated to the RAT medium access control (MAC) 1020 of the radio access network interface 1010B. In the radio access network interface 1010B, the information is communicated up the RAT/transport side of the protocol stack in the radio access network interface 1010B and down the core network side of the protocol stack 1010B as described above with reference to radio access network interface 1010A.

In exemplary embodiments, the uplink data from the antenna units 1050 is combined in the radio access network interface 1010B. In exemplary embodiments the uplink transport MAC PDUs received from antenna units 1050 are intelligently combined using majority logic, soft weighted combining, averaging or other combining methods by the transport MAC layer 1102. The combined MAC PDU is then translated into uplink RAT MAC PDUs by the transport MAC layer 1102. In exemplary embodiments the uplink combining is performed in the transport physical layer 1104. In exemplary embodiments the uplink combining is performed on the RAT MAC PDUs in the transport MAC layer 1102.

In exemplary embodiments, any of the processors described above may include or function with software programs, firmware or other computer readable instructions for carrying out various methods, process tasks, calculations, and control functions, used in the digital processing functionality described herein. These instructions are typically stored on any appropriate computer readable medium used for storage of computer readable instructions or data structures. The computer readable medium can be implemented as any available media that can be accessed by a general purpose processor (GPP) or special purpose computer or processor (such as a field-programmable gate array (FPGA), application-specific integrated circuit (ASIC) or other integrated circuit), or any programmable logic device. Suitable processor-readable media may include storage or memory media such as magnetic or optical media. For example, storage or memory media may include conventional hard disks, Compact Disk—Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAIVIBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

EXAMPLE EMBODIMENTS

Example 1 includes a distributed antenna system comprising: a host unit configured to receive downlink wireless network information from a radio access network interface; at least one antenna unit communicatively coupled to the host unit by at least one digital communication link; wherein the host unit is configured to convert the downlink wireless network information received from the radio access network interface from a first protocol layer to a second protocol layer, wherein the second protocol layer uses relevant bits more efficiently than the first protocol layer; wherein the host unit is configured to communicate the downlink wireless network information to the at least one antenna unit across the at least one digital communication link; wherein the at least one antenna unit is configured to convert the downlink wireless network information communicated from the host unit from the second protocol layer to downlink radio frequency signals; and wherein the at least one antenna unit is configured to communicate the downlink radio frequency signals wirelessly using at least one antenna.

Example 2 includes the distributed antenna system of Example 1, wherein the at least one antenna unit is configured to convert the downlink wireless network information communicated from the host unit from the second protocol layer to downlink radio frequency signals by being configured to: convert the downlink wireless network information communicated from the host unit from the second protocol layer to the first protocol layer; convert the downlink wireless network information from digital signals to analog signals; and frequency convert the downlink wireless network information from baseband signals to downlink radio frequency signals.

Example 3 includes the distributed antenna system of any of Examples 1-2, wherein the host unit is further configured to convert the downlink wireless network information from a first protocol data unit type to a second protocol data unit type before the downlink wireless network information are communicated from the host unit to the at least one antenna unit across the at least one digital communication link.

Example 4 includes the distributed antenna system of Example 3, wherein the at least one antenna unit is further configured to convert the downlink wireless network information from the second protocol data unit type to the first protocol data unit type before the downlink wireless network information are converted from the second protocol layer to downlink radio frequency signals.

Example 5 includes the distributed antenna system of any of Examples 1-4, further comprising: wherein the at least one antenna unit is further configured to receive uplink radio frequency signals wirelessly using at least one antenna; wherein the at least one antenna unit is further configured to convert the uplink radio frequency signals to uplink wireless network information in the second protocol layer; wherein the at least one antenna unit is further configured to communicate the uplink wireless network information to the host unit across the at least one digital communication link; and wherein the host unit is configured to convert the uplink wireless network information received from the at least one antenna unit from the second protocol layer to the first protocol layer.

Example 6 includes the distributed antenna system of any of Examples 1-5, wherein at least a first digital communication link of the at least one digital communication link is transported across a medium that is a Category building cabling.

Example 7 includes the distributed antenna system of any of Examples 1-6, wherein the digital communication link is implemented using Ethernet physical layer devices.

Example 8 includes the distributed antenna system of any of Examples 1-7, wherein the first protocol layer is a physical layer and the second protocol layer is a medium access control layer.

Example 9 includes the distributed antenna system of any of Examples 1-8, wherein the first protocol layer is a Long Term Evolution (LTE) physical layer and the second protocol layer is a medium access control layer.

Example 10 includes a distributed antenna system comprising: a host unit configured to transmit uplink wireless network information to a radio access network interface; at least one antenna unit communicatively coupled to the host unit by at least one digital communication link; wherein the at least one antenna unit is configured to receive uplink radio frequency signals wirelessly using at least one antenna; wherein the at least one antenna unit is further configured to convert the uplink radio frequency signals to uplink wireless network information in a second protocol layer; wherein the at least one antenna unit is further configured to communicate the uplink wireless network information to the host unit across the at least one digital communication link; and wherein the host unit is configured to convert the uplink wireless network information received from the at least one antenna unit from the second protocol layer to a first protocol layer, wherein the second protocol layer uses relevant bits more efficiently than the first protocol layer.

Example 11 includes the distributed antenna system of Example 10, wherein the at least one antenna unit is configured to convert the uplink radio frequency signals to uplink wireless network information in a second protocol layer by being configured to: frequency convert the uplink wireless network information from uplink radio frequency signals to baseband signals; convert the uplink wireless network information from analog signals to digital signals; convert the uplink wireless network information from the first protocol layer to the second protocol layer.

Example 12 includes the distributed antenna system of any of Examples 10-11, wherein at least a first digital communication link of the at least one digital communication link is transported across a medium that is a Category building cabling.

Example 13 includes the distributed antenna system of any of Examples 10-12, wherein the first digital communication link is implemented using Ethernet physical layer devices.

Example 14 includes the distributed antenna system of any of Examples 10-13, wherein the host unit is further configured to combine multiple uplink wireless network information received from a plurality of antenna units together.

Example 15 includes the distributed antenna system of Example 14, wherein the host unit is further configured to combine multiple uplink wireless network information received from the plurality of antenna units together using at least one of majority logic and weighted combining.

Example 16 includes the distributed antenna system of any of Examples 14-15, wherein the host unit is further configured to combine multiple uplink wireless network information received from the plurality of antenna units together based on quality metrics received from the plurality of antenna units.

Example 17 includes the distributed antenna system of any of Examples 10-16, wherein the first protocol layer is a physical layer and the second protocol layer is a medium access control layer.

Example 18 includes the distributed antenna system of any of Examples 10-17, wherein the first protocol layer is a Long Term Evolution (LTE) physical layer and the second protocol layer is a medium access control layer.

Example 19 includes a method for efficiently transporting wireless network information through a distributed antenna system, comprising: converting downlink wireless network information received from a radio access network interface from a first protocol layer to a second protocol layer at a host unit in a distributed antenna system, wherein the second protocol layer uses relevant bits more efficiently than the first protocol layer; communicating the downlink wireless network information from the host unit to at least one antenna unit across at least one digital communication link; converting the downlink wireless network information communicated from the host unit from the second protocol layer to downlink radio frequency signals at the at least one antenna unit; communicating the downlink radio frequency signals wirelessly using at least one antenna at the at least one antenna unit.

Example 20 includes the method of Example 19, wherein converting the downlink wireless network information communicated from the host unit from the second protocol layer to the downlink radio frequency signals at the at least one antenna unit includes: converting the downlink wireless network information communicated from the host unit from the second protocol layer to the first protocol layer; converting the downlink wireless network information from digital signals to analog signals; and frequency converting the downlink wireless network information from baseband signals to downlink radio frequency signals.

Example 21 includes the method of any of Examples 19-20, further comprising converting the downlink wireless network information from a first protocol data unit type to a second protocol data unit type at the host unit before the downlink wireless network information are communicated from the host unit to the at least one antenna unit across the at least one digital communication link.

Example 22 includes the method of Example 21, further comprising converting the downlink wireless network information from the second protocol data unit type to the first protocol data unit type at the at least one remote antenna unit before the downlink wireless network information are converted from the second protocol layer to downlink radio frequency signals.

Example 23 includes the method of any of Examples 19-22, further comprising: receiving uplink radio frequency signals wirelessly at the at least one antenna unit using the at least one antenna; converting uplink radio frequency signals to uplink wireless network information in the second protocol layer at the at least one antenna unit; communicating the uplink wireless network information from the at least one antenna unit to the host unit across the at least one digital communication link; and converting the uplink wireless network information received from the at least one antenna unit from the second protocol layer to the first protocol layer.

Example 24 includes the method of any of Examples 19-23, wherein the first protocol layer is a physical layer and the second protocol layer is a medium access control layer.

Example 25 includes the method of any of Examples 19-24, wherein the first protocol layer is a Long Term Evolution (LTE) physical layer and the second protocol layer is a medium access control layer.

Example 26 includes a method for efficiently transporting wireless network information through a distributed antenna system, comprising: receiving uplink radio frequency signals wirelessly at at least one antenna unit using at least one antenna; converting uplink radio frequency signals to uplink wireless network information in a second protocol layer at the at least one antenna unit; communicating the uplink wireless network information from the at least one antenna unit to the host unit across at least one digital communication link; and converting the uplink wireless network information received from the at least one antenna unit from the second protocol layer to a first protocol layer, wherein the second protocol layer uses relevant bits more efficiently than the first protocol layer.

Example 27 includes the method of Example 26, wherein converting uplink radio frequency signals to uplink wireless network information in the second protocol layer at the at least one antenna unit includes: frequency converting the uplink wireless network information from uplink radio frequency signals to baseband signals; converting the uplink wireless network information from analog signals to digital signals; converting the uplink wireless network information from the first protocol layer to the second protocol layer.

Example 28 includes the method of any of Examples 26-27, wherein the first protocol layer is a physical layer and the second protocol layer is a medium access control layer.

Example 29 includes the method of any of Examples 26-28, wherein the first protocol layer is a Long Term Evolution (LTE) physical layer and the second protocol layer is a medium access control layer.

Example 30 includes a distributed antenna system comprising: a host unit configured to receive downlink LTE physical layer data from an eNodeB; at least one antenna unit communicatively coupled to the host unit by at least one digital communication link; wherein the host unit is configured to convert the downlink LTE physical layer data in the LTE physical layer to downlink LTE medium access control layer protocol data units in the LTE medium access control layer, wherein the LTE medium access control layer uses relevant bits more efficiently than the LTE physical layer; wherein the host unit is configured to convert the downlink LTE medium access control layer protocol data units in the LTE medium access control layer into downlink distributed antenna system transport medium access control layer protocol data units in a downlink distributed antenna system transport medium access control layer for transport through the distributed antenna system; wherein the host unit is configured to convert the downlink distributed antenna system transport medium access control layer protocol data units in the downlink distributed antenna system transport medium access control layer into a downlink Ethernet physical layer data stream in the Ethernet physical layer; wherein the host unit is configured to communicate the downlink Ethernet physical layer data stream across the digital communication link to the at least one antenna unit; wherein the at least one antenna unit is configured to receive the downlink Ethernet physical layer data stream from the host unit across the digital communication link; wherein the at least one antenna unit is configured to convert the downlink Ethernet physical layer data stream in the Ethernet physical layer to the downlink distributed antenna system transport medium access control layer protocol data units in the downlink distributed antenna system transport medium access control layer; wherein the at least one antenna unit is configured to convert the downlink distributed antenna system transport medium access control layer protocol data units in the downlink distributed antenna system transport medium access control layer into the downlink LTE medium access control layer protocol data units in the LTE medium access control layer; wherein the at least one antenna unit is configured to generate a downlink LTE radio frequency signal from the downlink LTE medium access control layer protocol data units in the LTE medium access control layer; and wherein the at least one antenna unit is configured to communicate the downlink LTE radio frequency signal using at least one antenna.

Example 31 includes a distributed antenna system comprising: a host unit; at least one antenna unit communicatively coupled to the host unit by at least one digital communication link and configured to receive an uplink LTE radio frequency signal using at least one antenna; wherein the at least one antenna unit is configured to generate uplink LTE medium access control layer protocol data units in the LTE medium access control layer from the uplink LTE radio frequency signal; wherein the at least one antenna unit is configured to convert the uplink LTE medium access control layer protocol data units in the LTE medium access control layer into uplink distributed antenna system transport medium access control layer protocol data units in an uplink distributed antenna system transport medium access control layer; wherein the at least one antenna unit is configured to convert the uplink distributed antenna system transport medium access control layer protocol data units in the uplink distributed antenna system transport medium access control layer into an uplink Ethernet physical layer data stream in an Ethernet physical layer; wherein the at least one antenna unit is configured to communicate the uplink Ethernet physical layer data stream to the host unit across the digital communication link; wherein the host unit is configured to receive the uplink Ethernet physical layer data stream across the digital communication link from the at least one antenna unit; wherein the host unit is configured to convert the uplink Ethernet physical layer data stream in the Ethernet physical layer into uplink distributed antenna system transport medium access control layer protocol data units in the uplink distributed antenna system transport medium access control layer; wherein the host unit is configured to convert the uplink distributed antenna system transport medium access control layer protocol data units in the uplink distributed antenna system transport medium access control layer into uplink LTE medium access control layer protocol data units in the LTE medium access control layer; and wherein the host unit is configured to convert the uplink LTE medium access control layer protocol data units in the LTE medium access control layer into uplink LTE physical layer data in the LTE physical layer, wherein the LTE medium access control layer uses relevant bits more efficiently than the LTE physical layer.

What is claimed is:

1. A distributed antenna system comprising:
a host unit configured to receive downlink wireless network information from a radio access network interface, wherein the wireless network information is formatted according to a radio access technology protocol having a radio access technology stack, wherein the wireless network information is in a first layer of the radio access technology protocol stack;
at least one antenna unit communicatively coupled to the host unit by at least one digital communication link;
wherein the host unit is configured to convert the downlink wireless network information received from the radio access network interface into downlink data stream control layer protocol data units in a data stream control layer of the radio access technology protocol stack, wherein the downlink data stream control layer is higher than the first layer of the radio access technology protocol stack, wherein the downlink data stream control layer protocol data units use relevant bits more efficiently than the downlink wireless network information;
wherein the host unit is configured to communicate the downlink data stream control layer protocol data units within the data stream control layer to the at least one antenna unit across the at least one digital communication link using a distributed antenna system transport protocol, wherein the distributed antenna system transport protocol is distinct from the radio access technology protocol;
wherein the at least one antenna unit is configured to convert the downlink data stream control layer protocol data units within the data stream control layer to downlink radio frequency signals; and
wherein the at least one antenna unit is configured to communicate the downlink radio frequency signals wirelessly using at least one antenna.

2. The distributed antenna system of claim 1, wherein the at least one antenna unit is configured to convert the downlink data stream control layer protocol data units within the data stream control layer to downlink radio frequency signals by being configured to:
convert the downlink data stream control layer protocol data units to downlink wireless network information;
convert the downlink wireless network information from digital signals to analog signals; and
frequency convert the downlink wireless network information from baseband signals to downlink radio frequency signals.

3. The distributed antenna system of claim 1, wherein at least a first digital communication link of the at least one digital communication link is transported across a medium that is a Category building cabling.

4. The distributed antenna system of claim 1, wherein the digital communication link is implemented using Ethernet physical layer devices.

5. The distributed antenna system of claim 1, wherein the protocol layer is a physical layer and the another protocol layer is a medium access control layer.

6. The distributed antenna system of claim 1, wherein the protocol layer is a Long Term Evolution (LTE) physical layer and the another protocol layer is a medium access control layer.

7. A distributed antenna system comprising:
a host unit configured to transmit uplink wireless network information to a radio access network interface, wherein the uplink wireless network information is formatted according to a radio access technology protocol having a radio access technology stack, wherein the wireless network information is in a first layer of the radio access technology protocol stack;
at least one antenna unit communicatively coupled to the host unit by at least one digital communication link;
wherein the at least one antenna unit is configured to receive uplink radio frequency signals wirelessly using at least one antenna;
wherein the at least one antenna unit is further configured to convert the uplink radio frequency signals to uplink data stream control layer protocol data units within a data stream control layer of the radio access technology protocol stack, wherein the uplink radio data stream control layer is higher than the first layer of the radio access technology protocol stack;
wherein the at least one antenna unit is further configured to communicate the uplink data stream control layer protocol data units within the data stream control layer to the at least one antenna unit across the at least one digital communication link using a distributed antenna system transport protocol, wherein the distributed antenna system transport protocol is distinct from the radio access technology protocol;
wherein the host unit is configured to convert the uplink data stream control layer protocol data units to the uplink wireless network information that uses relevant bits less efficiently than the data stream control layer used by the uplink data stream control layer protocol data units.

8. The distributed antenna system of claim 7, wherein the at least one antenna unit is configured to convert the uplink radio frequency signals to uplink wireless network information in the data stream control layer by being configured to:
frequency convert the uplink wireless network information from uplink radio frequency signals to baseband signals;
convert the uplink wireless network information from analog signals to digital signals; and
convert the uplink wireless network information to uplink data stream control layer protocol units.

9. The distributed antenna system of claim 7, wherein at least a first digital communication link of the at least one digital communication link is transported across a medium that is a Category building cabling.

10. The distributed antenna system of claim 7, wherein the digital communication link is implemented using Ethernet physical layer devices.

11. The distributed antenna system of claim 7, wherein the host unit is further configured to combine multiple uplink wireless network information received from a plurality of antenna units together.

12. The distributed antenna system of claim 11, wherein the host unit is further configured to combine multiple uplink wireless network information received from the plurality of antenna units together using at least one of majority logic and weighted combining.

13. The distributed antenna system of claim 11, wherein the host unit is further configured to combine multiple uplink wireless network information received from the plurality of antenna units together based on quality metrics received from the plurality of antenna units.

14. The distributed antenna system of claim 7, wherein the protocol layer is a physical layer and the another protocol layer is a medium access control layer.

15. The distributed antenna system of claim 7, wherein the protocol layer is a Long Term Evolution (LTE) physical layer and the another protocol layer is a medium access control layer.

16. A distributed antenna system comprising:
a host unit configured to receive downlink data stream control layer protocol data units within a data stream control layer from a radio access network interface, wherein the downlink data stream control layer protocol data units are formatted according to a radio access technology protocol having a radio access technology stack including the data stream control layer and at least one layer below the data stream control layer within the radio access technology protocol;
at least one antenna unit communicatively coupled to the host unit by at least one digital communication link;
wherein the host unit is configured to communicate the downlink data stream control layer protocol data units within the data stream control layer to the at least one antenna unit across the at least one digital communication link using a distributed antenna system transport protocol, wherein the distributed antenna system transport protocol is distinct from the radio access technology protocol;
wherein the at least one antenna unit is configured to convert the downlink data stream control layer protocol data units within the data stream control layer to downlink radio frequency signals for a radio access technology;
wherein the at least one antenna unit is configured to communicate the downlink radio frequency signals wirelessly using at least one antenna; and
wherein the downlink data stream control layer protocol data units use relevant bits more efficiently than a radio access technology physical layer signal for the radio access technology.

17. The distributed antenna system of claim 16, wherein the at least one antenna unit is configured to convert the downlink data stream control layer protocol data units within the data stream control layer to downlink radio frequency signals by being configured to:
convert the downlink data stream control layer protocol data units to downlink wireless network information;
convert the downlink wireless network information from digital signals to analog signals; and
frequency convert the downlink wireless network information from baseband signals to downlink radio frequency signals.

18. The distributed antenna system of claim 17, wherein at least a first digital communication link of the at least one digital communication link is transported across a medium that is a Category building cabling.

19. The distributed antenna system of claim 17, wherein the digital communication link is implemented using Ethernet physical layer devices.

20. The distributed antenna system of claim 17, wherein the protocol layer is a Long Term Evolution (LTE) physical layer and the another protocol layer is a medium access control layer.

* * * * *